(12) United States Patent
Baptist

(10) Patent No.: US 11,314,743 B1
(45) Date of Patent: Apr. 26, 2022

(54) STORING RECORDS VIA MULTIPLE FIELD-BASED STORAGE MECHANISMS

(71) Applicant: Ocient Holdings LLC, Chicago, IL (US)

(72) Inventor: Andrew D. Baptist, Mt. Pleasant, WI (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 17/136,271

(22) Filed: Dec. 29, 2020

(51) Int. Cl.
*G06F 17/30* (2006.01)
*G06F 16/2455* (2019.01)
*G06F 21/62* (2013.01)
*G06F 16/28* (2019.01)
*G06F 16/22* (2019.01)

(52) U.S. Cl.
CPC ...... *G06F 16/2456* (2019.01); *G06F 16/2282* (2019.01); *G06F 16/284* (2019.01); *G06F 21/6227* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 5,548,770 | A | 8/1996 | Bridges |
| 6,230,200 | B1 | 5/2001 | Forecast et al. |
| 6,633,772 | B2 | 10/2003 | Ford et al. |
| 7,499,907 | B2 | 3/2009 | Brown et al. |
| 7,908,242 | B1 | 3/2011 | Achanta |
| 9,424,287 | B2 * | 8/2016 | Schroth ................. G06F 40/177 |
| 2001/0051949 | A1 | 12/2001 | Carey et al. |
| 2002/0032676 | A1 | 3/2002 | Reiner et al. |
| 2004/0162853 | A1 | 8/2004 | Brodersen et al. |
| 2008/0133456 | A1 | 6/2008 | Richards et al. |
| 2009/0063893 | A1 | 3/2009 | Bagepalli et al. |
| 2009/0183167 | A1 | 7/2009 | Kupferschmidt et al. |
| 2010/0082577 | A1 | 4/2010 | Mirchandani et al. |
| 2010/0241646 | A1 | 9/2010 | Friedman et al. |

(Continued)

OTHER PUBLICATIONS

A new high performance fabric for HPC, Michael Feldman, May 2016, Intersect360 Research.

(Continued)

*Primary Examiner* — Hung D Le
(74) *Attorney, Agent, or Firm* — Garlick & Markison; Katherine C. Stuckman; Bruce E. Stuckman

(57) ABSTRACT

A method includes storing, for each of a plurality of records of a dataset, values corresponding to a first subset of a plurality of fields of the dataset via a first storage mechanism. Values corresponding to a second subset of the plurality of fields are stored vis second storage mechanism that is different from the first storage mechanism based on a data type corresponding to the second subset of the plurality of fields. Execution of a query is facilitated by accessing, via the first storage mechanism, values of a first field included in the first subset of the plurality of fields, and by further accessing, via the second storage mechanism, values of a second field included in the second subset of the plurality of fields. A query resultant for the query is generated based on the values of the first field and the values of the second field.

19 Claims, 43 Drawing Sheets

(56) References Cited

U.S. PATENT DOCUMENTS

| | | | |
|---|---|---|---|
| 2010/0274983 A1 | 10/2010 | Murphy et al. | |
| 2010/0312756 A1 | 12/2010 | Zhang et al. | |
| 2011/0219169 A1 | 9/2011 | Zhang et al. | |
| 2012/0109888 A1 | 5/2012 | Zhang et al. | |
| 2012/0151118 A1 | 6/2012 | Flynn et al. | |
| 2012/0185866 A1 | 7/2012 | Couvee et al. | |
| 2012/0254252 A1 | 10/2012 | Jin et al. | |
| 2012/0311246 A1 | 12/2012 | McWilliams et al. | |
| 2013/0332484 A1 | 12/2013 | Gajic | |
| 2014/0047095 A1 | 2/2014 | Breternitz et al. | |
| 2014/0136510 A1 | 5/2014 | Parkkinen et al. | |
| 2014/0188841 A1 | 7/2014 | Sun et al. | |
| 2015/0205607 A1 | 7/2015 | Lindholm | |
| 2015/0244804 A1 | 8/2015 | Warfield et al. | |
| 2015/0248366 A1 | 9/2015 | Bergsten et al. | |
| 2015/0293966 A1 | 10/2015 | Cai et al. | |
| 2015/0310045 A1 | 10/2015 | Konik et al. | |
| 2016/0034547 A1 | 2/2016 | Lerios et al. | |
| 2020/0042634 A1* | 2/2020 | Stewart | G06F 3/062 |
| 2020/0233861 A1* | 7/2020 | Mathur | G06F 16/278 |
| 2020/0250192 A1* | 8/2020 | Roelke | G06F 16/2282 |
| 2020/0272637 A1* | 8/2020 | Motivala | G06F 16/221 |
| 2021/0019316 A1* | 1/2021 | Pang | G06F 16/2456 |
| 2021/0097067 A1* | 4/2021 | Virtuoso | G06F 16/248 |
| 2021/0124764 A1* | 4/2021 | Kaul | G06F 16/23 |

OTHER PUBLICATIONS

Alechina, N. (2006-2007) B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy . . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentibigtable.html.

Distributed Systems, Fall2012, Mohsen Taheriyan, http://www.scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguideTi . . . .

* cited by examiner database system 10 computing device 18 computing device 18 computing device 18 node 37 node 37 node 37 data set

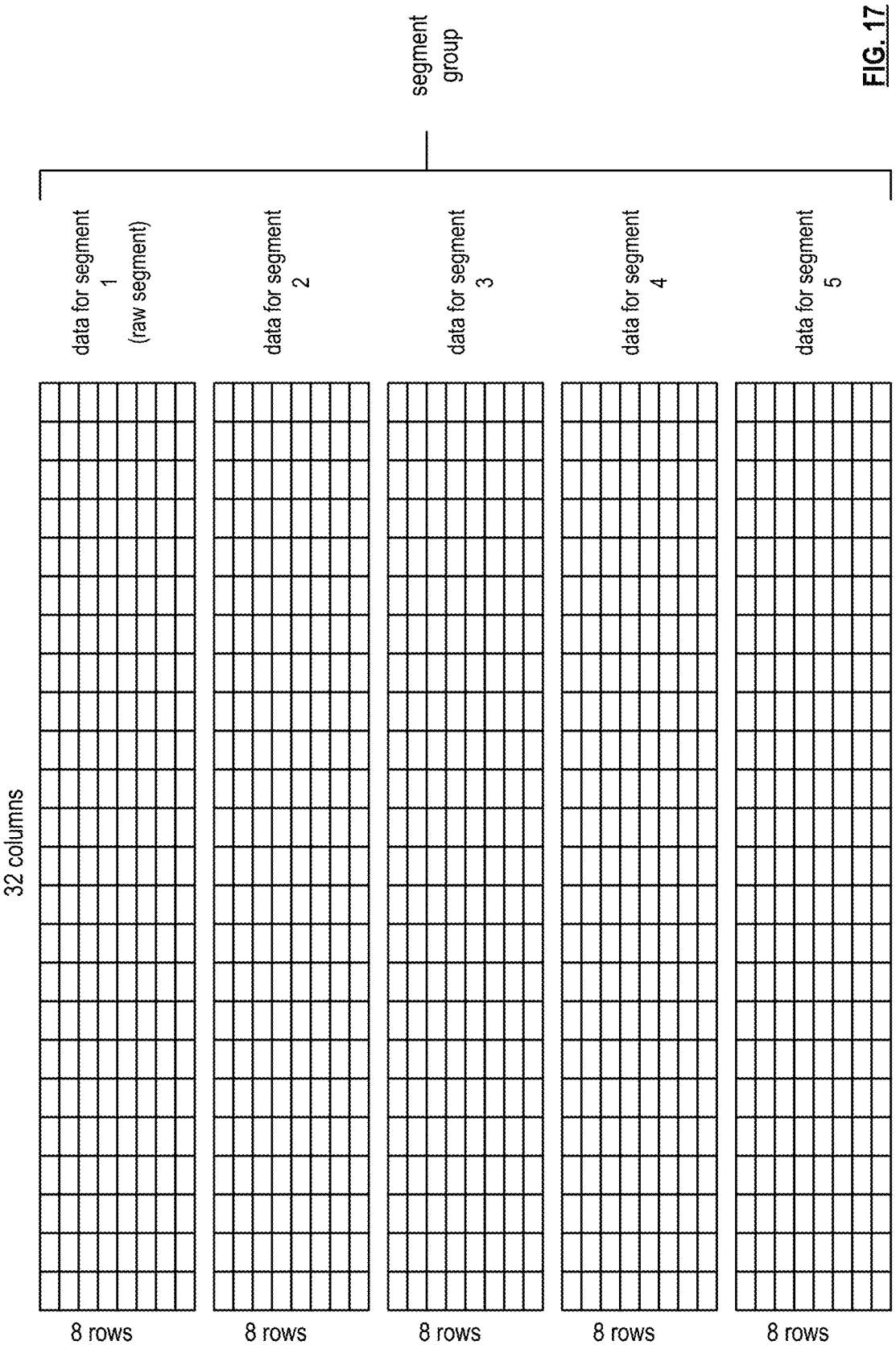

FIG. 18 data for segment 1 (raw segment)

primary organization column (e.g., time stamp) → | selected key column (e.g., engine on or off) →

| | | | | |
|---|---|---|---|---|
| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a |

FIG. 19 divide segment by columns into data slabs

| | | | | |
|---|---|---|---|---|
| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a |

← data slab

FIG. 20 sort data slabs based on key column(s)

| | | | | |
|---|---|---|---|---|
| 1 | a | on | 101 | a2c |
| 4 | d | on | 074 | c4l |
| 5 | e | on | 364 | b5e |
| 7 | g | on | 015 | e8f |
| 2 | b | off | 112 | a1k |
| 3 | c | off | 211 | d5s |
| 6 | f | off | 489 | c4q |
| 8 | h | off | 611 | a1a |

← sorted data slab database system 10 database system 10 database system 10 database system 10

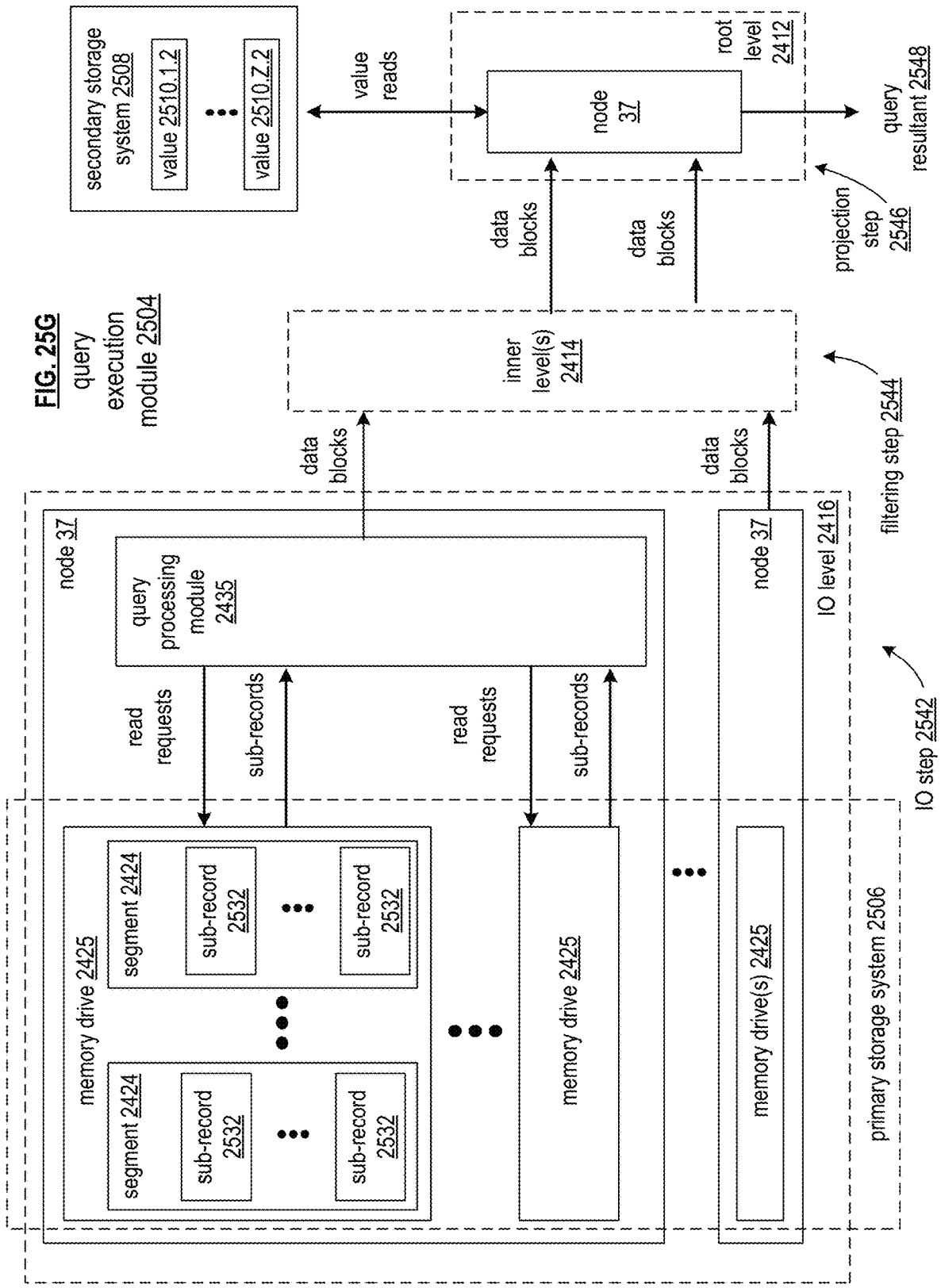

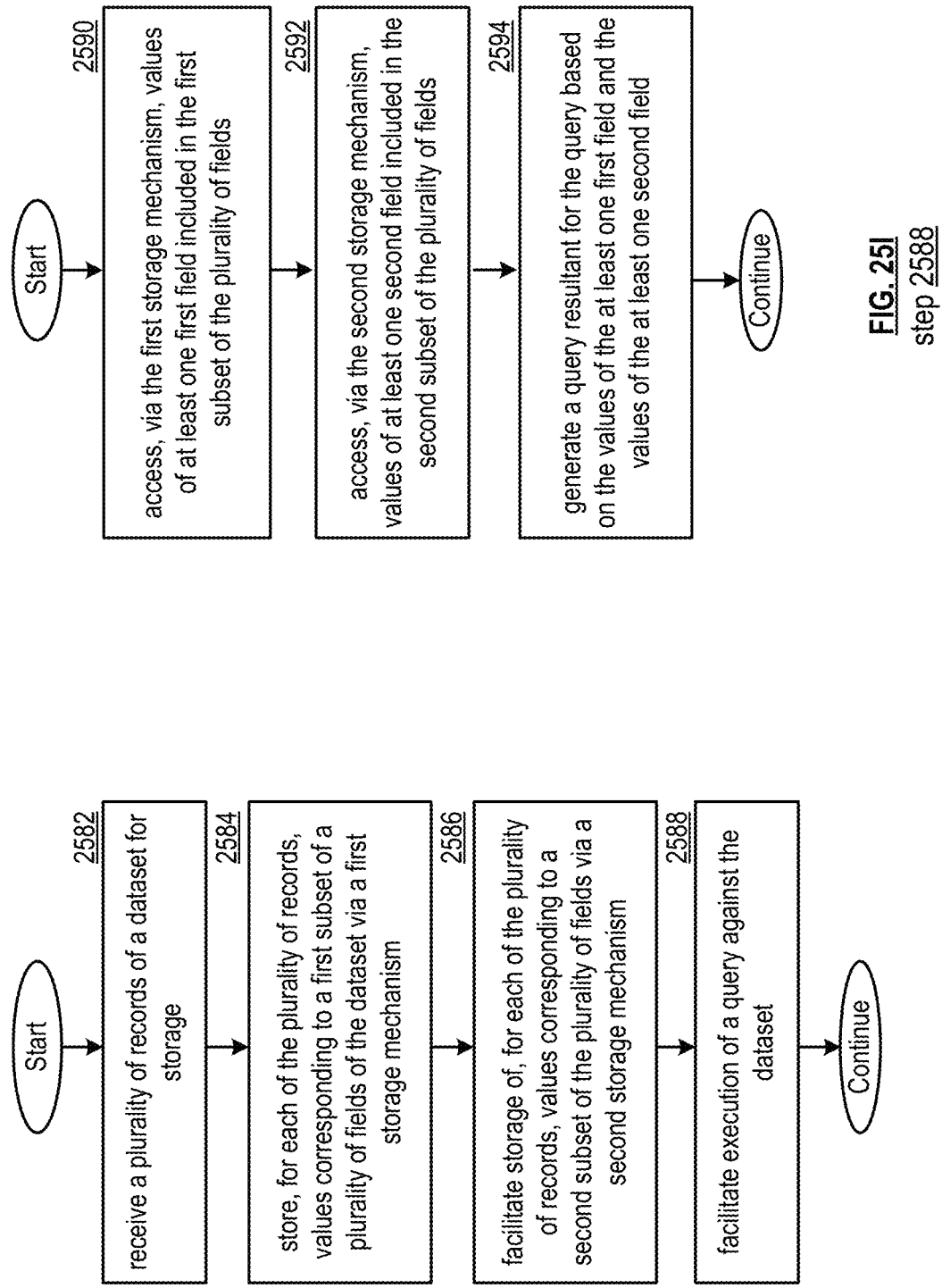

database system 10 database system 10 database system 10 database system 10 database system 10 database system 10

STORING RECORDS VIA MULTIPLE FIELD-BASED STORAGE MECHANISMS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 25G is a schematic block diagram illustrating a plurality of nodes that implement a query execution module in accordance with various embodiments of the present invention;

FIGS. 25H and 25I are logic diagrams illustrating a method of executing a query via access to records stored via multiple field-based storage mechanisms in accordance with various embodiments of the present invention;

DETAILED DESCRIPTION OF THE INVENTION

Figure 1:
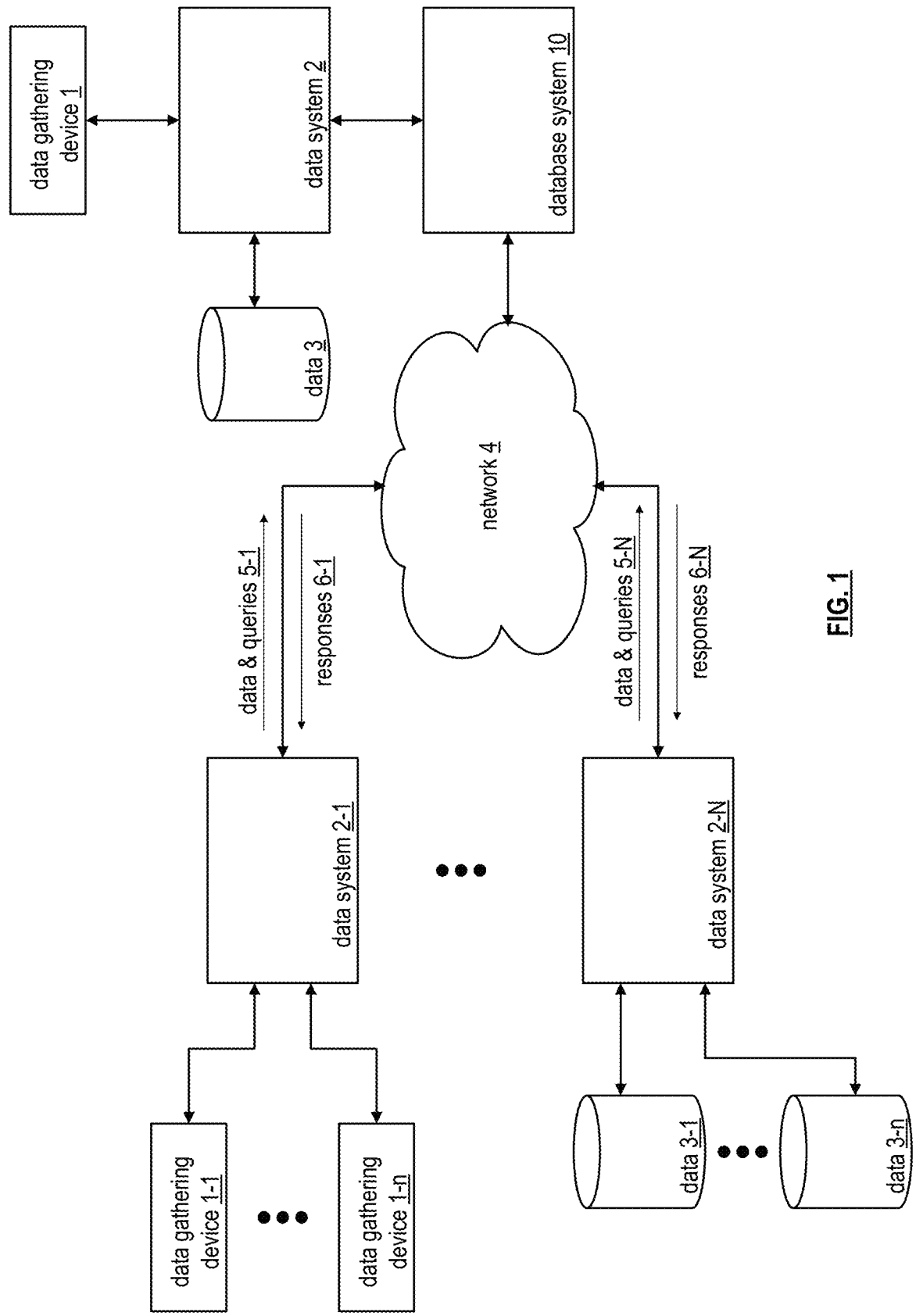
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
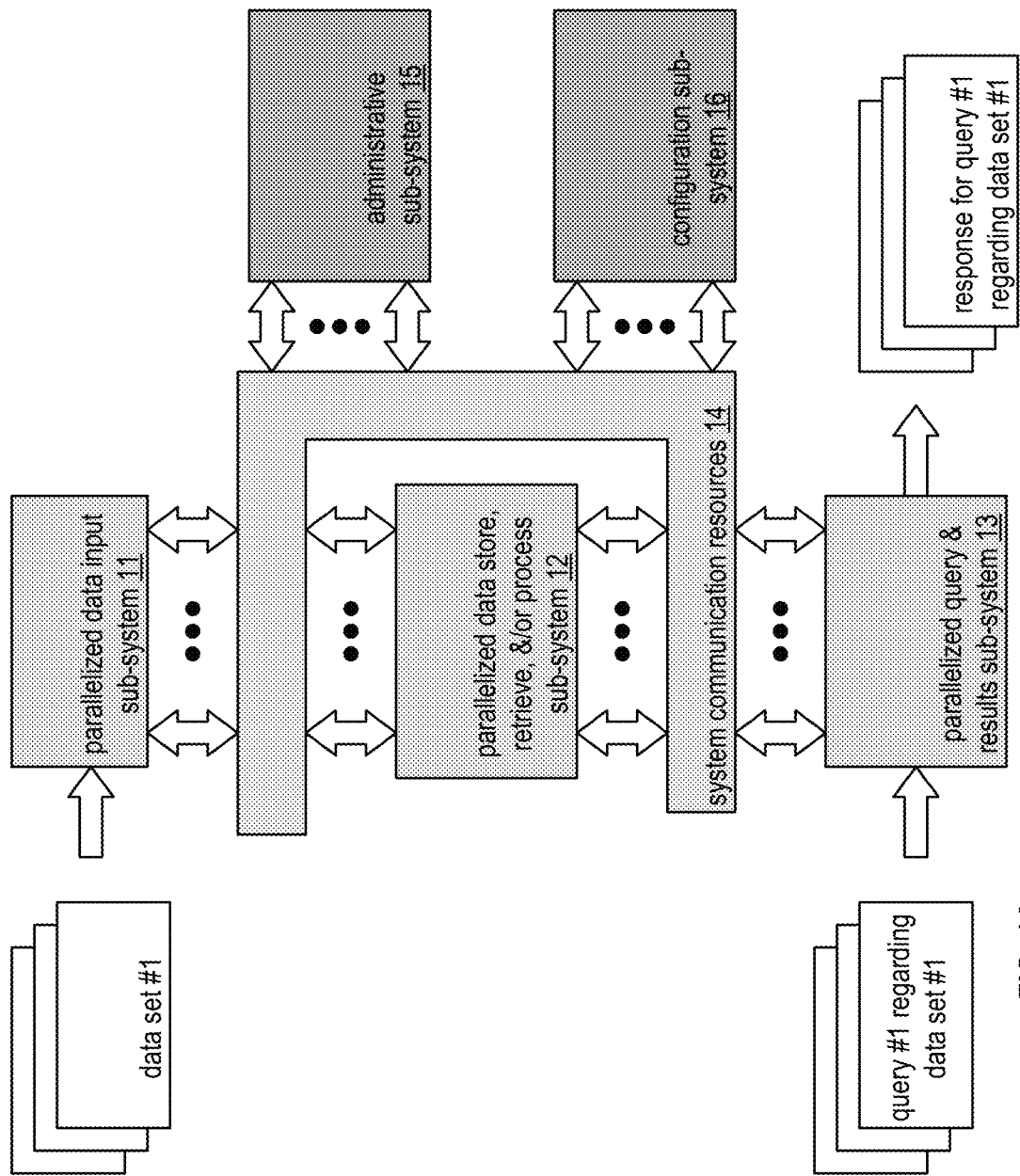
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may be also be referred to as a data input sub-system, the parallelized data store, retrieve, and/or process sub-system may be also be referred to as a data storage and processing sub-system, and the parallelized query and response sub-system 13 may be also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
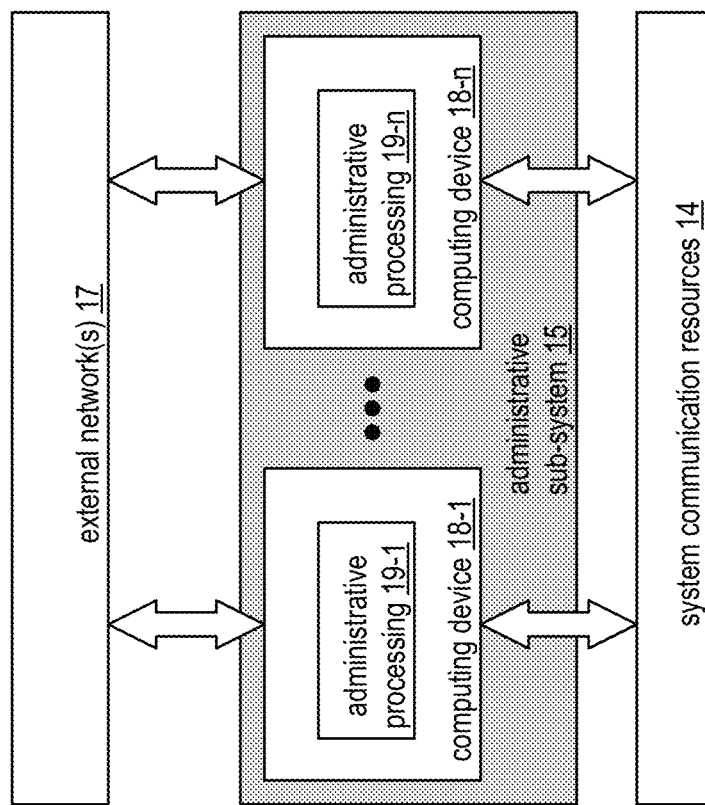
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
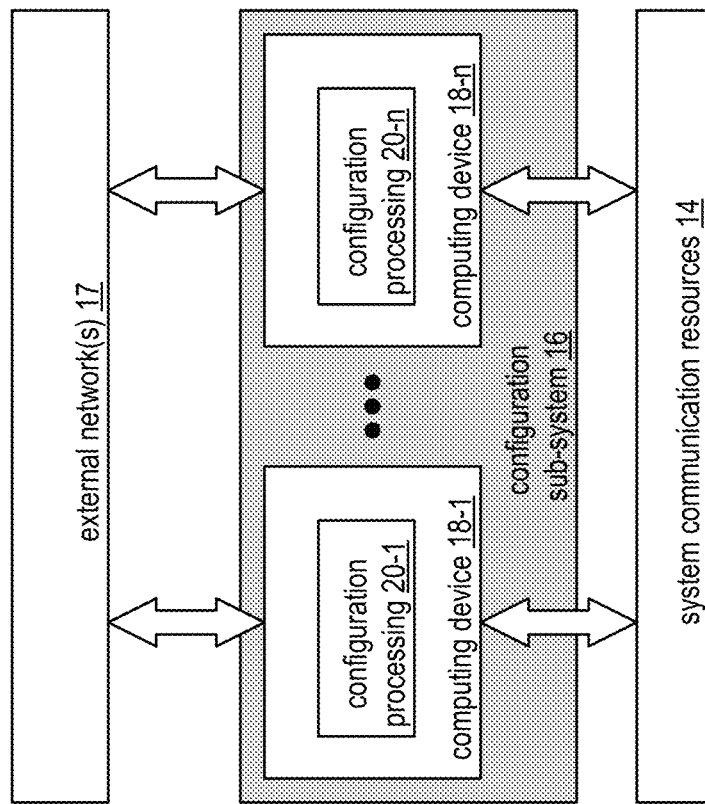
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
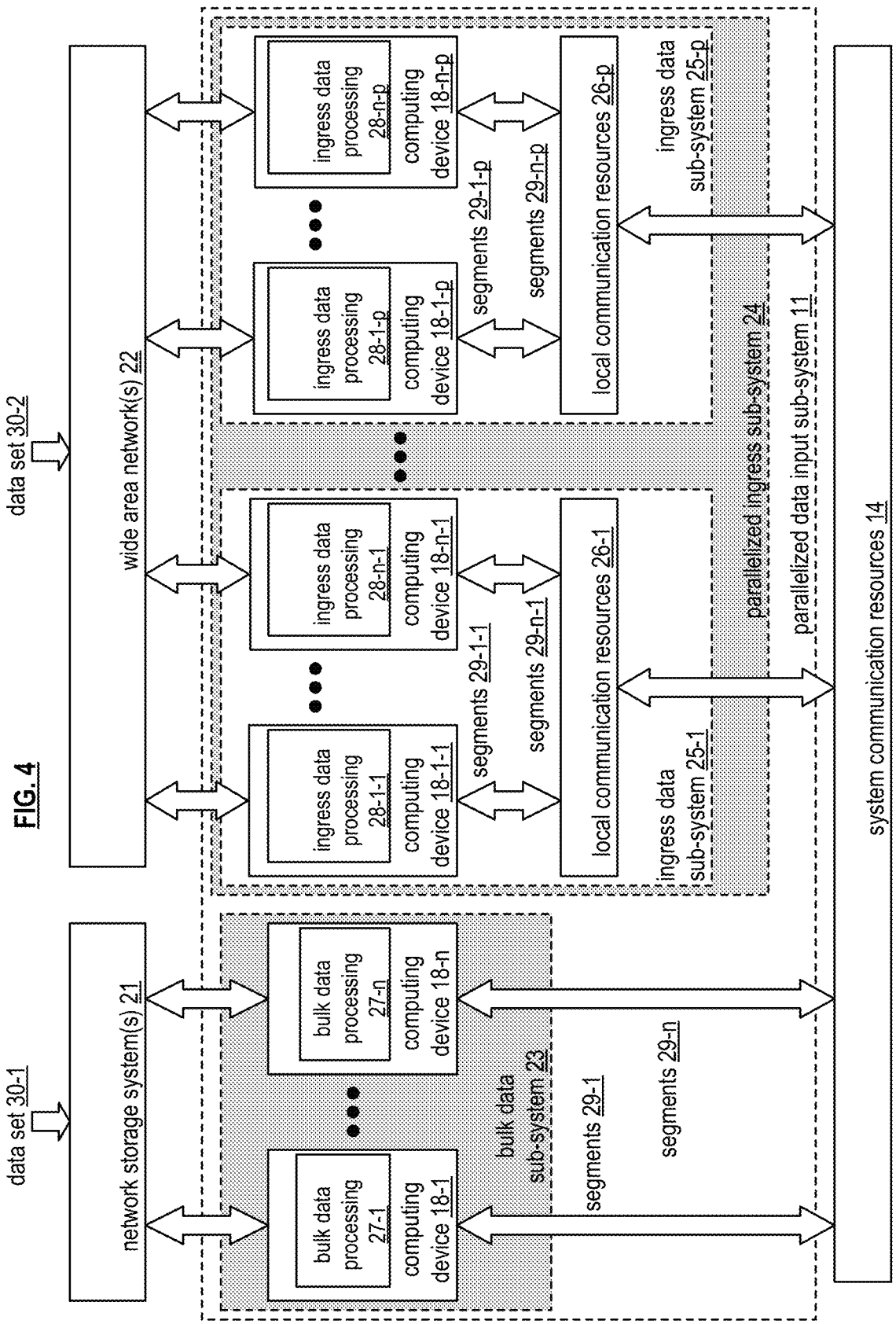
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
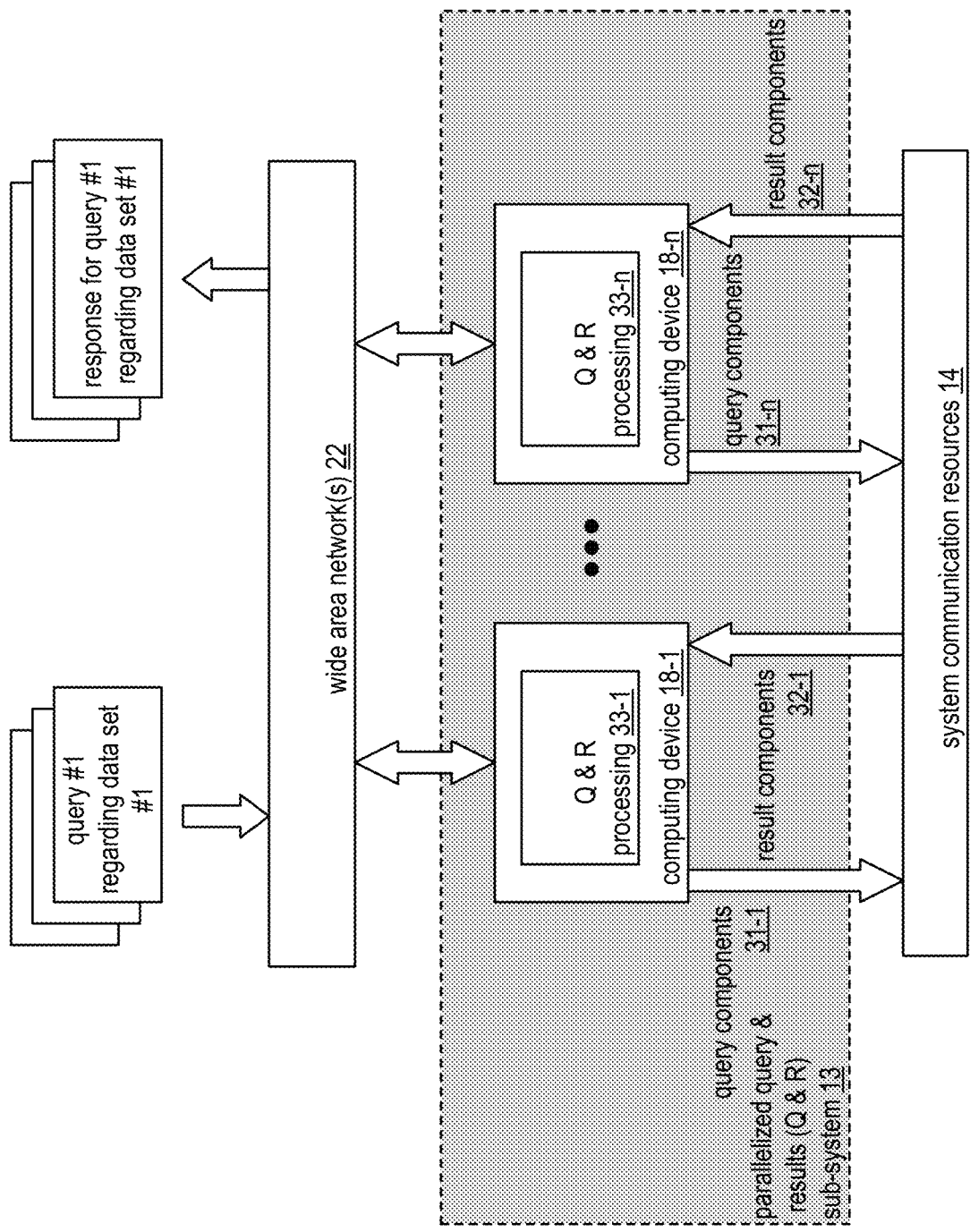
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
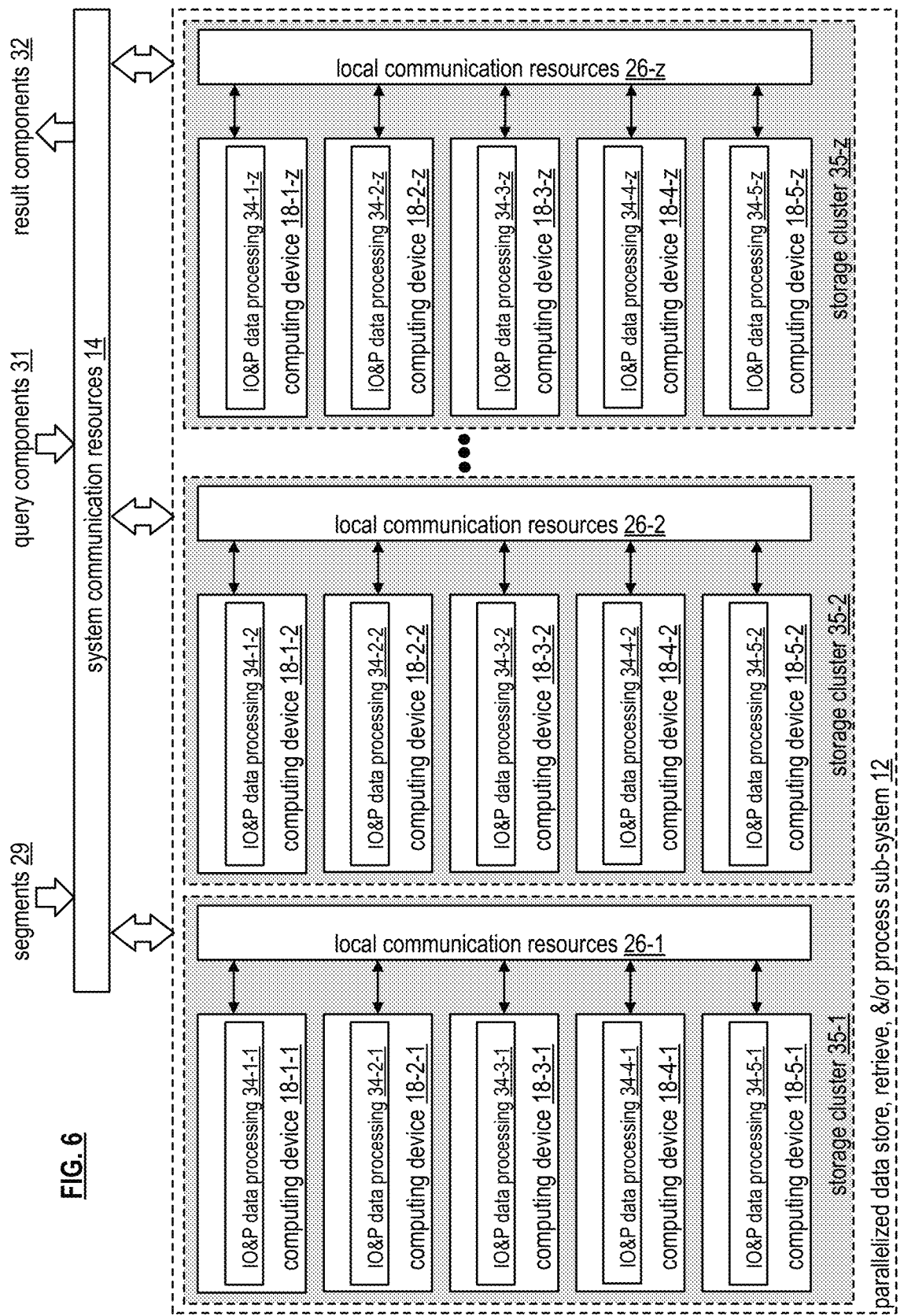
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (TO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
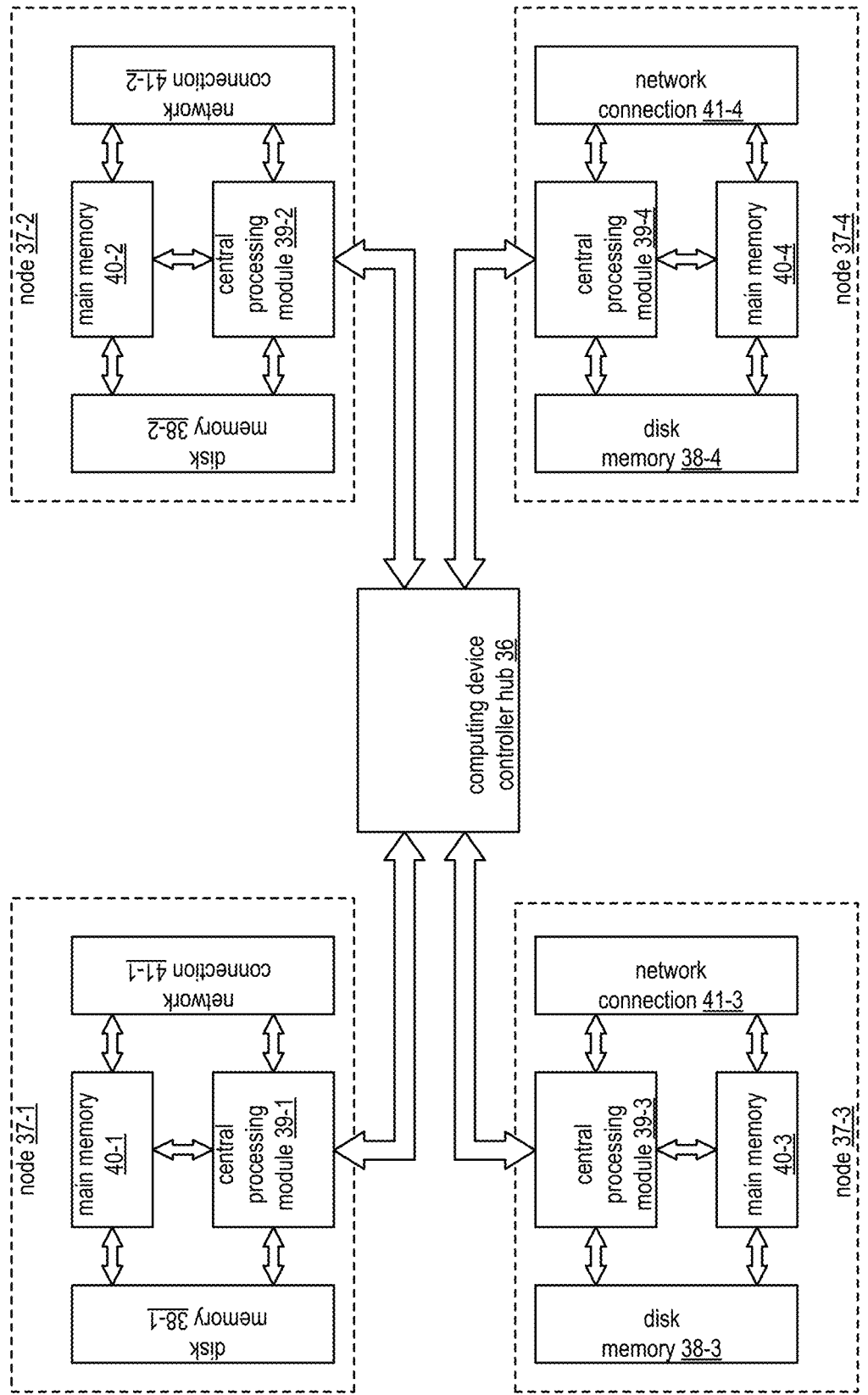
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
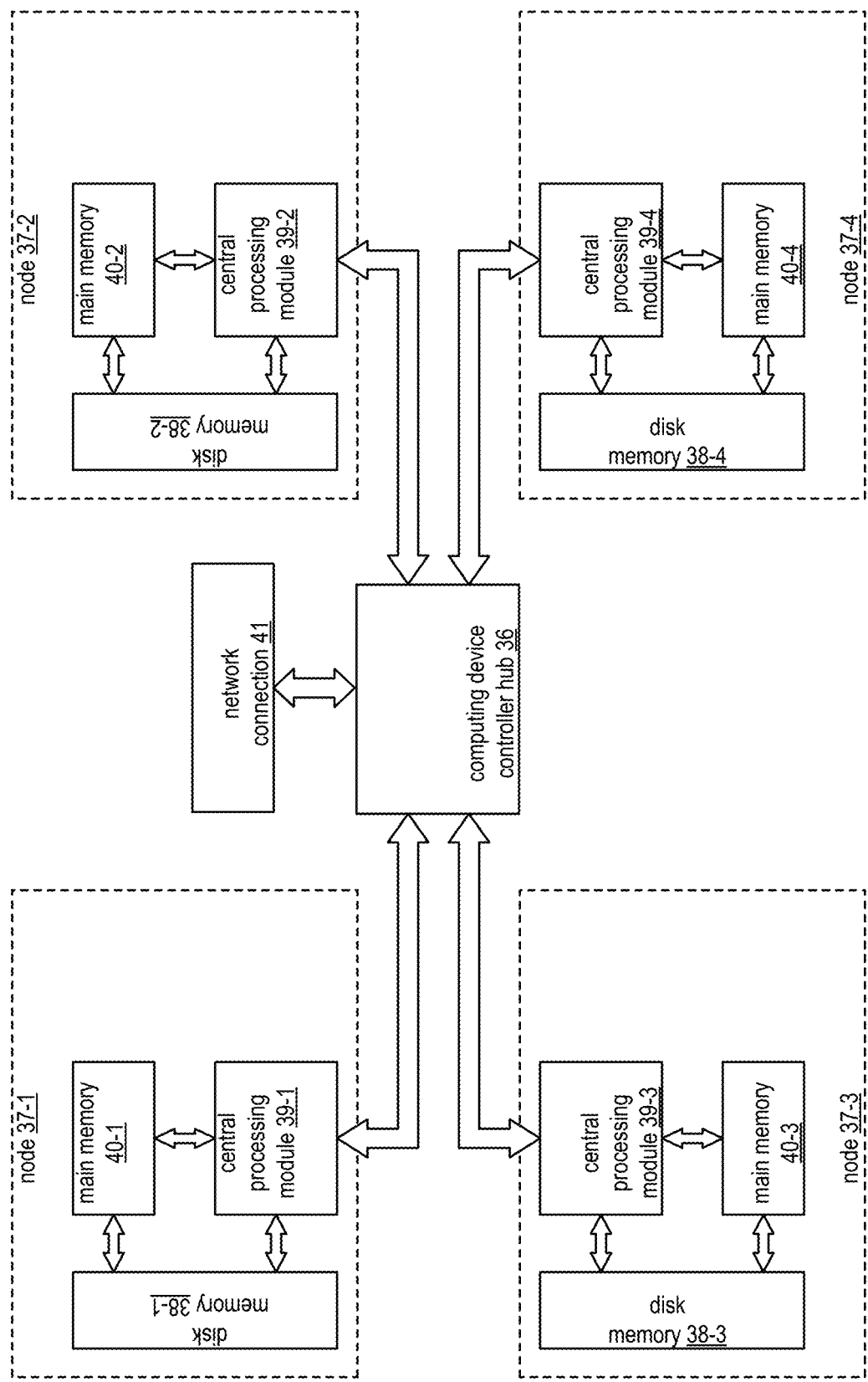
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
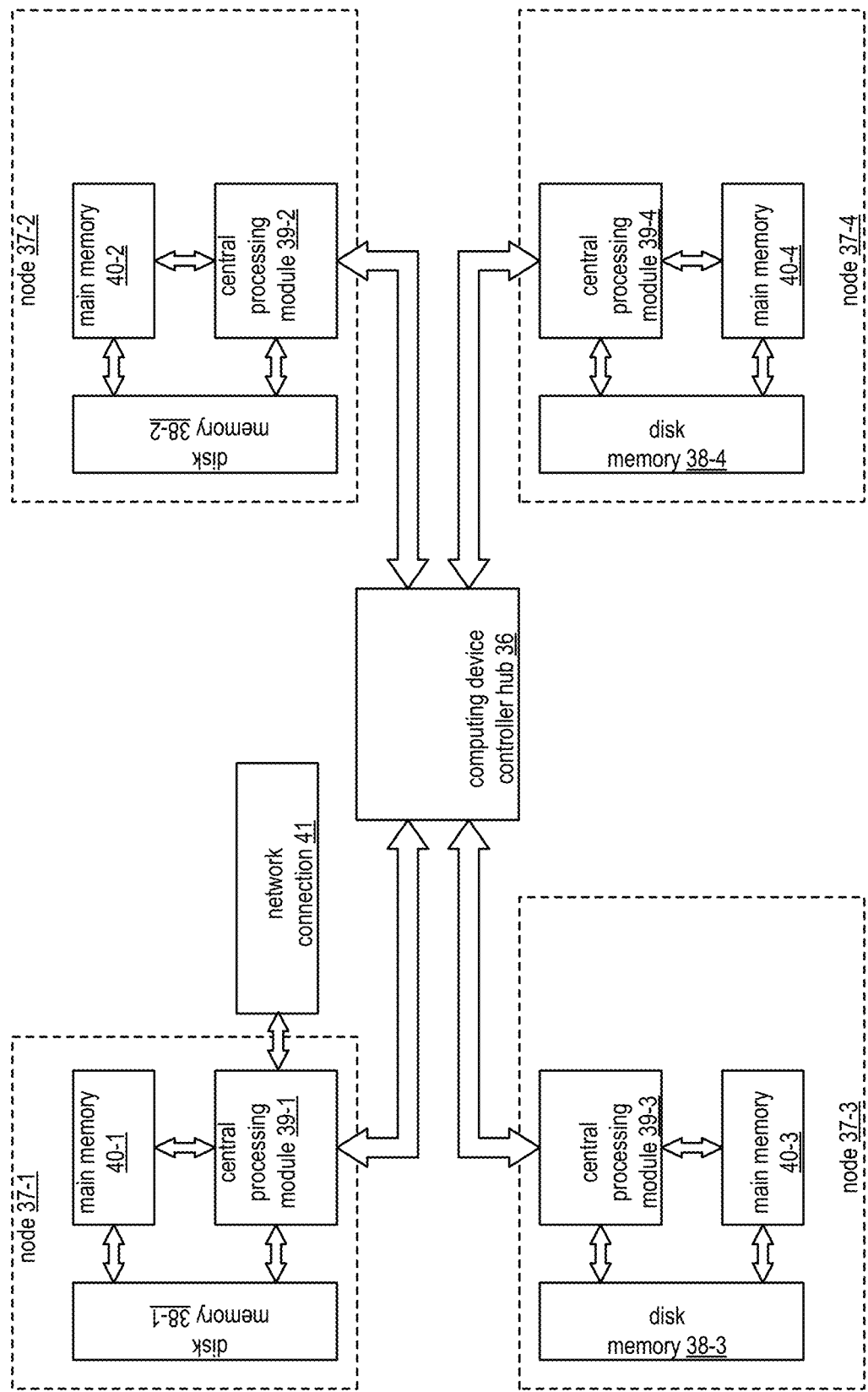
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
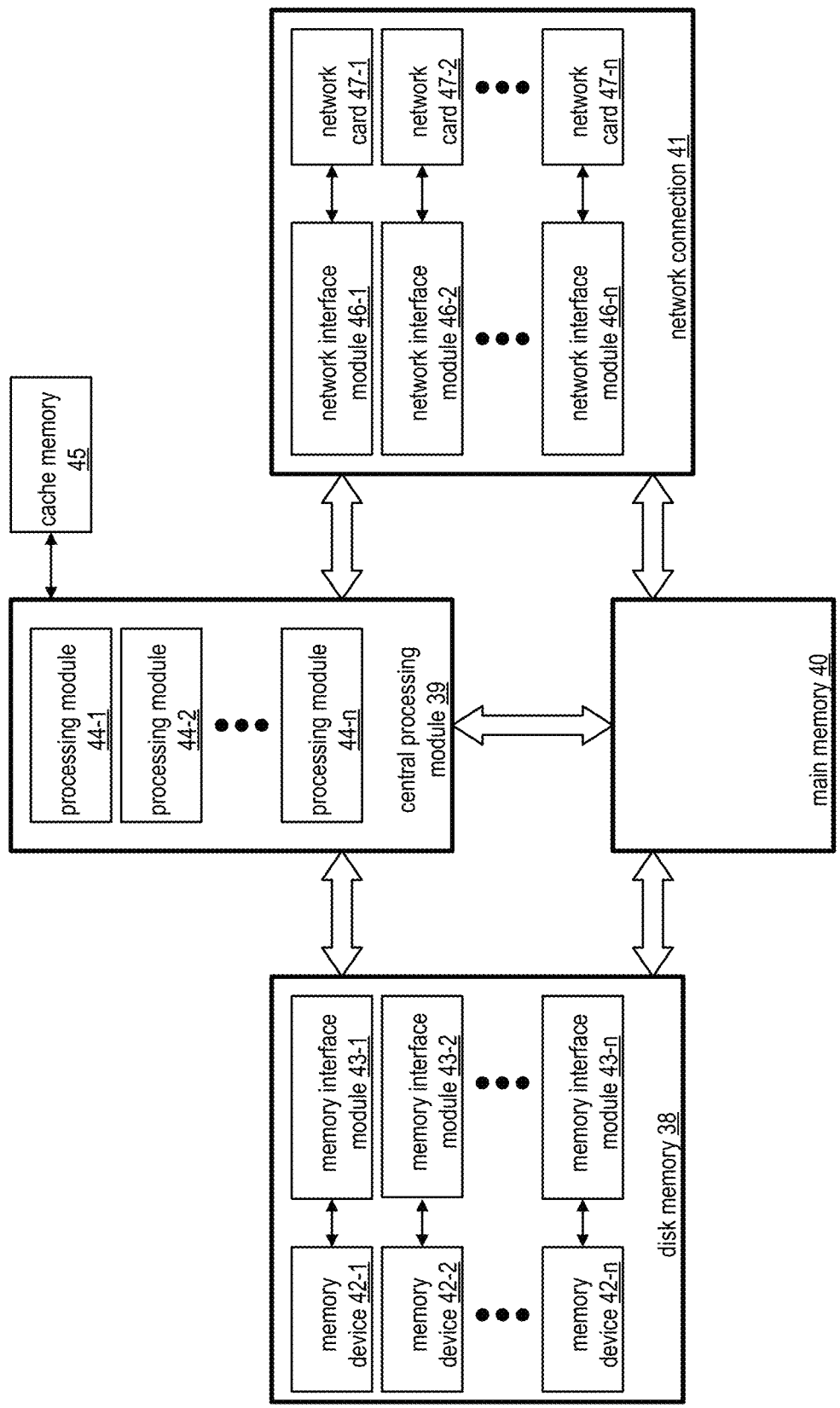
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
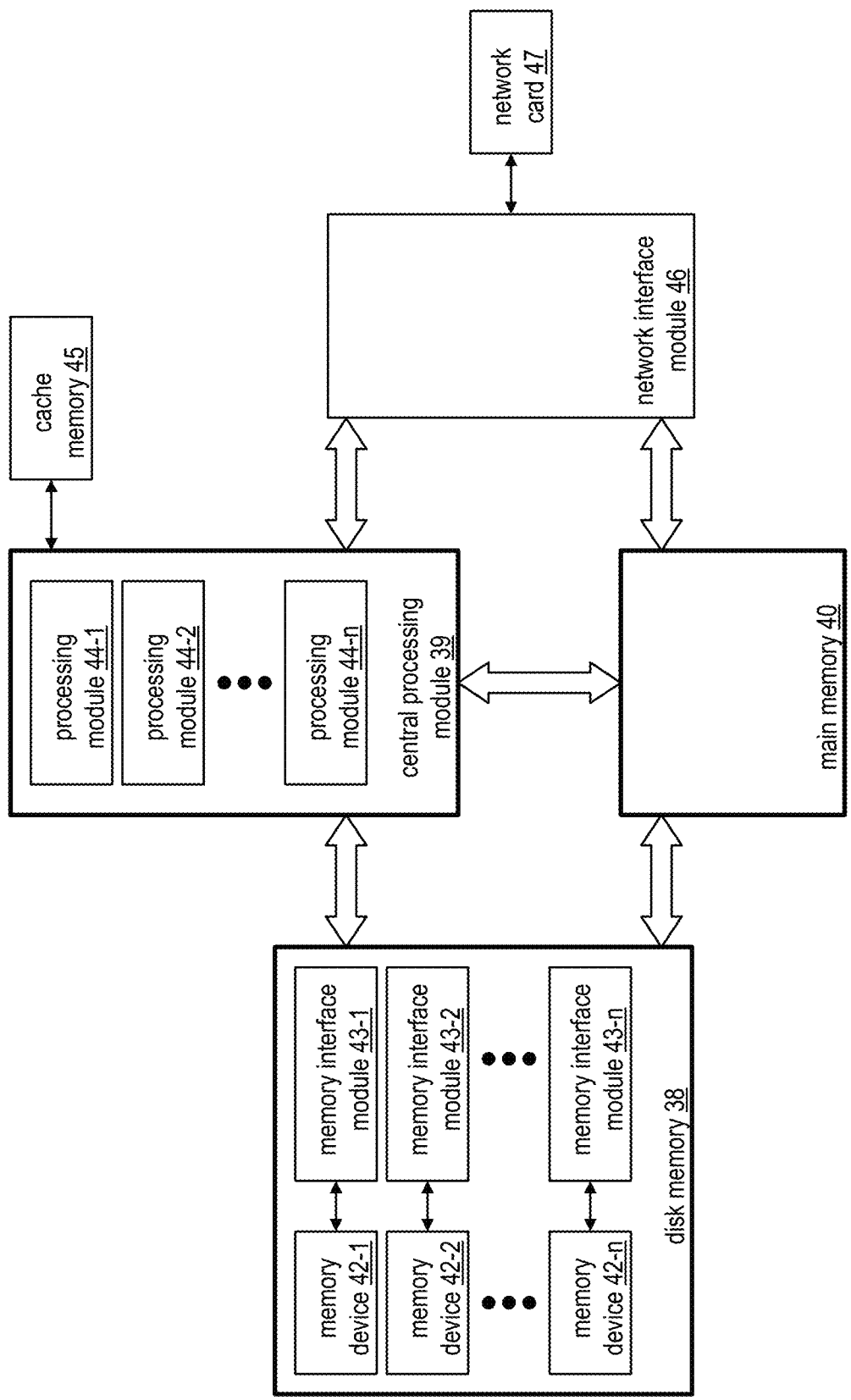
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
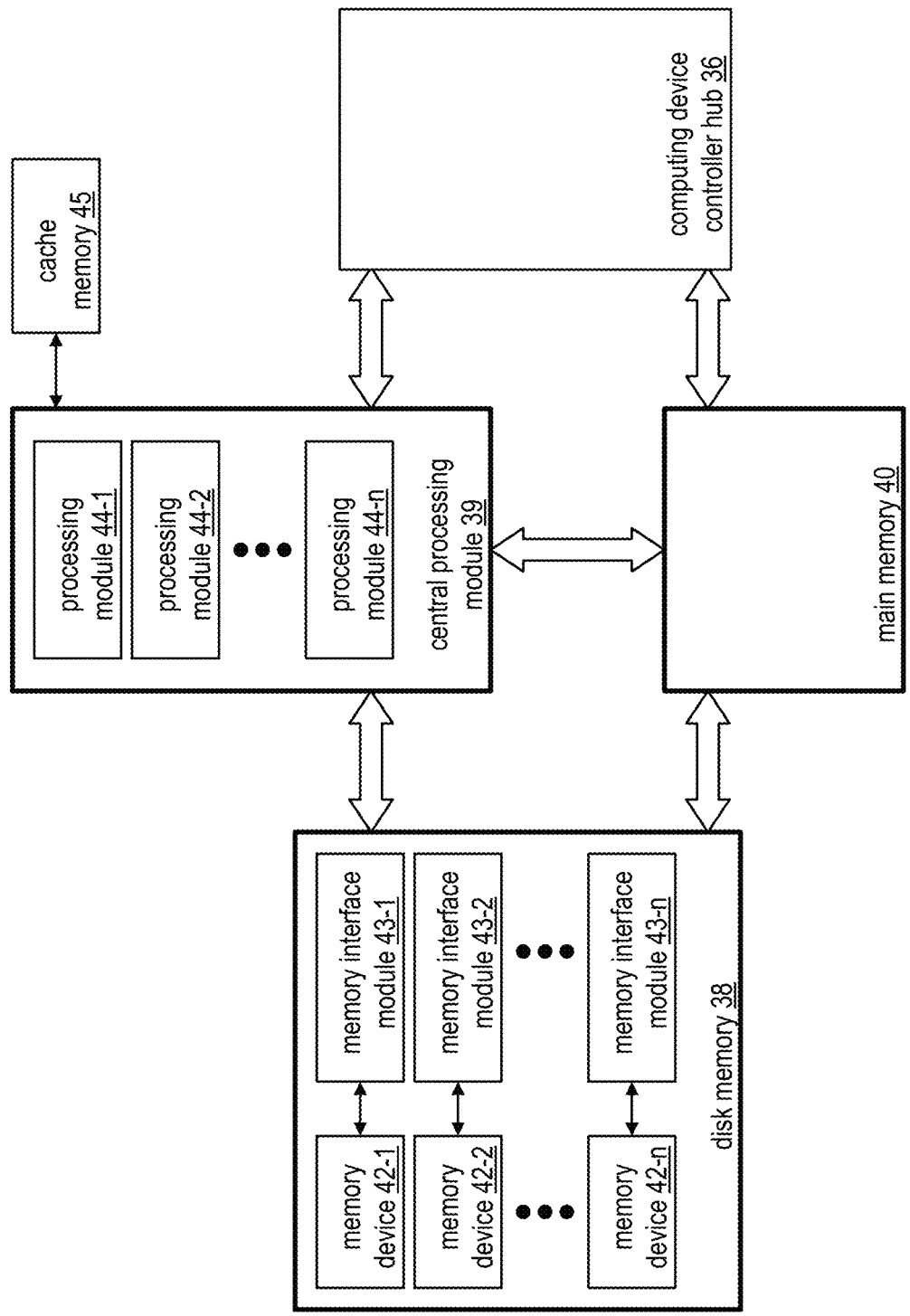
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
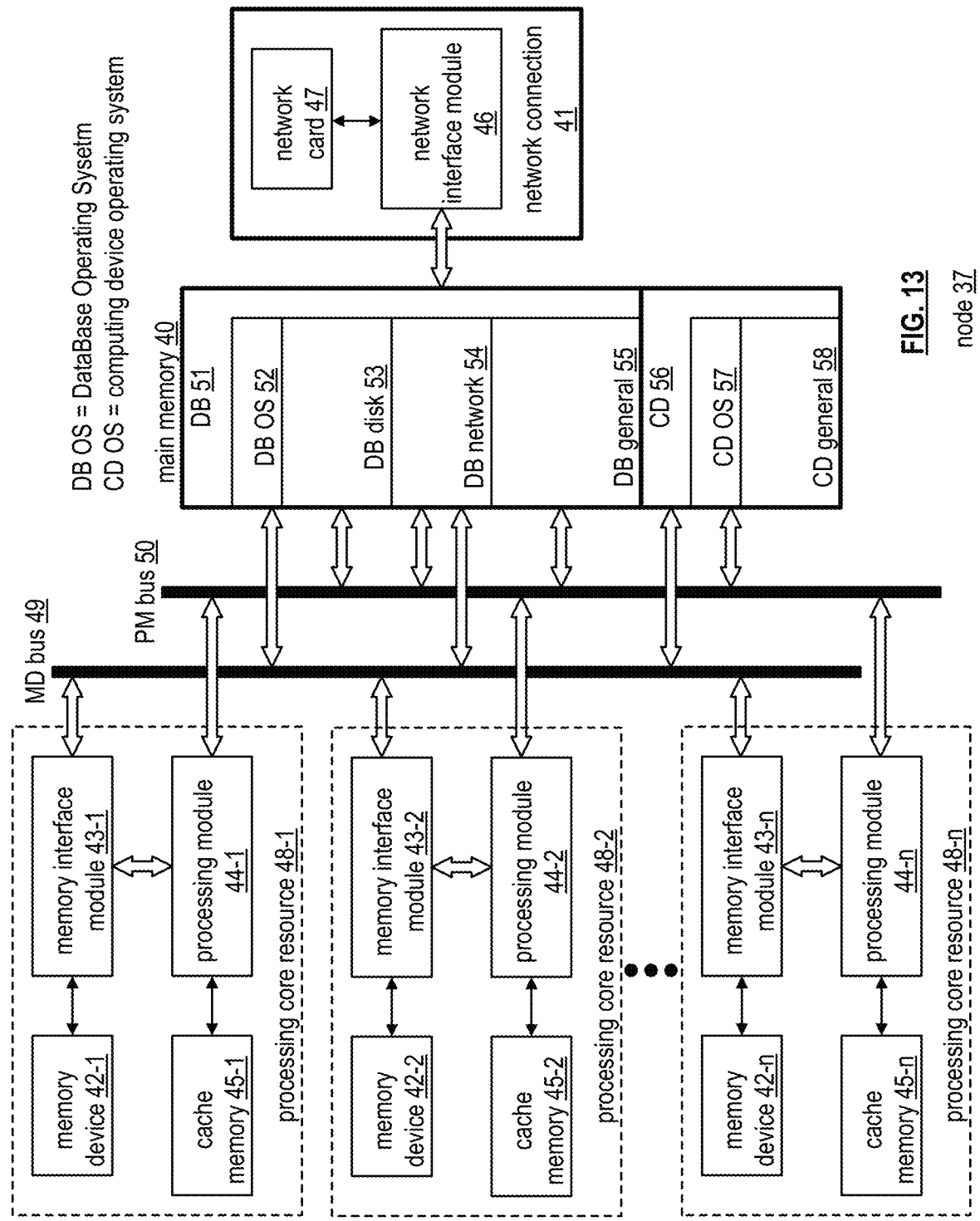
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
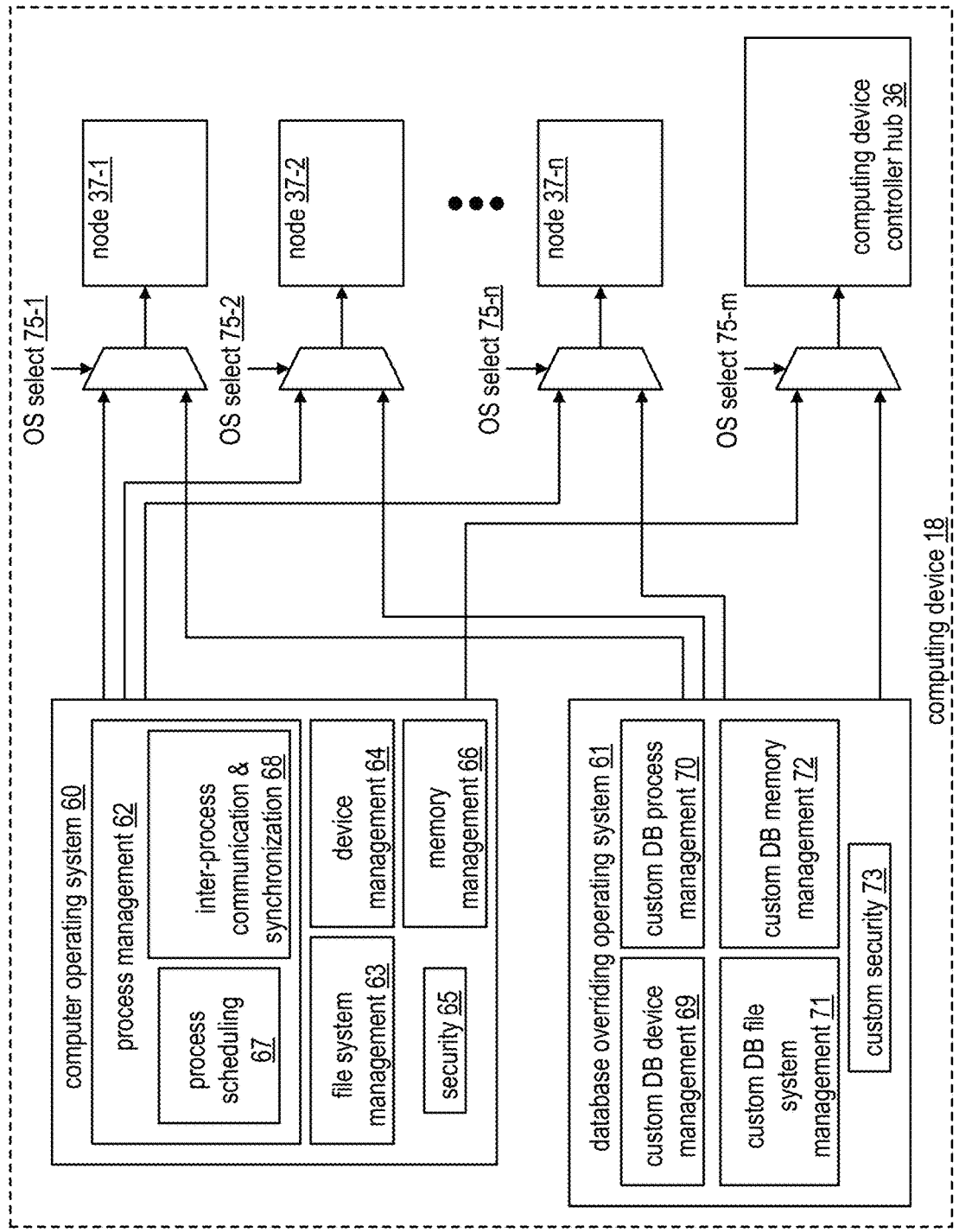
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Terabytes, Petabytes, and/or Exabytes of data. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot be practically be performed by the human mind. In particular, the human mind is not equipped to perform processing of data at a massive scale. Furthermore, the human mind is not equipped to perform multiple independent processes, such as hundreds, thousands, and/or millions of independent processes, in parallel and/or within overlapping time spans. The database system 10 improves the technology of database system by enabling data to be processed at a massive scale efficiently and/or reliably.

In particular, the database system 10 can be operable to receive data and to store received data at a massive scale. For example, the parallelized retrieval of data and/or query processing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot be practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records massive scale in conjunction with query execution, where millions, billions, and/or trillions of records that collectively include many Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale cannot be practically be performed by the human mind. The processing of queries at this massive scale improves database system by facilitating greater depth and/or insights of query resultants for queries performed upon this massive scale of data.

Furthermore, the database system 10 can be operable to perform multiple queries concurrently upon data at a massive scale. For example, the parallelized retrieval and processing data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot be practically be performed by the human mind. The processing of concurrent queries improves database system by facilitating greater numbers of users and/or greater numbers of analyses to be serviced within a given time frame and/or over time.

Figure 15:
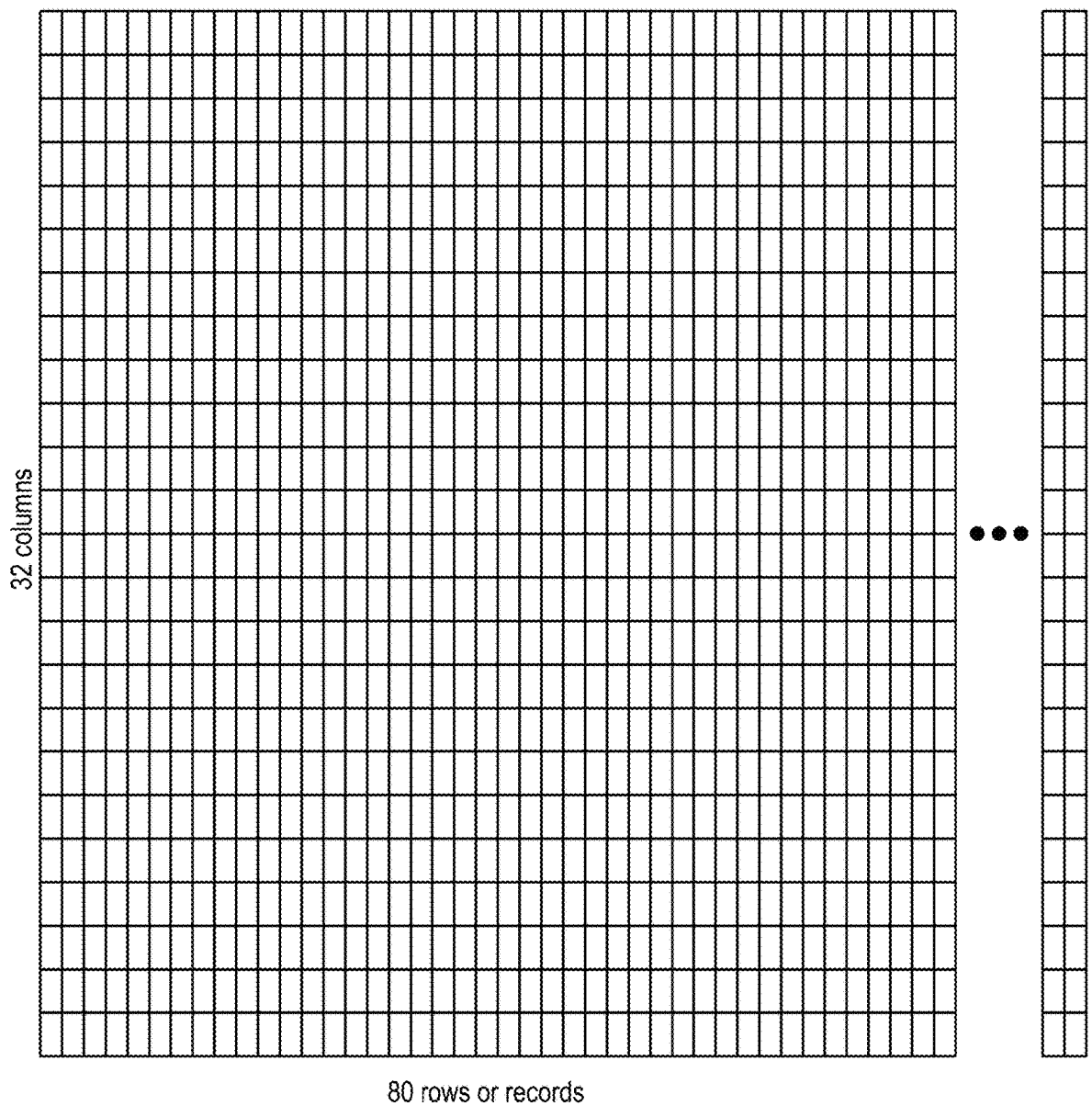

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
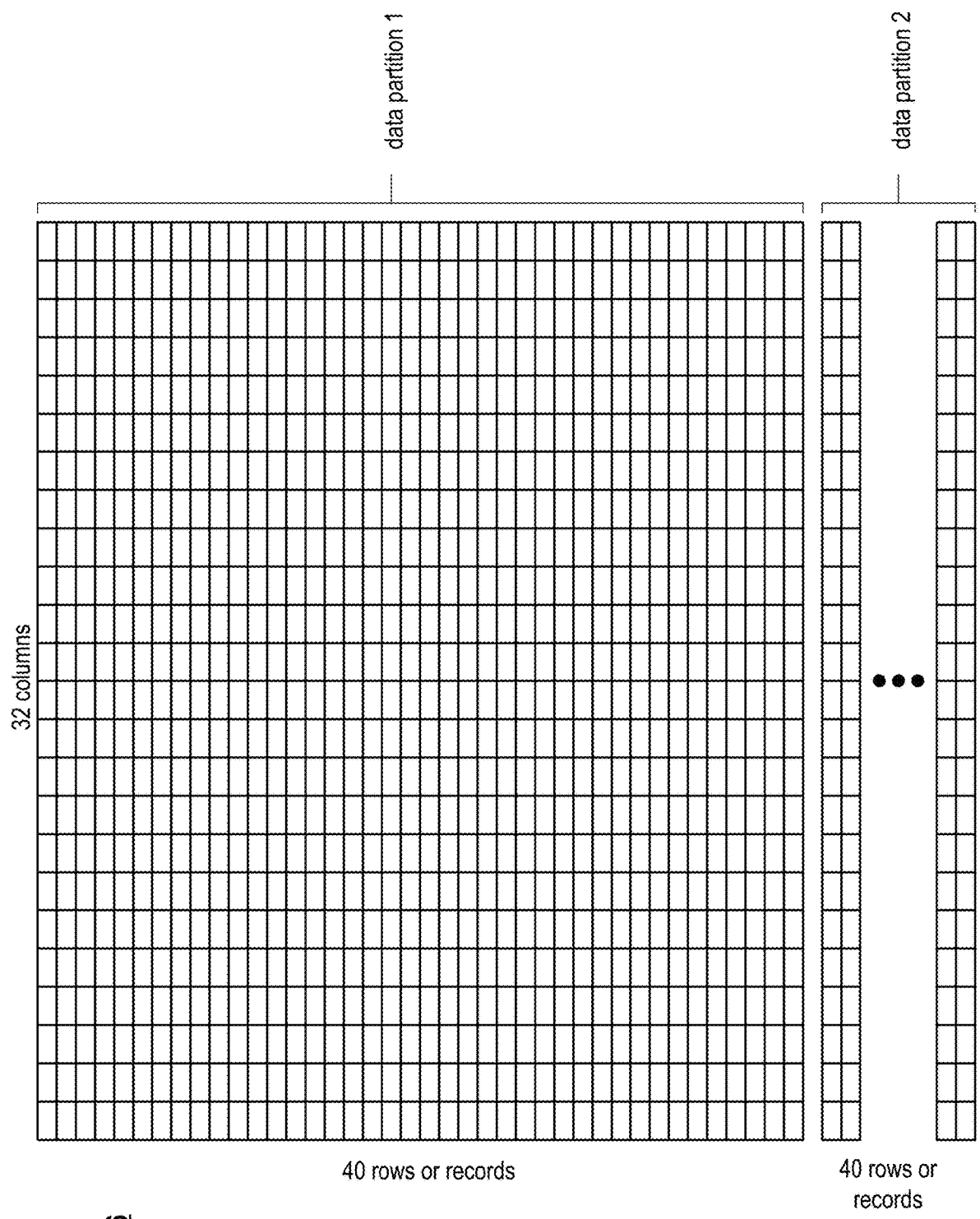

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
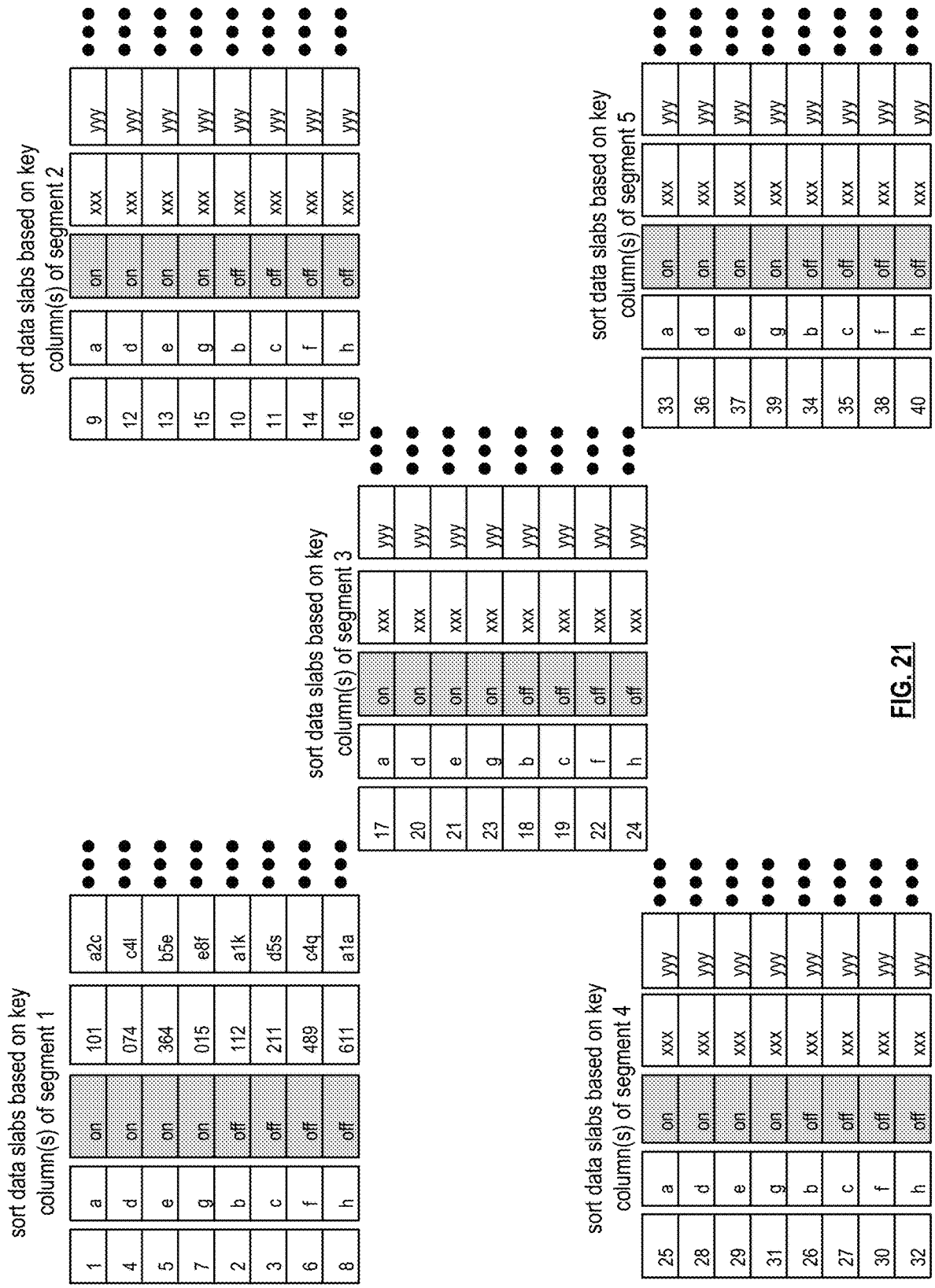

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
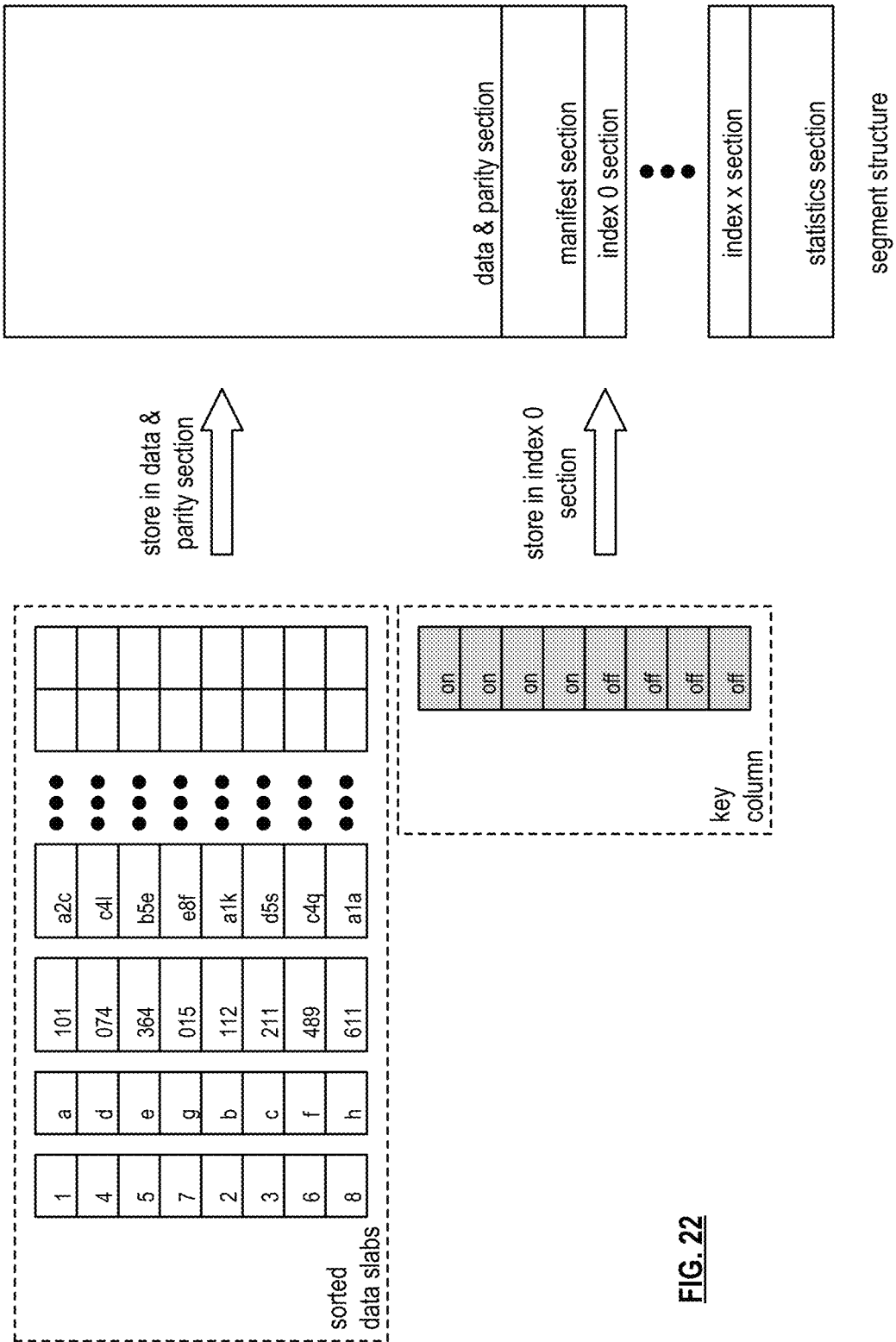

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited to, number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
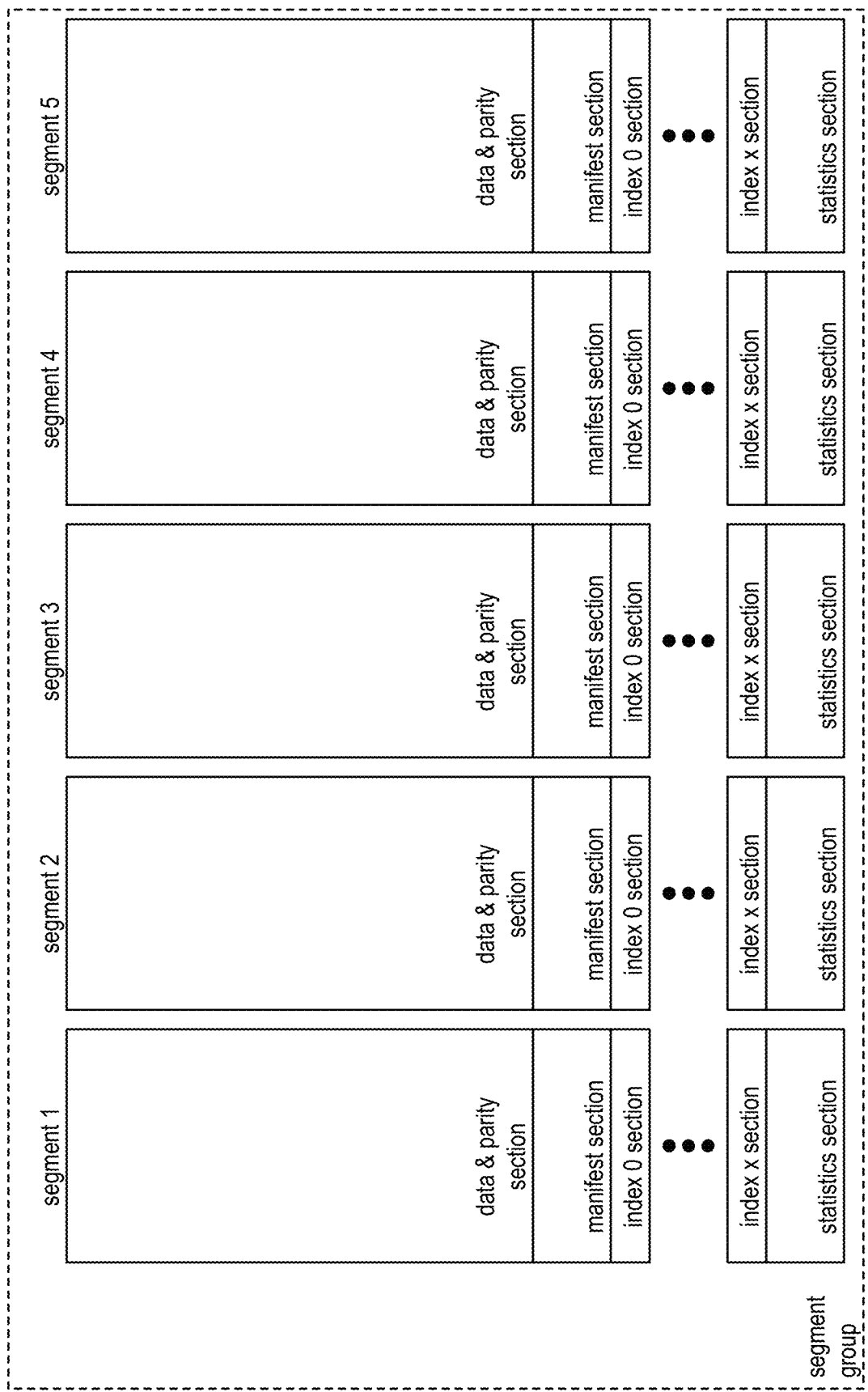

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
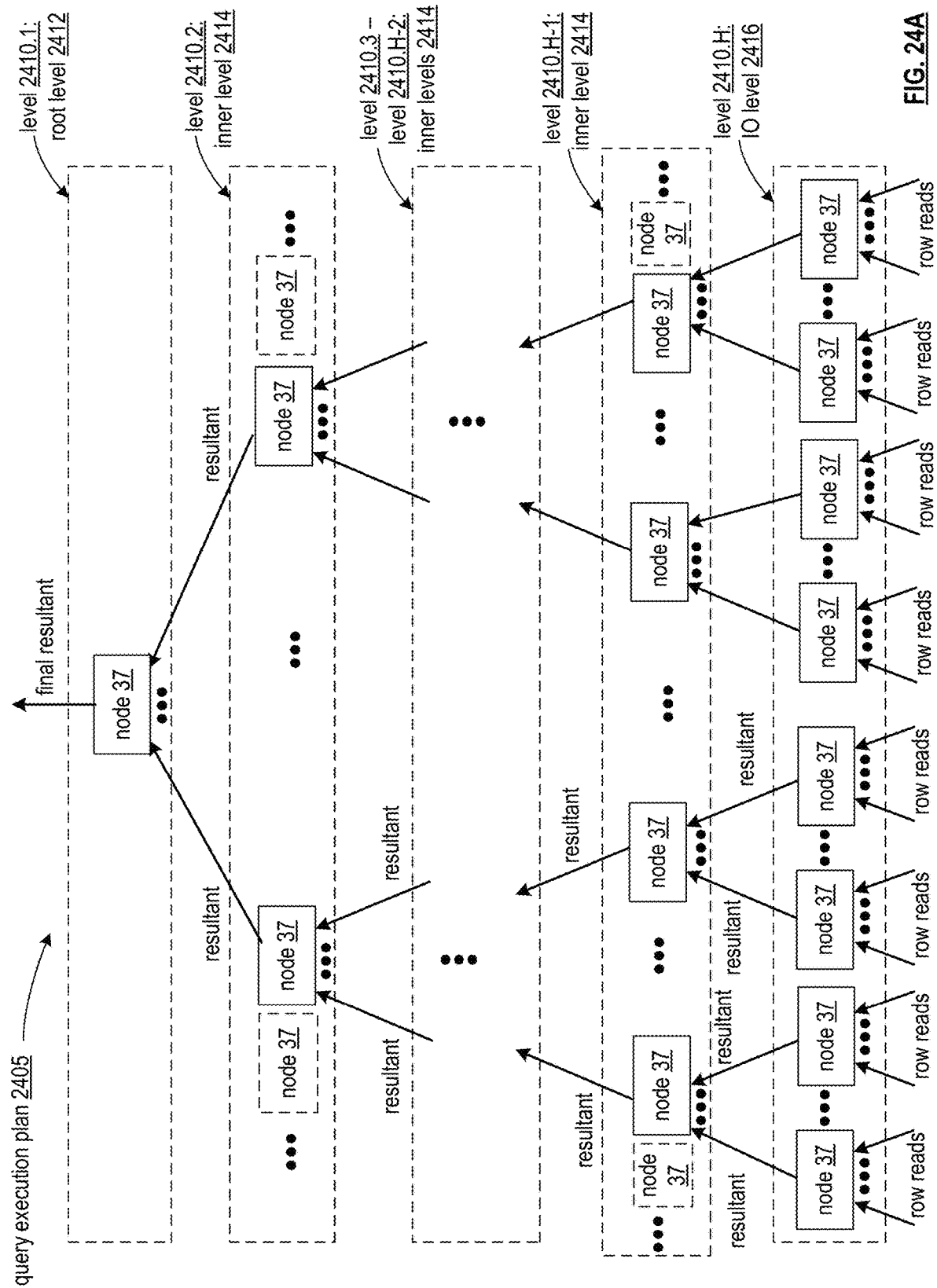
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
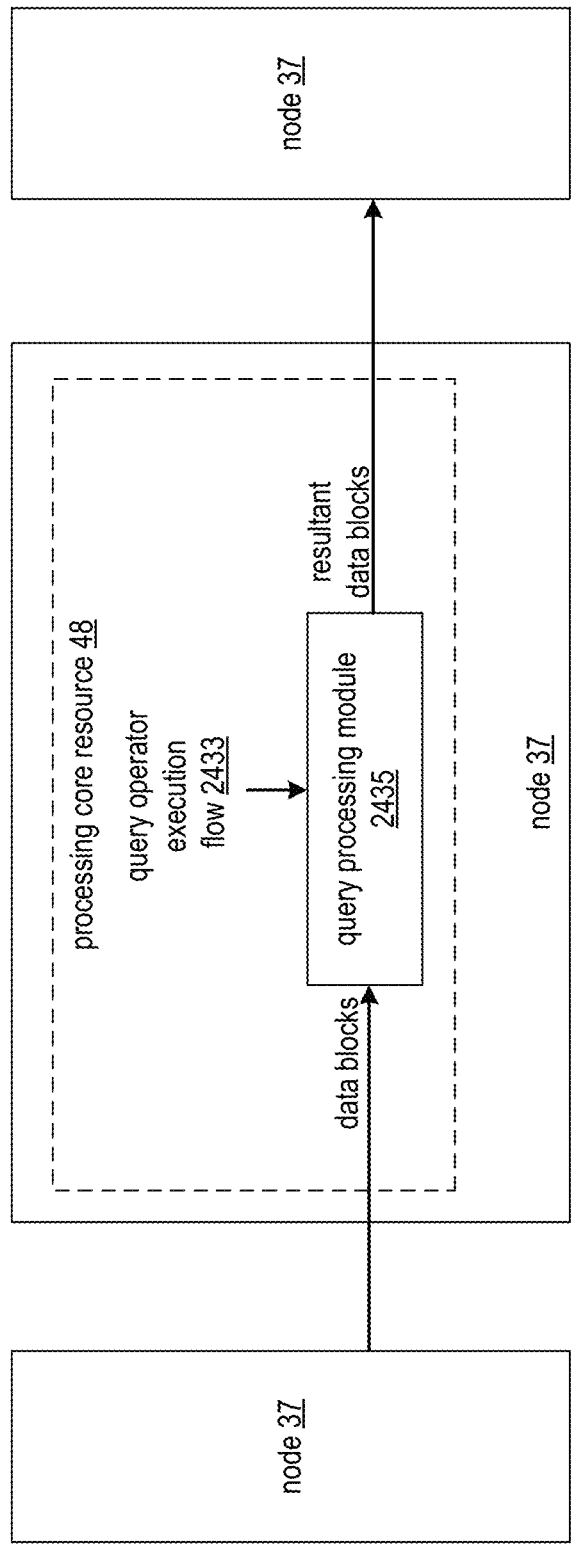
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-$n$ of a same node 37 can be executing at least one query concurrently via their own query processing module 2435, where a single node 37 implements each of set of operator processing modules 2435-1-2435-$n$ via a corresponding one of the set of processing core resources 48-1-48-$n$. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
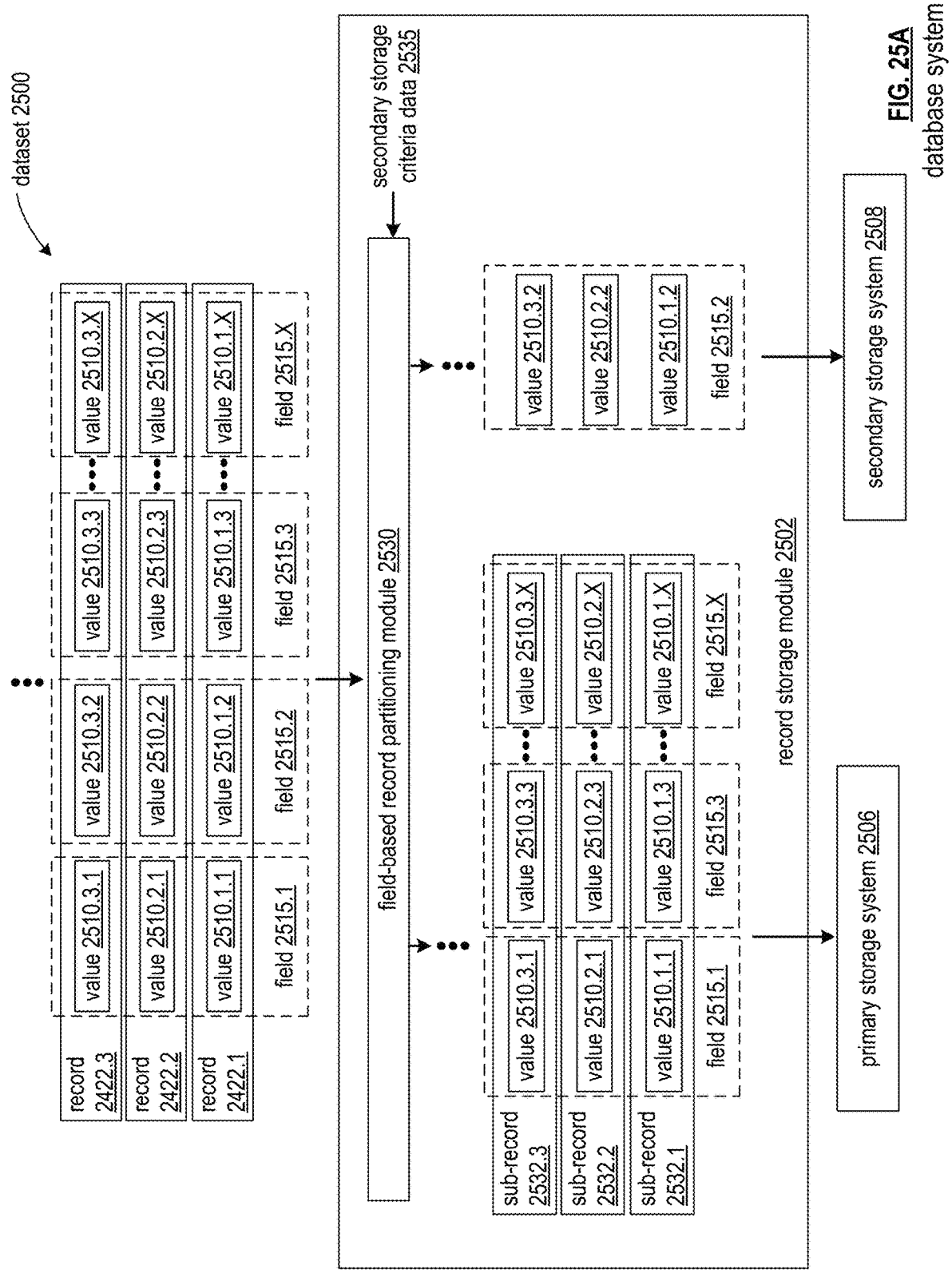
FIG. 25A is a schematic block diagram of a database system that stores records via a primary storage system and a secondary storage system by implementing a record storage module in accordance with various embodiments of the present invention.
Figure 25B:
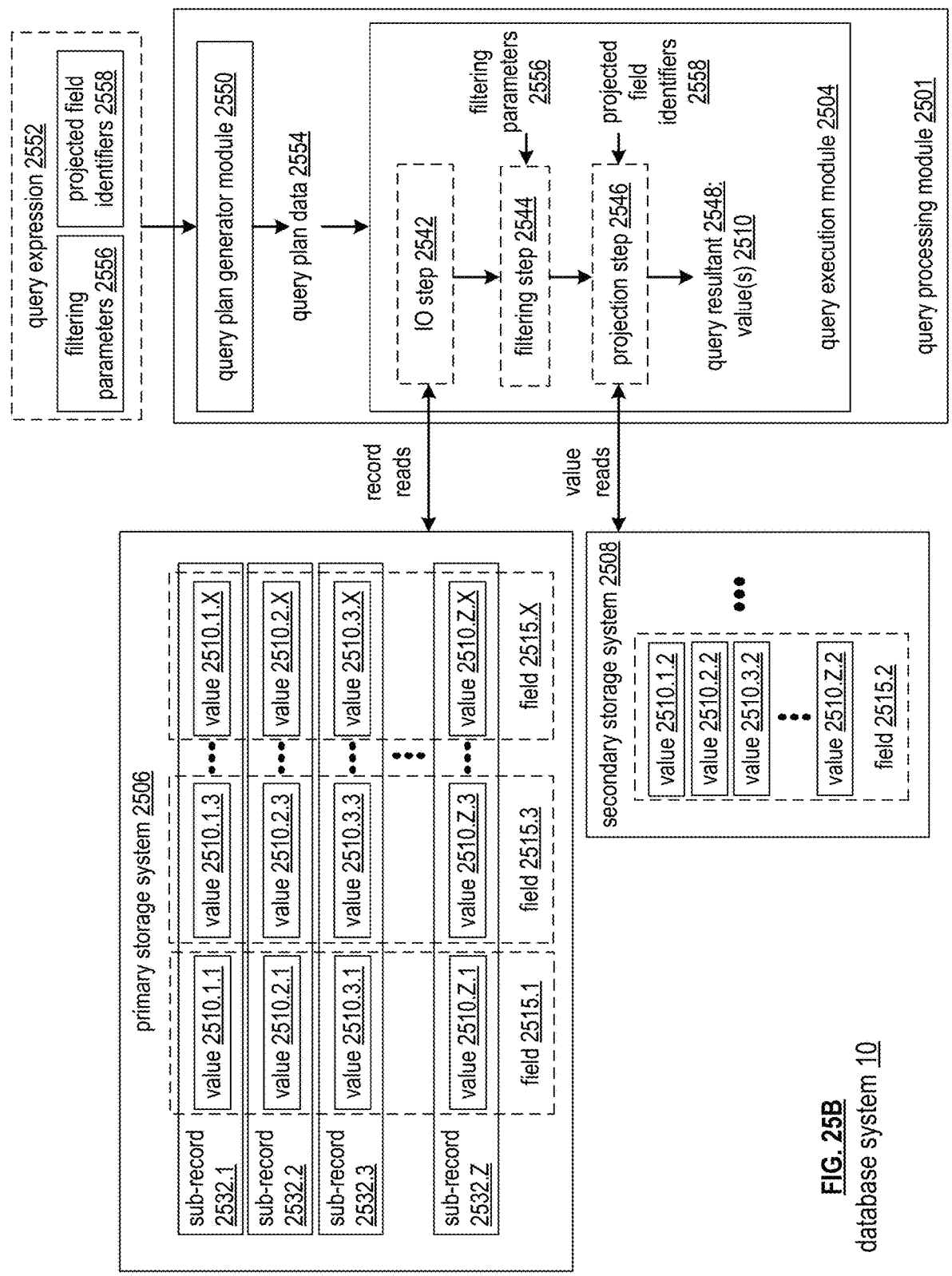
FIGS. 25B-25D are schematic block diagrams of a database system that implements a query processing module that accesses the primary storage system and a secondary storage system in query execution in accordance with various embodiments of the present invention.
Figure 25C:
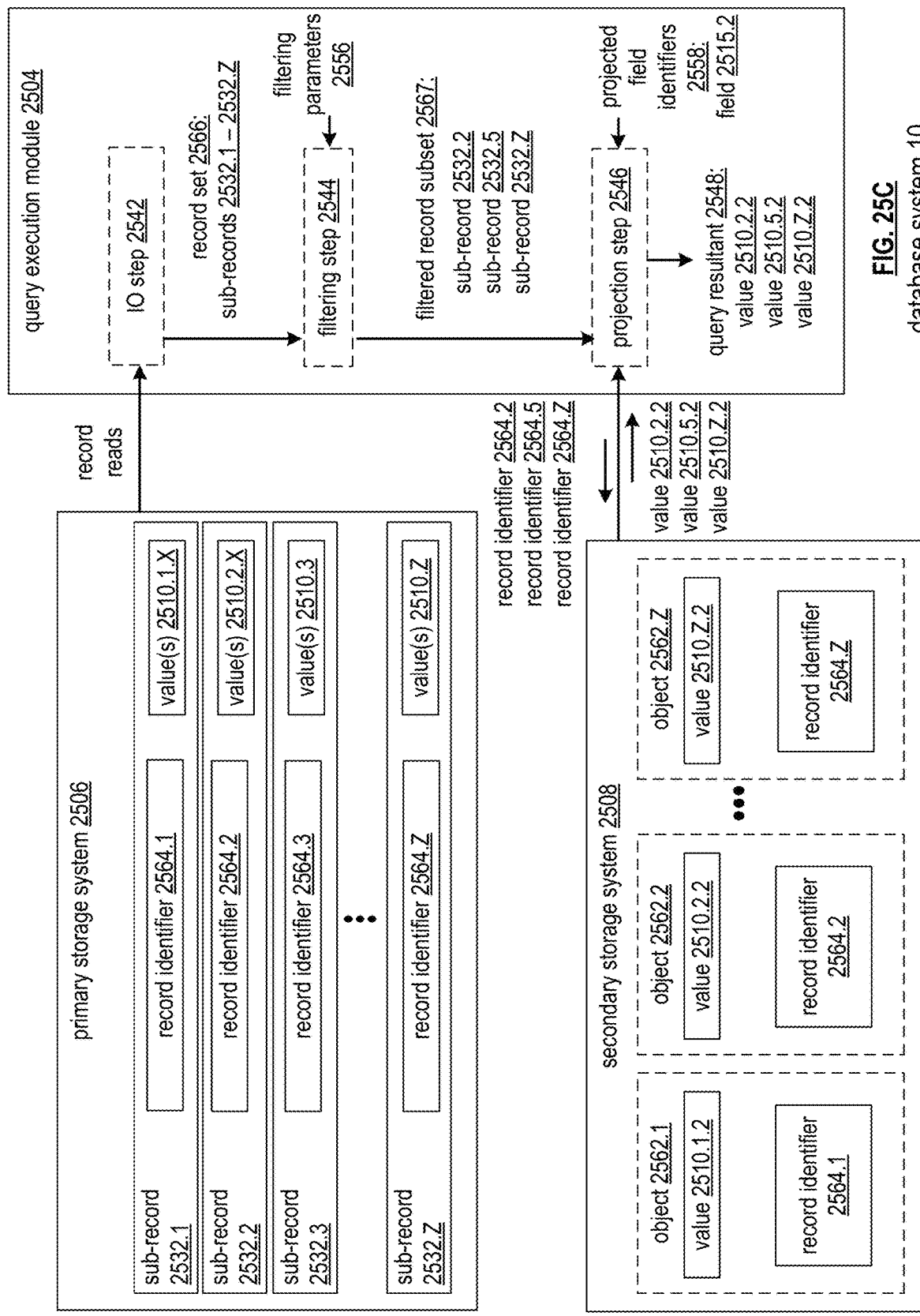

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-$n$ of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
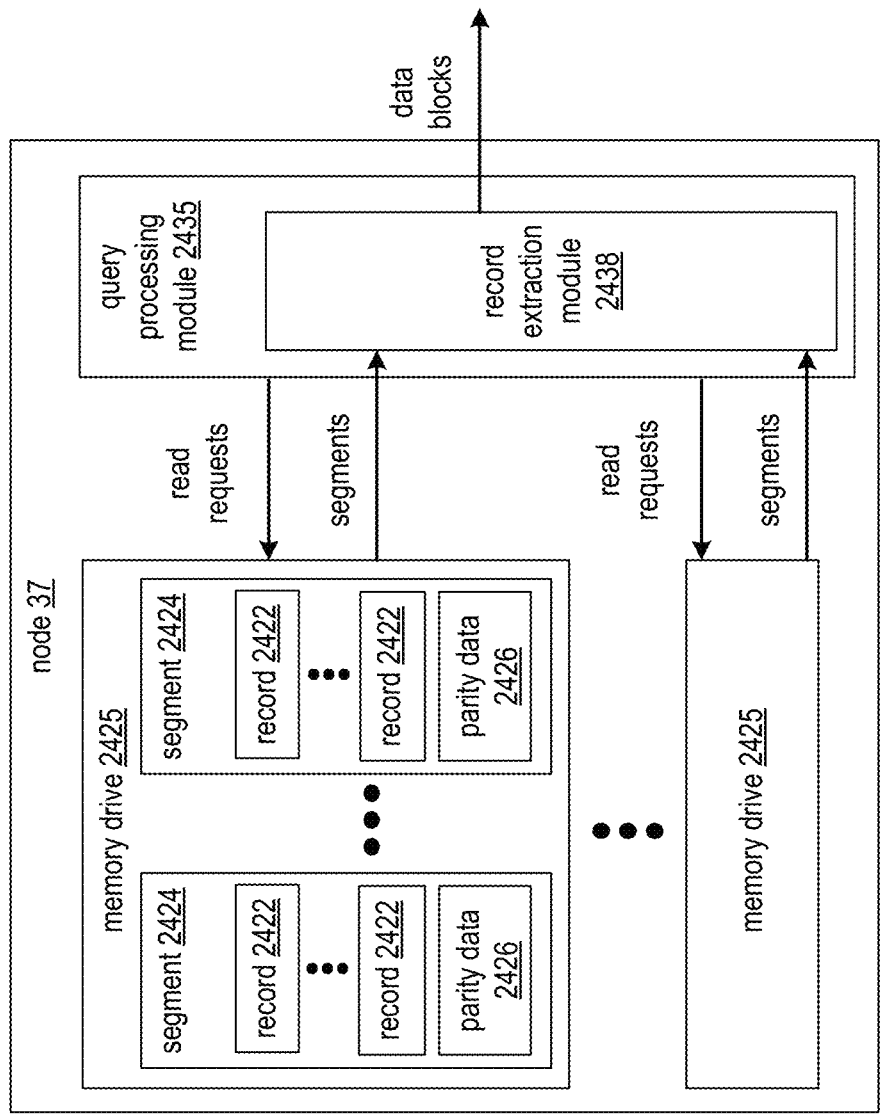
Figure 24D:
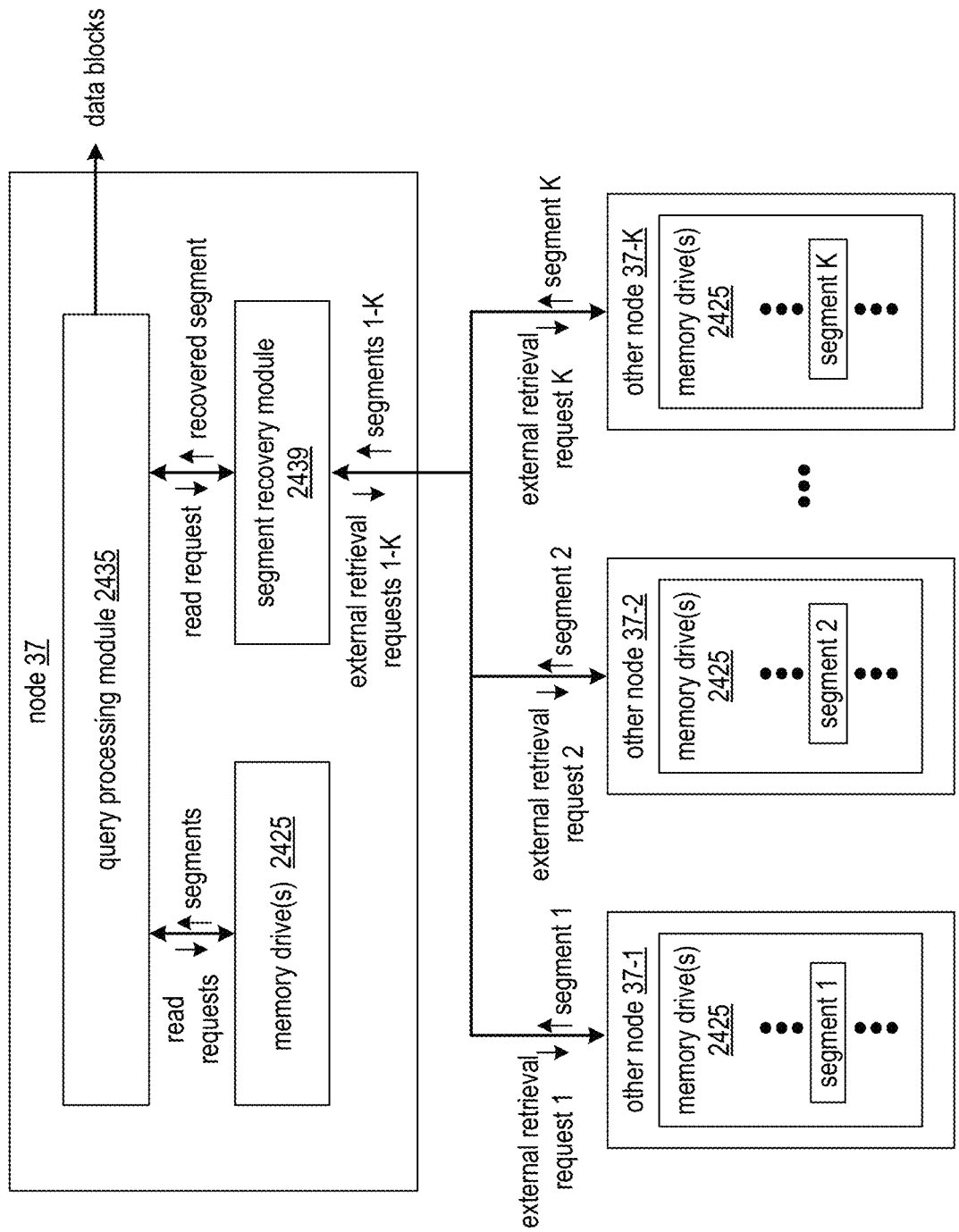

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. This can be achieved based on accessing parity data 2426 stored in segment 2424. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

FIGS. 25A-25G present embodiments of a database system 10 that stores records, such as records 2422, rows of a database table, and/or other records of one or more data sets via multiple storage mechanisms. In particular, different fields of records in a given dataset, such as particular columns of a database table, can be stored via different storage mechanisms. Some or all features and/or functionality of the database system 10 discussed in conjunction with FIGS. 25A-25G can be utilized to implement any embodiment of database system 10 discussed herein.

Storing different fields via different storage mechanisms in this fashion can be particularly useful for datasets stored by database system 10 that have large binary data and/or string data populating one or more fields. For example, a field of a set of records in dataset can be designated to and/or large files such as multimedia files and/or extensive text. This data is often only required for projections in query execution, for example, where access to this data is not required in evaluating query predicates or other filtering parameters. Rather than storing this data via the same resources and/or mechanism utilized for storage of other fields of the dataset, such as fields corresponding to structured data and/or data utilized in query predicates to filter records in query execution to render a query resultant, this large and/or unstructured data can be stored via different resources and/or via a different mechanism. As a particular example, the large and/or unstructured data can be stored as objects via an object storage system that is implemented by memory resources of the database system 10 and/or that is implemented via a third party service communicating with the database system 10 via at least one wired and/or wireless network, such as one or more external networks 17.

By storing the large data of particular data fields separately, this data can be accessed separately from the remainder of records in query execution, for example, only when it is needed. Furthermore, the large data can be stored in a more efficient manner than in column-formatted segments with the remainder of fields of records, for example, as discussed in conjunction with FIGS. 15-23. In particular, the memory resources of nodes 37 that retrieve records during IO in query execution, such as memory drives 2425 of nodes 37 as illustrated in FIG. 24C, can be alleviated from the task of storing these large data fields that aren't necessary in IO and/or filtering in the query.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Storing and accessing different fields via different storage mechanisms based on size and/or data type of different fields in this fashion as presented in FIGS. 25A-25G improves the technology of database systems by increasing query processing efficiency, for example, to improve query execution speeds based reducing the amount of data that needs to be access and passed during query execution due to fields containing large data only being accessed as a final step of a query via a completely separate storage mechanism. Storing and accessing different fields via different storage mechanisms based on size and/or data type of different fields in this fashion improves the technology of database systems by increasing memory resource efficiency by reducing the amount of data that needs to be stored by the more critical resources that access memory frequently, such as nodes 37 at IO level 2416, which can improve resource allocation and thus improve performance of these nodes 37 in query execution.

This can be particularly useful in massive scale databases implemented via large numbers of nodes, as greater numbers of communications between nodes are required, and minimizing the amount of data passed and/or improving resource allocation of individual nodes can further improve query executions facilitated across a large number of nodes, for example, participating in a query execution plan 2405 as discussed in conjunction with FIG. 24A. Storing and accessing different field via different storage mechanisms based on size and/or data type of different fields in this fashion further improves the technology of database systems by enabling processing efficiency and/or memory resource allocation to be improved for many independent elements, such as a large number of nodes 37, that operate in parallel to ensure data is stored and/or that queries are executed within a reasonable amount of time, despite the massive scale of the database system.

As another example, sensitive data fields, such as data fields with stricter security requirements than other data fields and/or data fields requiring encryption, can be stored via a different storage mechanism data in a same or similar fashion, separate from fields that are less sensitive, have looser security requirements, and/or that do not require encryption. Storing and accessing different fields via different storage mechanisms based on the sensitivity and/or security requirements of different fields in this fashion improves the technology of database systems by providing more secure storage and access to sensitive data that is stored separately, while still processing queries efficiently and guaranteeing query correctness.

FIG. 25A presents an embodiment of database system 10 that can be utilized to implement some or all of this functionality. As illustrated in FIG. 25A, one or more datasets 2500 that each include a plurality of records 2422 can be received by a record storage module 2502 of database system 10 that is operable to store received records of dataset 2500 in storage resources of database system 10 for access during query execution. The plurality of records 2422 of a given dataset 2500 can have a common plurality of X fields 2515.1-2515.X, for example, in accordance with a common schema for the dataset. For example, the plurality of fields 2515.1-2515.X can correspond to X columns of a database table corresponding to the dataset and/or the plurality of records can correspond to rows of this database table.

The dataset 2500 can be received by the record storage module 2502 as a stream of records received from one or more data sources over time via a data interface and/or via a wired and/or wireless network connection, and/or can be received as a bulk set of records that are optionally stored via a single storage transaction. The record storage module 2502 can be implemented by utilizing the parallelized ingress sub-system 11 of FIG. 4, for example, where dataset 2500 is implemented as data set 30-1 and/or data set 30-2, and/or where dataset 2500 is received utilizing one or more network storage systems 21 and/or one or more wide area networks 22. The record storage module 2502 can be implemented by any one or more computing devices 18, such as plurality of computing devices that each receive, process and/or store their own subsets of dataset 2500 separately and/or in parallel. The record storage module 2502 can be implemented via at least one processor and at least one memory, such as processing and/or memory resources of one or more computing devices 18 and/or any other processing and/or memory resources of database system 10. For example, the at least one memory of record storage module 2502 can store operational instructions that, when executed by the at least one processor of the record storage module 2502, cause the record storage module 2502 to perform some or all functionality of record storage module 2502 discussed herein.

As illustrated in FIG. 25A, data values 2510 for a first subset of these fields can be stored via a primary storage system 2506, and data values 2510 for a second subset of these fields can be stored via a secondary storage system 2508. The first subset and second subset can be collectively exhaustive with respect to the set of fields, for example, to ensure that data values of all fields in the dataset 2500 are stored.

The primary storage system 2506 can be implemented to store values for fields included in the first subset of fields via a first storage mechanism, for example, by utilizing a first set of memory devices, a first set of storage resources, a first set of memory locations, and/or a first type of storage scheme. The secondary storage system 2508 can be implemented to store values for fields included in the second subset of fields via a second storage mechanism, for example, by utilizing: a second set of memory devices that are different from some or all of the first set of memory devices of the first storage mechanism; a second set of storage resources that are different from some or all of the first set of storage resources of the first storage mechanism; a second set of memory locations that are different from some or all of the first set of memory locations of the first storage mechanism; and/or a second type of storage scheme that is different from the first type of storage scheme.

In some embodiments, the primary storage system 2506 can be implemented utilizing faster memory resources that enable more efficient access to its stored values as required for IO in query execution. The secondary storage be implemented utilizing slower memory resources than those of the primary storage system 2506, as less efficient access to the values for projection is required in query execution. For example, the primary storage system 2506 is implemented via a plurality of non-volatile memory express (NVMe) drives, the secondary storage system 2508 is implemented via an object storage system and/or a plurality of spinning disks, and the plurality of NVMe drives enable more efficient data access than the object storage system and/or the plurality of spinning disks.

Alternatively or in addition, the primary storage system 2506 can be implemented utilizing more expensive memory resources, for example that require greater memory utilization and/or have a greater associated cost for storing records and/or data values, and the secondary storage be implemented utilizing less expensive memory resources than those of the primary storage system 2506 that require less memory utilization and/or have a lower associated cost to store records and/or data values. For example, the primary storage system 2506 is implemented via a plurality of NVMe drives corresponding to more expensive memory resources than an object storage system and/or a plurality of spinning disks utilized to implement the secondary storage system 2508.

Alternatively or in addition, the primary storage system 2506 can be implemented via a plurality of memory drives 2425 of a plurality of nodes 37, such as some or all nodes 37 that participate at the IO level 2416 of query execution plans 2405. For example, the primary storage system 2506 is implemented via a plurality NVMe drives that implement the memory drives 2425 of the plurality of nodes 37. In such embodiments, the secondary storage system 2508 can be implemented by plurality of memory drives 2425 of different plurality of nodes 37, is optionally not implemented by any memory drives 2425 of nodes 37 that participate at IO level 2416, and/or is optionally not implemented by any memory drives 2425 of any nodes 37 of computing devices 18 of database system 10. Such embodiments are discussed in further detail in conjunction with FIG. 25G.

Alternatively or in addition, the primary storage system 2506 can be implemented via a storage scheme that includes generating a plurality of segments 2424 for storage, for example, by performing some or all of the steps discussed in conjunction with FIGS. 15-23 to generate segments. In such embodiments, the secondary storage system 2508 is implemented via a different storage scheme, for example, that does not include generating a plurality of segments 2424 for storage. Such embodiments are discussed in further detail in conjunction with FIG. 25F.

Alternatively or in addition, the primary storage system 2506 can be implemented via a storage scheme that utilizes a non-volatile memory access protocol, such as a non-volatile memory express (NVMe) protocol. In such embodiments, the secondary storage system 2508 is implemented via a different storage scheme, for example, that does not utilize a non-volatile memory access protocol and/or that utilizes a different non-volatile memory access protocol.

Alternatively or in addition, the secondary storage system 2508 is implemented via an object storage system, where data values of fields stored in the secondary storage system 2508 are stored as objects and/or where data values of fields stored in the secondary storage system 2508 are accessed via a communication and/or access protocol for the object storage system. In such embodiments, the primary storage system 2506 is implemented via a different storage scheme, for example, that is not implemented as an object storage system. For example, the primary storage system 2506 can instead corresponds to a file storage system. Such embodiments are discussed in further detail in conjunction with FIG. 25C and FIG. 25D.

Alternatively or in addition, the secondary storage system 2508 is implemented via a storage scheme that includes securely storing and/or encrypting the values of corresponding fields in the second subset of fields for storage via secondary storage system 2508. These values can be decrypted and/or retrieved securely when read from secondary storage system 2508 for projection in query resultants. In such embodiments, the primary storage system 2506 is implemented via a different storage scheme, for example, that does not include encrypting values of the corresponding fields in the first subset of fields for storage via primary storage system 2506 and/or that includes storing the values via a looser security level than the secure storage of the secondary storage system 2508.

Alternatively or in addition, the primary storage system 2506 implements a long term storage system that is implements storage of a database for access during query executions in all, most, and/or normal conditions. In such embodiments, the secondary storage system 2508 is not implemented as a long term storage system and/or in any, most, and/or normal conditions. For example, the secondary storage system 2508 is only accessed to access and/or decrypt large data for projection. As another example, the secondary storage system 2508 is only and/or usually accessed to recover data stored via primary storage system 2506, and/or is implemented as redundant storage for primary storage system 2506. Such embodiments are discussed in further detail in conjunction with FIGS. 26A-27E.

The data values 2510 of the first subset of fields can still maintain a record-based structure in the storage scheme of primary storage system 2506 as sub-records 2532, where data values belonging to same records 2422 preserve their relation as members of the same record 2422. For example, a sub-record 2532 is stored for each record 2422 in primary storage system 2506, where a set of Z sub-records 2532.1-2532.Z are stored in primary storage system 2506 based on the dataset 2500 including a set of Z corresponding records 2422.1-2422.Z.

Sub-records 2532 do not include values for field 2515.2 based on field 2515.2 not being stored in primary storage system 2506, but can include values for all fields of the first subset of these fields, such as field 2515.1 and/or some or all of fields 2515.3-2515.X. The set of data values 2510 of a given sub-record can be stored collectively, can be recoverable from a storage format of the primary storage system, and/or can otherwise be mapped to a same record and/or identifier indicating these values are all part of the same original record 2422. For example, the plurality of sub-records 2532 can be stored in a column-based format in one or more segments 2424, where all values of a given sub-record are all stored in a same segment 2424 and/or in a same memory drive 2425. Values of various fields 2515 of the sub-records 2532 can be accessed where the identifier and/or other information regarding the original record 2422 is optionally utilized to perform access to a particular record and/or is preserved in conjunction with the retrieved value.

The data values 2510 of the second subset of fields can be stored separately, for example, as distinct objects of an object storage system. In some embodiments, multiple fields 2515 are included in the second subset of fields based on multiple fields having large data types and/or data types that meet the secondary storage criteria data 2535. Values of these multiple fields for same records 2422 can be stored as sub-records and/or can be stored together and/or can be mapped together in secondary storage system 2508. Alternatively, values of these multiple fields for same records 2422 can be stored separately, for example, as distinct objects of an object storage system, despite their original inclusion in a same record 2422.

The first subset of fields and second subset of fields can be determined and/or data values of records 2422 in dataset 2500 can be extracted, partitioned in accordance with the first and second subset of fields, and/or structured for storage via primary storage system 2506 and secondary storage system 2508, respectively, by utilizing a field-based record partitioning module 2530. The field-based record partitioning module 2530 can be implemented via at least one processor and at least one memory, such as processing and/or memory resources of one or more computing devices 18 and/or any other processing and/or memory resources of database system 10.

The field-based record partitioning module 2530 can utilize secondary storage criteria data 2535 indicating identifiers of, types of, sizes of, and/or other criteria identifying which fields of one or more datasets 2500 be selected for inclusion in the first subset of fields and/or which fields of one or more datasets 2500 be selected for inclusion in the second subset of fields. This secondary storage criteria data 2535 can be: automatically generated by the record storage module 2502; received by the record storage module 2502; stored in memory accessible by the record storage module 2502; configured via user input; and/or otherwise determined by the record storage module 2502.

As a particular example, a user and/or administrator can configure: which particular fields of one or more particular datasets 2500 be stored in primary storage system 2506; which particular fields of one or more particular datasets 2500 be stored in secondary storage system 2508; which types of fields be stored in secondary storage system 2508; which data types for data values of fields be stored in primary storage system 2506; which data types for data values of fields be stored in secondary storage system 2508; which file type and/or file extensions for data values of fields be stored in secondary storage system 2508; which maximum, minimum, and/or average sizes of data values correspond to a threshold size requiring that a corresponding field be stored in secondary storage system 2508; and/or other criteria designating which fields be stored in secondary storage system.

In some embodiments, the user enters this information configuring secondary storage criteria data 2535 via an interactive interface presented via a display device of a client device that is integrated within database system 10, that communicates with database system 10 via a wired and/or wireless connection, and/or that executes application data corresponding to database system 10. Alternatively or in addition, the secondary storage criteria data 2535 is configured by utilizing administrative sub-system 15 and/or configuration sub-system 16.

The same secondary storage criteria data 2535 can be applied to multiple different datasets 2500, such as all datasets 2500. Alternatively different datasets 2500 can have different secondary storage criteria data 2535. For example, the same or different users can configure secondary storage criteria data 2535 for particular datasets 2500.

In this example, and in the further examples presented via FIGS. 25B-25G, field 2515.2 is included in the second subset of fields, while other fields including some or all of field 2515.1 and/or 2515.3-2515.X are included in the first subset of fields. Furthermore, in the further examples presented via FIGS. 25B-25G, field 2515.2 is not included in the first subset of fields. For example, field 2515.2 is included in this second subset of fields, and not in the first subset of fields, based on meeting and/or otherwise comparing favorably to the secondary storage criteria data 2535.

Different datasets 2500 can have different numbers of fields included in the second subset of fields, where a given dataset 2500 can have no fields, a single field, and/or multiple fields included in the second subset of fields. In some cases, all datasets 2500 must include at least one field, and or at least a unique key set of multiple fields, in first subset of fields. The record storage module 2502 can be operable to partition store different numbers of and/or sets of fields for multiple datasets 2500 received for storage in the primary storage system 2506 and secondary storage system 2508 accordingly.

As a particular example, field 2515.2 is included in this second subset of fields accordingly based on having data values 2510 corresponding to large binary data, unstructured data, variable-length data, extensive text data, image data, audio data, video data, multimedia data, document data, application data, executable data, compressed data, encrypted data, data that matches a data type and/or is stored in accordance with a file type and/or file extension indicated in secondary storage criteria data 2535, data that is larger than and/or compares unfavorably to a data size threshold indicated in secondary storage criteria data 2535, data that is very large relative to data values of other fields, data that is only utilized in projections when queries are executed, data that is rarely and/or never utilized in query predicates when queries are executed, data that is sensitive, data with a security requirement that is stricter than and/or compares favorably to a security requirement threshold indicated in secondary storage criteria data 2535, data that requires encryption, and/or data that is otherwise deemed for storage via the secondary storage system 2508 rather than the primary storage system 2506. For example, the secondary storage criteria data 2535 indicates corresponding criteria denoting that field 2515.2 be included in this second subset of fields.

Some or all other fields 2515 are not included in the second subset of fields based on not meeting and/or otherwise comparing unfavorably to the secondary storage criteria data 2535, and are thus included in the first subset of fields. As a particular example, some or all of fields 2515.1 and/or 2515.3-2515.X are not included in this second subset of fields accordingly based on having data values 2510 that correspond to fixed-length data values, primitive data types, simple data types, data that does not match any data types indicated in secondary storage criteria data 2535, data that is smaller than and/or compares favorably to a data size threshold, data indicated in secondary storage criteria data 2535, data that is small and/or normal in size relative to data values of other fields, data that is always, often, and/or sometimes utilized in query predicates when queries are executed, and/or data that is otherwise deemed for storage via the primary storage system 2506 rather than the secondary storage system 2508.

Some fields that compare unfavorably to the secondary storage criteria data 2535 may still be included in the second subset of fields, for example, in addition to the first subset of fields. For example, one or more fields correspond to a unique key field set and/or fields that otherwise identify corresponding records can optionally be stored in conjunction with the large data of field 2515.2. This can be utilized to identify and retrieve data values 2510 of field 2515.2 for particular records filtered via query predicates, whose data values of field 2515.2 are therefore required to be reflected in the query resultant, based on having a matching set of one or more identifying fields. This ensures that queries are executed correctly, where data values of field 2515.2 for records required to be included in the resultant based on filtering requirements of the corresponding query are identified and retrieved from secondary storage system 2508, and where data values of field 2515.2 for records required to be not included in the resultant based on filtering requirements of the corresponding query are not identified and thus not retrieved from secondary storage system 2508. Storing and utilizing record identifiers to access data values of field 2515.2 from secondary storage system 2508 is discussed in further detail in conjunction with FIG. 25C and FIG. 25D.

FIG. 25B illustrates an embodiment of a database system 10 that implements a query processing system 2501 that accesses a primary storage system 2506 and/or secondary storage system 2508. Some or all features and/or functionality of the database system 10 of FIG. 25B can be utilized to implement the database system 10 of FIG. 25A and/or any other embodiment of the database system 10 described herein. The primary storage system 2506 and/or secondary storage system 2508 of FIG. 25B can be implemented as the primary storage system 2506 and/or secondary storage system 2508 of FIG. 25A. The query processing system 2501 of FIG. 25B can be implemented to execute queries against one or more datasets, including dataset 2500 of FIG. 25A once it is stored via primary storage system 2506 and/or secondary storage system 2508 via record storage module 2502 of FIG. 25A.

The query processing system 2501 can be implemented by utilizing the parallelized query and results sub-system 13 of FIG. 5. The query processing system 2501 can be implemented by any one or more computing devices 18, such as plurality of nodes 37 of a plurality of computing devices that process queries separately and/or in parallel, for example, in accordance with participation in a query execution plan 2405. The query processing system 2501 can be implemented via at least one processor and at least one memory, such as processing and/or memory resources of one or more computing devices 18 and/or any other processing and/or memory resources of database system 10. For example, the at least one memory of query processing system 2501 can store operational instructions that, when executed by the at least one processor of the query processing system 2501, cause the query processing system 2501 to perform some or all functionality of query processing system 2501 discussed herein.

Queries can be executed via a query execution module 2504 of the query processing system 2501 based on corresponding query expressions 2552. These query expressions 2552 can received by the query processing system 2501, for example, is by utilizing system communication resources 14 and/or one or more network one or more wide area networks 22; can be configured via user input to interactive interfaces of one or more client devices integrated within and/or communicating with the database system 10 via a wired and/or wireless connection; can be stored in memory accessible by the query processing system 2501; can be automatically generated by the query processing system 2501, and/or can otherwise be determined by the query processing system 10.

The query expression 2552 can correspond to a Structured Query Language (SQL) query and/or can be written in SQL. The query expression 2552 can be written in any query language and/or can otherwise indicate a corresponding query for execution.

A given query expression 2552 can indicate an identifier of one or more datasets including dataset 2500 and/or can otherwise indicate the query be executed against and/or via access to records of dataset 2500.

A given query expression 2552 can include filtering parameters 2556. The filtering parameters 2556 can correspond to query predicates and/or other information regarding which records 2422 have data values 2510 of one or more fields reflected in the query resultant. The filtering parameters 2556 can indicate particular requirements that must be met for data values 2510 of one or more fields 2515 for records that will be included in, aggregated for representation in, and/or otherwise utilized to generate a query resultant 2548 corresponding to execution of a query corresponding to this query expression. For example, the filtering parameters 2556 include query predicates of a SQL query, such as predicates following a WHEREIN clause of a SELECT statement.

A given query expression 2552 can include projected field identifiers 2558. The projected field identifiers 2558 can include column identifiers for and/or can otherwise indicate which fields 2515 have data values 2510 of one or more records 2422 reflected in the query resultant. In particular, once records are filtered via filtering parameters 2556 to render a filtered subset of records, only data values of fields indicated via projected field identifiers 2558 are included in and/or reflected in query resultant 2548. For example, the projected field identifiers 2558 follow a SELECT statement to indicate which fields be projected in a final query resultant to be outputted by the query and/or to be outputted in an intermediate stage of query execution for further processing.

The filtering parameters 2556, projected field identifiers 2558, and/or other structure and/or portions of a given query expression 2552 can be utilized by a query plan generator module 2550 to generate query plan data 2554. The query plan data can indicate how the query be executed, which memory be accessed to retrieve records, a set and/or ordering of query operators to be executed in series and/or in parallel, one or more query operator execution flows 2433 for execution by one or more nodes 37, instructions for nodes 37 regarding their participation at one or more levels of query execution plan 2405, or other information regarding how a query for the given query expression be executed. In particular, the query plan data 2554 can indicate that data values 2510 for some or all fields of some or all sub-records 2532 of dataset 2500 be accessed via primary storage system 2506 based on which fields are required to apply filtering parameters 2556; that these accessed values be utilized to filter records by applying filtering parameters 2556; and that values of fields indicated in projected field identifiers be retrieved from secondary storage system 2508 for inclusion in query resultant 2548 and/or for further processing for only the records that met the requirements of filtering parameters 2556.

The query plan data 2554 can be utilized by a query execution module 2504 to execute the corresponding query expression 2552. This can include executing the given query in accordance with the filtering parameters 2556 and the projected field identifiers 2558 of the query expression 2552. In particular, the query execution module 2504 can facilitate execution of a query corresponding to the query expression 2552 via an IO step 2542, a filtering step 2544, and/or a projection step 2546 to ultimately generate a query resultant 2548. The an IO step 2542, a filtering step 2544, and/or a projection step 2546 can be performed via distinct sets of resources, such as distinct sets of computing devices 18 and/or nodes 37, and/or via shared resources such as a shared set of computing devices 18 and/or nodes 37.

The IO step 2542 can include performing a plurality of record reads. In particular, data values 2510 for some or all fields of some or all sub-records 2532 of dataset 2500 be accessed via primary storage system 2506, for example, based on which fields are: indicated in filtering parameters 2556, required to apply filtering parameters 2556; and/or indicated for projection in producing the query resultant. This can include reading values from all sub-records 2532 for a given dataset 2500 for filtering via filtering step 2544. Performing IO step 2542 can include accessing only primary storage system 2506, where only values from sub-records 2532 are read, and where values are not read from secondary storage system 2508 in performing IO step 2542.

The filtering step 2544 can include filtering the set of records read in the IO step. In particular, data values 2510 for some or all fields of some or all sub-records 2532 of dataset 2500 that were accessed via primary storage system 2506 in the IO step 2542 can be filtered in accordance with the filtering parameters 2556. This can include generating and/or indicating a filtered subset of sub-records from the full set of accessed sub-records 2532 based on including only ones of the full set of accessed sub-records that meet the filtering parameters 2556 in the filtered subset of sub-records.

In some embodiments, some or all of filtering step 2544 can be integrated within IO step 2542 based on performing one or more index probe operations and/or based on a plurality of indexes stored in conjunction with the plurality of sub-records 2532, where only a subset of records are read for further processing based on some or all of filtering parameters 2556 being applied utilizing the plurality of indexes and/or the index probe operations. Such embodiments are discussed in further detail in conjunction with FIG. 25E.

The projection step 2546 can include accessing and emitting the data values 2510 of fields indicated in projected field identifiers 2558 for only records 2422 corresponding to the filtered subset of sub-records 2532 to produce a query resultant 2548 that includes and/or is based on these data values 2510. In some embodiments, these data values 2510 for each record of the filtered subset of sub-records 2532 are included in the query resultant 2548. In some embodiments, further aggregation and/or processing is performed upon these data values 2510 to render the query resultant. The projection step 2546 optionally includes decrypting the data values 2510 prior to their inclusion in the query resultant if these values are encrypted in the secondary storage system 2508.

For projected field identifiers 2558 corresponding to fields included in the second subset of fields stored via secondary storage system 2508, this can include performing value reads to retrieve values from only records 2422 indicated in the filtered subset of sub-records, as illustrated in FIG. 25B. For example, data values of field 2515.2 are emitted and included in query resultant 2548 based on field 2515.2 being indicated in projected field identifiers 2558. In particular, this access to secondary storage system 2508 to perform projection step 2546 can correspond to the first and/or only access to secondary storage system 2508 to execute the query.

While not illustrated in FIG. 25B, the projection step 2546 can alternatively or additionally include emitting data values 2510 of fields stored in sub-records 2532 based on these fields being indicated in projected field identifiers 2558. For example, data values of field 2515.1 are emitted and included in query resultant 2548 for records indicated in the filtered subset of sub-records 2532 instead of or in addition to data values of field 2515.2 based on field 2515.1 being indicated in projected field identifiers 2558. If values of field 2515.1 were previously read via IO step 2542 and/or filtered via filtering step 2544, these values need not be re-read, and can simply be outputted in filtering step 2544 and emitted directly in projection step 2546. If values of field 2515.1 were not previously read via IO step 2542 based on not being necessary for filtering via filtering step 2544, performing the projection step 2546 can include reading these values via primary storage system 2506, for example, in a same or similar fashion as performed in IO step 2542.

In some embodiments, the filtering parameters 2556 only indicate requirements that must be met for data values 2510 of only fields 2515 included in the first subset of fields that are stored in primary storage system 2506. For example, the filtering parameters 2556 do not include any filtering parameters regarding the value of field 2515.2 based on field 2515.2 being included in the second subset of fields stored via secondary storage system 2508. This can be ideal in ensuring that secondary storage system 2508 need not be accessed in IO step 2542 and/or filtering step 2544 of query execution, as field 2515.2 need not be accessed in filtering records.

In such cases, the query expression can be restricted to include filtering parameters 2556 only indicating requirements that must be met for data values 2510 of only fields 2515 included in the first subset of fields, where a query will only be executed if it does not include any parameters regarding the fields included in the second subset of fields. For example, field 2515.2 is designated as a "projection-only" field, and cannot be utilized to filter records via filtering parameters 2556. In such embodiments, these "projection-only" fields can be optionally configured via user input, can be determined based on secondary storage criteria data 2535 identifying the "projection-only" fields, and/or can be automatically selected based on fields selected for inclusion in the second subset of fields for storage in secondary storage system 2508.

Such restrictions can be implemented by the query processing system 2501 upon receiving query expressions to determine whether a query expression can be executed based on whether or not it references any "projection-only" fields in filtering parameters 2556. Such restrictions can be implemented by a client device, for example, in conjunction with execution of application data corresponding to the database system 10, that: restricts users from entering query expression that reference "projection-only" fields in filtering parameters 2556; prompts users to re-write query expressions entered via user input that reference "projection-only" fields in filtering parameters 2556; and/or that only transmits query expressions entered via user input that do not reference "projection-only" fields. In such embodiments, these "projection-only" fields can be sent to these client devices by the database system 10, for example, in conjunction for storage by memory resources of the client device enable processing resources of the client device to restrict the user from entering and/or sending query expression referencing these "projection-only" fields in filtering parameters 2556.

In other embodiments, the filtering parameters 2556 can indicate requirements that must be met for data values 2510 of at least one field 2515 included in the second subset of fields that are stored in secondary storage system 2508. For example, the filtering parameters 2556 include filtering parameters regarding the value of field 2515.2. In such cases, rather than accessing secondary storage system 2508 to determine and utilize values 2510 of field 2515.2 to perform filtering, the IO step 2542 and/or filtering step 2544 can still be performed via only access to primary storage system 2506, based on the sub-records 2532 being indexed by a plurality of indexes generated based on field 2515.2. Such embodiments are discussed in further detail in conjunction with FIG. 25E.

The query resultant 2548 can be sent to another computing device for download, display and/or further processing, such as a computing device 18, a client device associated with a requesting entity that requested execution of the query, and/or any other computing device that is included in and/or communicates with the database system 10. For example, the query resultant 2548 is sent to a client device that generated the query expression 2552. The query execution module 2504 can send the data values of the query resultant 2548 to this receiving computing device via a wired and/or wireless connection with the receiving computing device, for example, by utilizing system communication resources 14 and/or one or more external networks 17.

The receiving computing device that receives the query resultant 2548 from the database system 10 can display image data, video data, multimedia data, text data, and/or other data of data values 2510 of the query resultant 2548 corresponding to field 2515.2 via one or more screens or other one or more display devices of the receiving computing device. Alternatively or in addition, the receiving computing device that receives the query resultant 2548 from the database system 10 can utilize one or more speakers of the receiving computing device to emit sound corresponding to playing of the audio data, multimedia data, and/or other data of data values 2510 of the query resultant 2548 corresponding to field 2515.2.

In some embodiments, the database system 10s stores and/or packages the data values of the query resultant 2548 in accordance with one or more audio, image, video, text, document, and/or multimedia files via a corresponding audio, image, video, text, document, and/or multimedia file format and/or in accordance with a compressed and/or uncompressed file format. For example, some or all data values 2510 of the query resultant 2548 corresponding to field 2515.2 are stored by secondary storage system 2508 and/or are packaged by the database system 10 for transmission to the receiving computing device in accordance with a .JPEG, PNG, GIF, AVI, WMV, MPG, MP3, MP4, WAV, TXT, EXE, ZIP, and/or another file format corresponding to a data type of field 2515.2. The audio, image, video, text, document, and/or multimedia files can be stored via memory resources of the receiving computing device and/or can be opened via one or more applications of the of the receiving computing device for display and/or further processing by the receiving computing device.

In some embodiments, the database system stores data of the field 2515.2 in a compressed and/or encrypted format, for example, based on the corresponding data values corresponding to sensitive data and/or large data requiring compression in storage. The database system can optionally decrypt and/or decompress the data values included in the query resultant 2548 prior to transmission to the receiving computing device. For example, data values are decrypted by the query execution module 2504 and/or other processing resources of the database system 10 based on performing a decompression and/or decryption algorithm, and/or in accordance with key data or authentication data received from the receiving computing device, for example, in conjunction with the query expression.

In other embodiments, database system sends the data values included in the query resultant 2548 in their encrypted and/or compressed format. The receiving computing device decrypts and/or decompresses this data for display, use, and/or further processing via processing resources of the receiving computing device. For example, the receiving computing device performs a decompression and/or decryption algorithm via processing resources of the receiving computing device. As another example, the receiving computing device utilizes key data and/or authentication data that is stored in memory of the receiving computing device, that is received by the receiving computing device, that is entered via user input to the receiving computing device, and/or that corresponds to a user of the receiving computing device to decrypt the data values of the query resultant.

FIG. 25C illustrates another embodiment of primary storage system 2506, secondary storage system 2508, and query execution module 2504 of database system 10. Some or all features and/or functionality of the database system 10 of FIG. 25C can be utilized to implement the database system 10 of FIG. 25B and/or any other embodiment of database system 10 described herein.

The secondary storage system 2508 can be implemented as an object storage system that stores values of fields in the second subset of fields as objects 2562. In this example, a set of Z objects 2562.1-2562.Z are stored based on the dataset including Z records, and each object 2562 includes the data value 2510 for field 2515.2 based on field 2515.2 being included in the second subset of fields.

For example, the record storage module 2502 implements an object generator module that generates objects 2562.1-2562.Z that each include a corresponding value 2510 of field 2515.2, and the record storage module 2502 sends each object 2562.1-2562.Z to the secondary storage system 2508 for storage. Alternatively, the record storage module 2502 simply sends the values 2510.1-2510.Z to the secondary storage system 2508 for storage as corresponding objects 2562.1-2562.Z, where the secondary storage system 2508 implements an object generator module that generates objects 2562.1-2562.Z from values 2510.1-2510.Z received from the record storage module 2502.

In some embodiments, the database system 10 can map values 2510 of sub-records 2532 in primary storage system and values 2510 of objects 2562 in secondary storage system to record identifiers 2564 identifying the original corresponding record 2422.

As illustrated in FIG. 25C, each object 2562 can optionally include, indicate, and/or be mapped to a record identifier 2564 and/or each sub-record 2532 can optionally include, indicate, and/or be mapped to a record identifier. For example, the record storage module 2502 can generate and send sub-records 2532 that include values 2510 for the first subset of fields as well as record identifier 2564 to the primary storage system 2506 for storage. The record storage module 2502 can generate and send objects 2562 that include a value 2510 and a corresponding identifiers 2564 to secondary storage system 2508 for storage, and/or can generate and send record identifiers 2564 in conjunction with the corresponding to the secondary storage system 2508 for storage in same objects 2562.

These record identifiers 2564 can be utilized to identify which objects 2562 be accessed to enable projection of their values 2510 based on only accessing objects 2562 with identifiers 2564 matching those of records 2422 identified in the output of filtering step 2544. In particular, objects with a data value 2510 extracted from a particular record 2422 can have a same object identifier 2564 as the sub-record 2532 with data values 2510 extracted from this same particular record 2422, and can be different from all other sub-records 2532 with data values 2510 extracted different records. The record storage module 2502 can extract and/or generate record identifiers 2564 for each incoming record 2422, can facilitate storage of a sub-record 2532 via primary storage system indicating and/or mapped to this record identifier 2564, and/or can facilitate storage of an object 2562 via primary storage system indicating and/or mapped to this record identifier 2564.

Record identifiers 2564 can be unique from record identifiers of other records to uniquely identify each record. Record identifiers 2564 can be generated via a hash function. Record identifiers 2564 can correspond to values 2510 of a unique identifier field set of records 2422. Record identifiers 2564 can correspond to pointers to and/or memory locations of sub-records and/or objects in memory. For example, a record identifier 2564 of a given sub-record of a particular record 2422 denotes the memory location and/or retrieval location for the object 2562 corresponding to the particular record 2422, where the record identifier 2564 of the object 2562 corresponds to the retrieval information and/or location of the object 2562.

In this example, at least one field 2515 for all sub-records 2532.1-2532.Z, corresponding to all possible records of the dataset 2500, are read in IO step 2542 and/or are filtered in filtering step 2544 based on filtering parameters 2556 to render a filtered record subset 2567 indicating a subset of the set of records filtered from the record set 2566. The IO step 2542 can include reading the identifiers 2564 of sub-records 2532 from primary storage system 2506 as part of reading the at least on field 2515 for all sub-records 2532.1-2532.Z indicates sub-record 2532.2, 2532.5, and 2532.Z. Alternatively, the reading the identifiers 2564 of only the sub-records 2532 included in the filtered record subset 2567 are read from primary storage system 2506 after filtering step 2544 is performed.

Next, projection step 2546 is performed based on the filtered record subset 2567 to project the appropriate values of field 2515.2 based on projected field identifiers 2558 indicating field 2515.2. Record identifiers 2564.2, 2564.5, and 2565.Z corresponding to records 2422.2, 2422.5, and 2422.Z can be utilized to access the corresponding values 2510 of field 2515.2 for these 2422.2, 2422.5, and 2422.Z, based on accessing the corresponding objects 2562 that indicate and/or are mapped to these record identifiers 2564.2, 2564.5, and 2565.Z. For example, the record identifiers 2564 are stored as metadata of the objects 2562, and identifying the set of objects 2562 to be accessed includes performing a metadata search utilizing these record identifiers. The corresponding values 2510.2.2, 2510.5.2, and 2510.Z.2, correspond to the field 2515.2 value of the original records 2422.1, 252.5 and 2422.Z, respectively, are then read based on accessing, by utilizing these record identifiers, the appropriate objects 2562 in secondary storage system 2508 for projection in query resultant 2548.

Figure 25D:
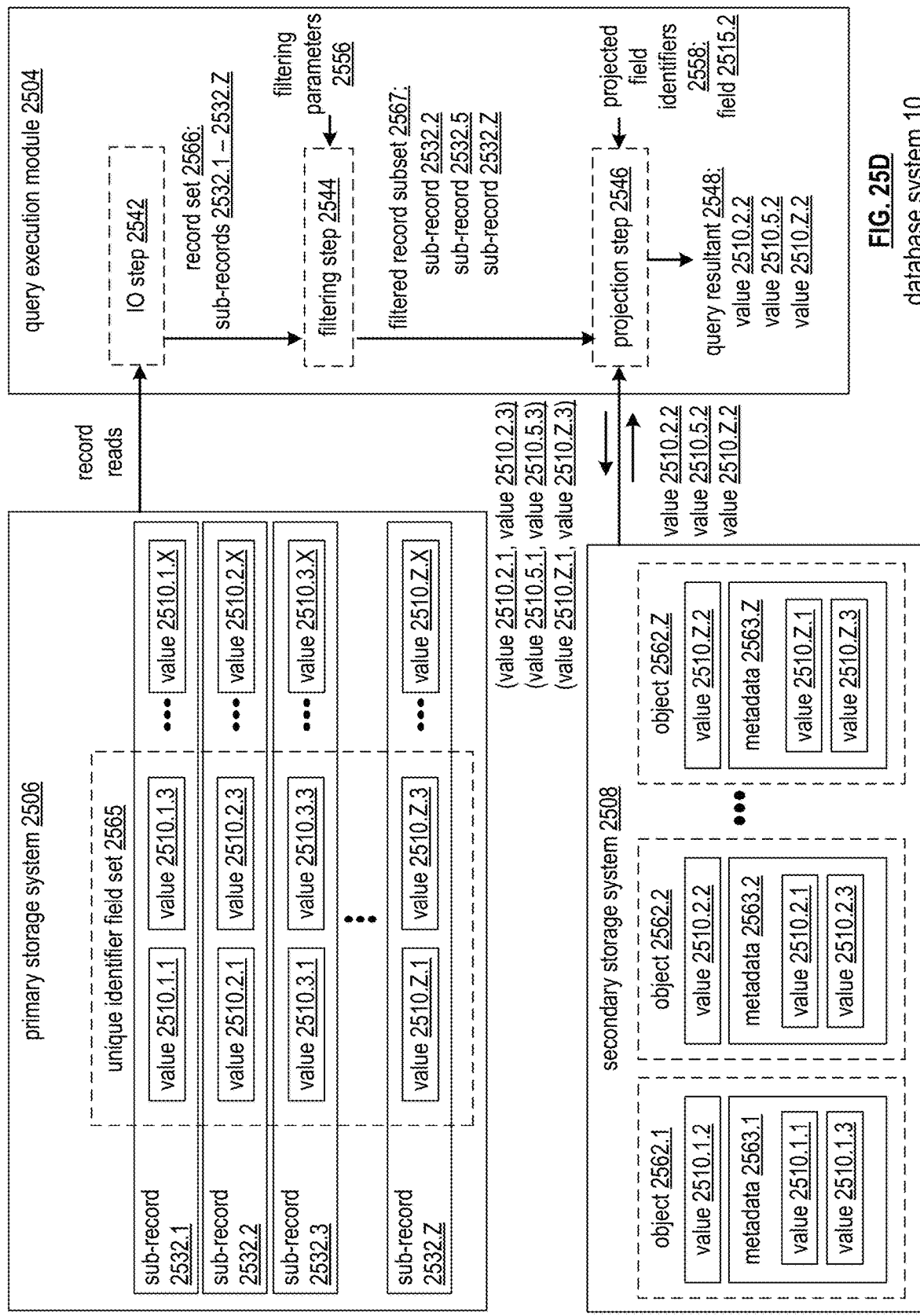

FIG. 25D illustrates an embodiment where record identifiers 2564 are implemented as values of a unique identifier field set 2565. The database system 10 of FIG. 25D can be utilized to implement the database system 10 of FIG. 25C and/or any other embodiment of database system 10 described herein.

The unique identifier field set 2565 can be implemented as a unique key set of one or more fields 2515 and/or values of any set of fields 2515 whose values uniquely identify records 2422, where values of unique identifier field set 2565 for any given record 2422 is guaranteed to be distinct from values of this unique identifier field set 2565 for all other records 2422. In the example of FIG. 25D, values of field 2515.1 and field 2515.3 can uniquely identify records 2422, and where a unique identifier field set 2565 of records 2422 thus includes field 2515.1 and field 2515.3. The sub-records 2532 need not include additional identifiers 2564, as the set of values in the unique identifier field set 2565 already uniquely identify each record 2422.

The values of the unique identifier field set 2565 are also stored in conjunction with each corresponding value 2515.2 in secondary storage system 2508, for example, as metadata 2563 of corresponding objects 2562, to ensure that each value 2515.2 in secondary storage system 2508 is mapped to their corresponding record and/or is retrievable based on values of the unique identifier field set 2565 retrieved from the primary storage system 2506.

In particular, extending the example of FIG. 25C, the projection step includes retrieving values 2510.2.2, 2510.5.2, and 2510.Z.2 based on searching and/or otherwise accessing the corresponding objects 2562.2, 2562.5, and 2562.Z by utilizing the corresponding values of fields 2515.1 and 2515.3 in the unique identifier field set 2565 for records 2422.2, 2422.5, and 2422.Z based on records 2422.2, 2422.5, and 2422.Z being included in the filtered record subset 2567. For example, accessing objects 2562.2, 2562.5, and 2562.Z includes performing a metadata search utilizing the corresponding values of fields 2515.1 and 2515.3 in the unique identifier field set 2565 for records 2422.2, 2422.5, and 2422.Z.

In some embodiments, values of other fields, such as some or all fields 2515 of sub-records 2532, are also stored in conjunction with each corresponding value 2515.2 in secondary storage system 2508, for example, as metadata 2563 of corresponding objects 2562. For example, accessing objects 2562 to retrieve corresponding values for projection in the resultant includes performing a metadata search utilizing the corresponding values of some or all fields, for example, that were accessed and/or utilized in the IO step 2542 and/or the filtering step 2544 based on filtering parameters 2556, from sub-records indicated in the filtered record subset 2567. In such cases, the set of values of these sets of fields may not be guaranteed to be unique, but still render correct query resultants when used in metadata searches for corresponding object values for projection, regardless of whether a given set of set of values map to and returns the value of a single object 2562 or multiple objects 2562, based on these particular sets of values of these sets of fields meeting the requirements of filtering step 2544.

In some embodiments, the projection step includes retrieving values 2510.2.2, 2510.5.2, and 2510.Z.2 based on performing a JOIN operation, such as an inner join operation and/or other type of join operation. The JOIN operation can be performed upon a first table corresponding to the filtered record subset 2567 and upon a second table corresponding to the full set of values 2510 stored in secondary storage system 2508 for the dataset 2500. In particular, an equality condition corresponding to equality of the one or more values of the unique identifier field set 2565 and/or other set of fields of the first table with values of a set of corresponding one or more fields of the second table can be utilized to perform the JOIN operation. Output of the JOIN operation thus corresponds to only ones of the set of values 2510 stored in secondary storage system 2508 storing metadata values for the unique identifier field set 2565 and/or other set of fields that match the values of the unique identifier field set 2565 and/or other set of fields for at least one sub-record in the filtered record subset 2567, corresponding to only ones of the set of values 2510 from the same original records 2522 as the sub-records in the filtered record subset 2567. In some embodiments, this JOIN operation is performed in performing projection step 2546 based on being indicated in the query plan data 2554 and/or being included in a query operator execution flow determined for the query.

Figure 25E:
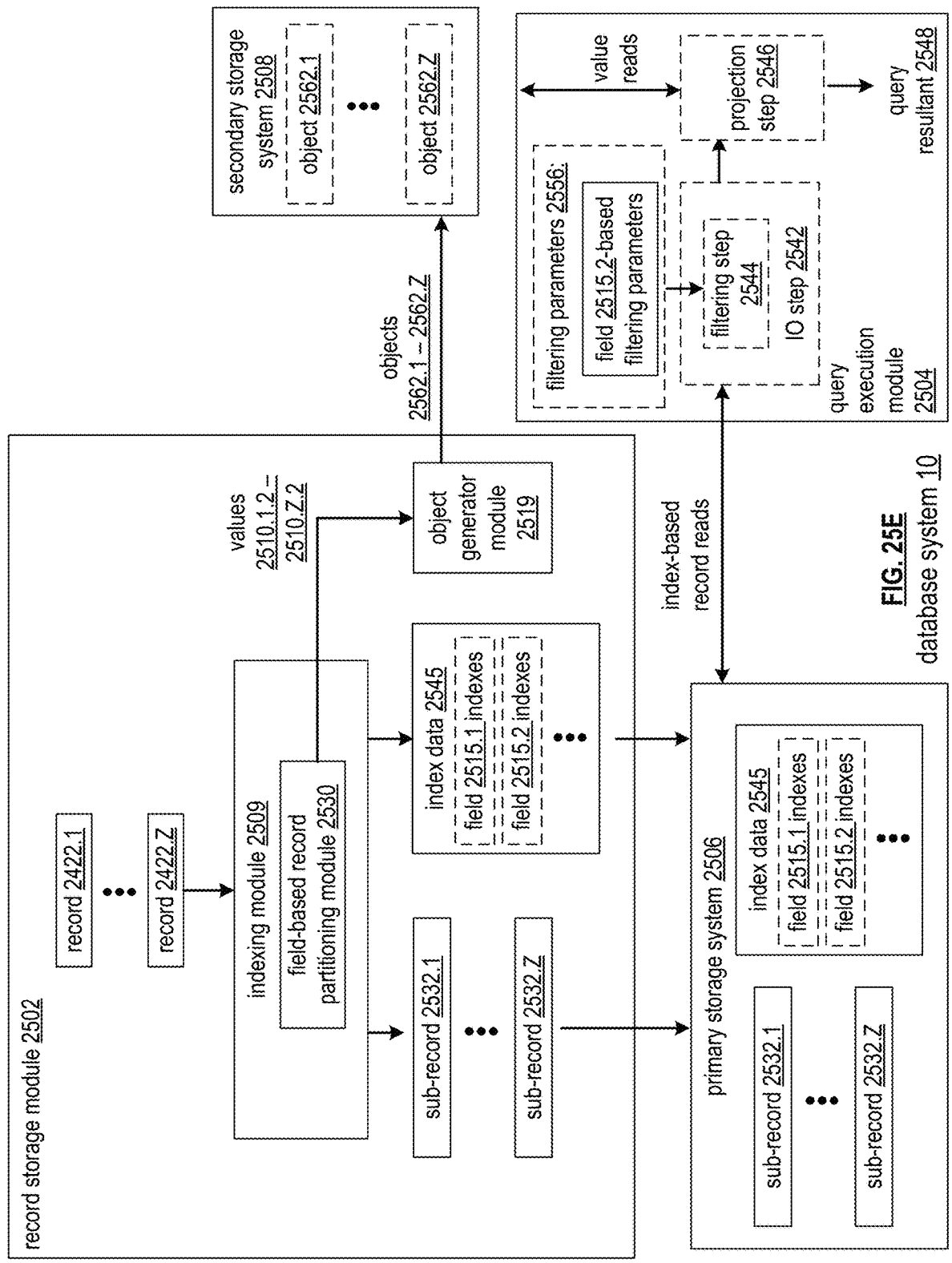
FIG. 25E is a schematic block diagram illustrating a record storage module that implements an index generator module in accordance with various embodiments of the present invention.

FIG. 25E illustrates an example of a database system 10 where sub-records are indexed via a plurality of indexes in primary storage system 2506. Some or all features and/or functionality of the database system 10 of FIG. 25E can be utilized to implement the database system 10 of FIG. 25A and/or FIG. 25B, and/or any other embodiment of database system 10 described herein.

As illustrated in FIG. 25E, the record storage module can implement an index generator module 2509 to generate index data 2545 that includes indexes corresponding to one or more fields. The index data 2545 can include, for one or more fields 2515, primary indexes, secondary indexes, unique indexes, non-unique indexes, clustered indexes, non-clustered indexes, partitioned indexes, non-partitioned indexes, bidirectional indexes, expression-based indexes, modification state indexes, a bloom filter, a projection index, a data-backed index, a filtering index, a composite index, a zone map, a bit map, and/or a B-tree.

The record storage module 2502 can facilitate storage of index data 2545 via primary storage system 2506 in conjunction with storing the sub-records 2532. Alternatively or in addition, record storage module 2502 can facilitate storage of sub-records 2532 via primary storage system 2506 in accordance with their indexes of index data 2545, where the location, organization, and/or grouping of sub-records 2532 in storage resources of primary storage system 2506 is based on their respective indexes of index data 2545.

The stored index data 2545 can be accessible by query execution module 2504 when performing IO step 2542 to access sub-records 2532, and/or the sub-records 2532 can be accessible in their respective locations by query execution module 2504 when performing TO step 2542 to access sub-records 2532 based on index data 2545. As illustrated in FIG. 25E, some or all of filtering step 2544 can be integrated within IO step 2542. In particular, some records are not accessed via IO step 2542 based on utilizing index data 2545 to apply some or all filtering parameters 2556, for example, via an index probing operator of the query in IO step 2542. In such cases, rather than the IO step 2542 outputting some or all values 2510 of all sub-records 2532 in the dataset 2500, the IO step 2542 outputs values and/or identifiers of a filtered subset of sub-records 2532 in the dataset 2500 based on utilizing the index data 2545 and some or all of filtering parameters 2556. Additional filtering of filtering step 2544 can optionally be applied to the output of IO step 2542, for example, to apply additional filtering parameters 2556 that could not be applied by utilizing the index data 2545 alone, to apply logical operators such as AND or OR operators indicated in the filtering parameters, and/or to apply additional filtering parameters 2556 for fields 2515 that were not indexed in index data 2545.

In some embodiments, some or all of the plurality of indexes can optionally correspond to fields that are not included in sub-records 2532 based on being stored instead via secondary storage system 2508. However, the corresponding values can optionally be indexed all the same. These indexes can be smaller than the corresponding data itself, and can be appropriate for storage in the primary storage system 2506 in sub-records 2532, along with the values of other fields 2515 of sub-records 2532.

This can further improve the technology of database systems by allowing data that is large and/or that can be indexed compactly to be efficiently stored, improving memory utilization. This can further improve the technology of database systems by enabling IO in query execution to be performed efficiently based on indexes for large fields, even if the values of these large fields are stored elsewhere. This can further improve the technology of database systems by ensuring, via the presence of indexes for these fields, that certain types of filtering conditions that would fail unless indexes were present do not fail to guarantee query correctness, while allowing these large data values to be stored elsewhere.

For example, as illustrated in FIG. 25E, index data 2545 includes indexes for field 2512.2, despite being included in the second subset of fields with values stored in secondary storage system 2508, and thus not having its values included in sub-records 2532. Index data 2545 can alternatively or additionally include indexes for fields of the first subset of the set of fields stored in primary storage system 2506, such as indexes for field 2512.1 as illustrated in FIG. 25E. Index data 2545 can optionally include index data for all fields of records 2422 and/or for only a proper subset of fields of records 2422.

Index data 2545 can include a plurality of indexes, where an index for field 2515.2 is generated for each sub-record 2532. For example, index data for field 2515.2 corresponding to a particular sub-record 2532 can indicate and/or be based on some or all of the value 2510; based on a range of values for the particular field; based on whether one or more particular substring values, words, and/or other small individual values are included within a full value, such as a large binary data and/or extensive text data, of the data value 2510; based on metadata, a file type, and/or a file name the value 2510 for field 2515.2 for the corresponding record 2422; and/or based on one or more other characteristics of the value 2510 for field 2515.2 for the corresponding record 2422, even though the data for this value of field 2515.2 is not stored as part of sub-record 2532. These indexes can be included in corresponding sub-records 2532, can be mapped to corresponding sub-records 2532, can be utilized to sort, organize, and/or structure the sub-records 2532 in primary storage system 2506, and/or can be utilized to determine storage location of corresponding sub-records 2532 in primary storage system 2506.

Indexes of index data 2545 corresponding to field 2515.2 can be generated based on their respective values in conjunction with the partitioning and/or extracting these values from the respective records 2422 to generate sub-records 2532. For example, as illustrated in FIG. 25E, the index generator module 2509 can be implemented in conjunction with the field-based record partitioning module 2530 to enable sub-records 2532 to be indexed for field 2515.2 as their respective values 2510 for field 2515.2 are extracted for storage in secondary storage system 2508. For example, as values 2510 of each given record 2422 are processed and/or extracted, via field-based record partitioning module 2530, into a corresponding sub-record 2532, and/or as its value 2510 for field 2515.2 is extracted and/or processed, via field-based record partitioning module 2530, for storage as a corresponding object 2562, the index generator module 2509 further generates one or more indexes for the corresponding sub-record 2532 based on this extracted value for field 2515.2. In other embodiments, the field-based record partitioning module 2530 can be implemented separately from the index generator module 2509. In some embodiments, the index generator module 2509 generates index data 2545 based on accessing values 2510 stored in secondary storage system 2508.

Furthermore, as values 2510 of field 2515.2 are extracted, an object generator module 2519 of the record storage module 2502 can generate corresponding objects 2562, and these objects can be sent to secondary storage system 2508 for storage. Alternatively, as values 2510 of field 2515.2 are extracted, these values can be sent to secondary storage system 2508 for storage, and the secondary storage system 2508 can implement the object generator module 2519 to generate the corresponding objects 2562.

The filtering parameters 2556 of a query expression that indicate filtering records 2422 based on field 2515.2 can be applied by leveraging this index data 2545, where at least some records are not read in IO step 2542 based on having indexes for field 2515.2 indicating these records do not meet field 2515.2-based requirements of filtering parameters 2556, and thus need not be accessed for further processing in the query. As illustrated in FIG. 25E, some or all of filtering step 2544 can be integrated within IO step 2542, where some records are not accessed via IO step 2542 based on utilizing index data 2545 to apply some or all filtering parameters 2556, for example, via an index probing operator of the query in IO step 2542.

For example, the filtering parameters 2556 indicate particular characteristics of the value of field 2515.2, that are required for the corresponding value 2515.2 to be included in the query resultant, such as requirements indicating the value of field 2515.2 must include a particular word or substring, have particular metadata, have particular time and/or date information relating to creation and/or access, have a particular file name or file type, and/or have other characteristics, for example, that are extracted from field 2515.2 to index sub-records 2532 and/or that correspond to query predicates in query expressions relating to field 2515.2.

For example, a first subset of sub-records 2532 can be grouped for storage together based on having same or similar indexes of index data 2545 based on the corresponding records 2422 having field 2515.2 values within a same range of values and/or with same and/or similar characteristics. A second subset of sub-records 2532 can be also grouped for storage together based on having same or similar indexes of index data 2545 based on the corresponding records 2422 having field 2515.2 values within a same first range of values and/or with same and/or similar first characteristics, but are grouped for separate storage from the first subset of sub-records based on the corresponding records 2422 of the second subset of records having field 2515.2 values within a same second ranges of values and/or with same or similar second characteristics, where the second ranges of values and/or second characteristics are different from the first range of values and/or the first characteristics. The first subset of sub-records 2532 can be stored via a first set of memory resources, via a first node 37, and/or are included within a same first segment 2424, while the second subset of sub-records 2532 are stored via a second set of memory resources that is distinct from the first set of memory resources, are stored via a second node 37 that is different from the first node 32, and/or are included within a same second segment 2424 that is different from the first segment. In query execution, the IO step 2542 can include accessing only the first subset of sub-records 2532 via the first set of memory resources and not the second subset of sub-records via the second set of memory resources based on the filtering records 2422 indicating that only records with field 2512.2 values within the first range of values, and/or not within the second range of values, be included in the query resultant, and/or based on the filtering records 2422 indicating that only records with field 2512.2 values with the first characteristics, and/or not with the second characteristics, be included in the query resultant.

Alternatively or in addition, one or more additional fields 2515 can be generated for inclusion in sub-records 2532 with values indicating some or all of this metadata and/or characteristics for the corresponding data value 2510 of field 2515.2. In such cases, these one or more additional fields 2515 can be indexed and/or can otherwise be utilized in applying filtering step 2544 to filter records based on field 2515.2, even though field 2515.2 need not be accessed.

In other embodiments, when filtering parameters indicate requirements relating to field 2515.2, data values of field 2515.2 can optionally be accessed via secondary storage system 2508 to perform some or all of filtering step 2544, where only data values of field 2515.2 meeting requirements of corresponding filtering parameters are retrieved and projected in the resultant.

Figure 25F:
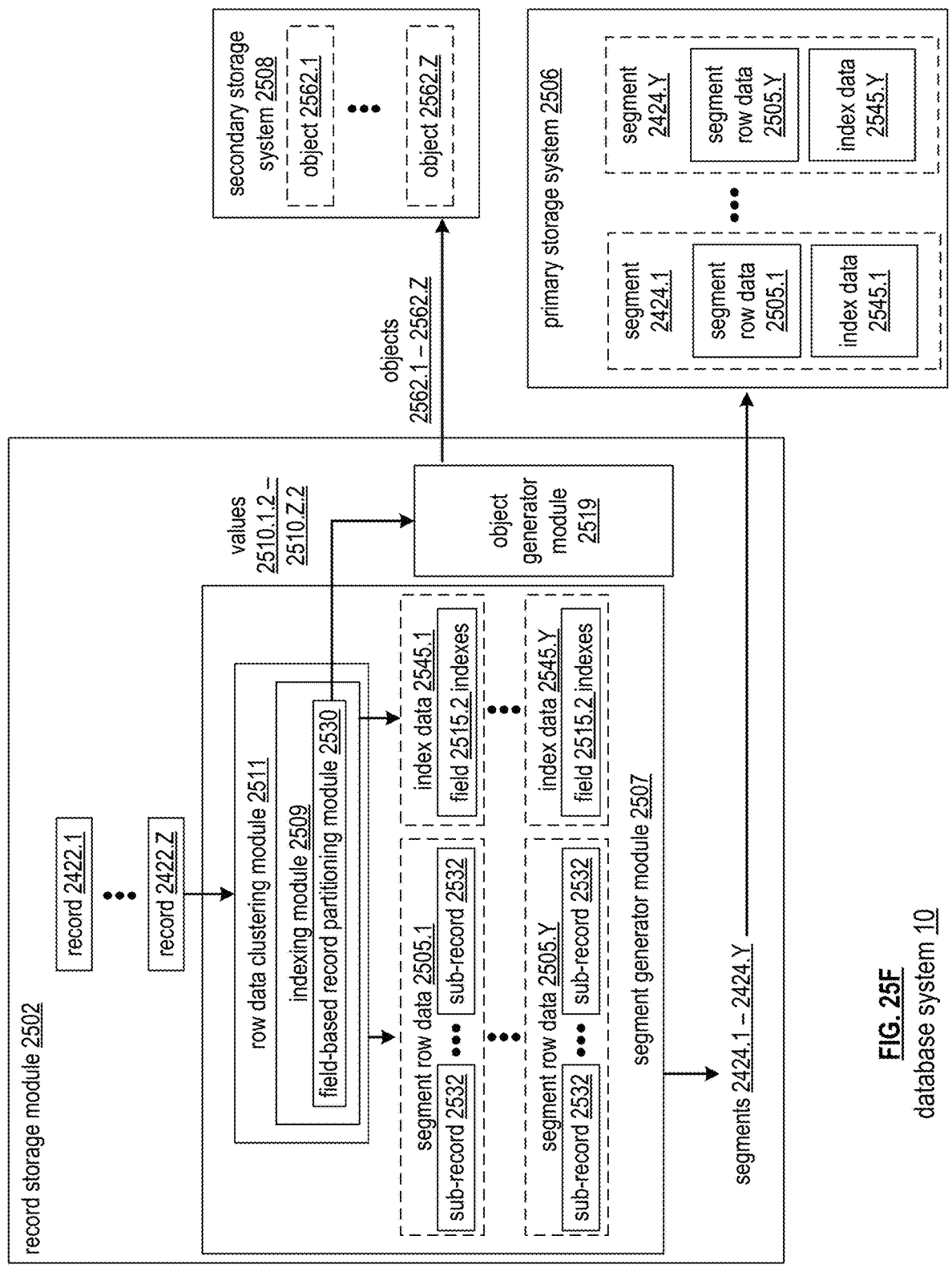
FIG. 25F is a schematic block diagram illustrating a record storage module that implements a row data clustering module in accordance with various embodiments of the present invention.

FIG. 25F illustrates an example of a database system 10 that implements a segment generator module 2507 that groups sub-records 2532 for storage as segments 2424 in primary storage system 2506 Some or all features and/or functionality of the database system 10 of FIG. 25F can be utilized to implement the database system 10 of FIG. 25A and/or FIG. 25B, and/or any other embodiment of database system 10 described herein.

The segment generator module 2507 can implement a row data clustering module 2511. The row data clustering module 2511 can sort and/or group a plurality of records 2422, such as some or all records of dataset 2500, into a plurality of distinct groups of segment row data 2505. Each segment row data 2505 can be generated to include a distinct set of sub-records 2532, where sub-record is stored in included in exactly one segment row data 2505, and wherein every sub-record 2532 is included in a corresponding segment row data 2505. Different segment row data 2505 can include the same or different number of sub-records.

This can include generating a plurality of Y segment row data 2505.1-2505.Y by grouping sub-records 2532 into different segment row data 2505. This grouping of sub-records 2532 can be based on the value 2510 of one or more of fields 2515. This can include grouping sub-records 2532 into different segment row data 2505 based on the value 2510 of one or more of its fields 2515 included in the first subset of fields designated for storage via primary storage system. This can include grouping sub-records 2532 into different segment row data 2505 based on the value 2510 of one or more fields 2515 included in the second subset of fields designated for storage via secondary storage system.

For example, sub-records 2532 are grouped into different segment row data 2505 based on values 2510 of a single fields 2515 and/or a set of multiple fields corresponding to a primary key field and/or a cluster key field. For example, sub-records 2532 with same or similar values for the key field and/or a cluster key field are included in same segment row data, while sub-records 2532 with different values for the key field and/or a cluster key field are included in different segment row data. Alternatively or in addition, sub-records 2532 are grouped into different segment row data 2505 based on indexes generated for each sub-record 2532 in conjunction with generating the index data 2545 of FIG. 25E.

As a particular example, a similarity function, such as a Euclidian distance function and/or equality function can be utilized to measure a similarity between different ones of the plurality of records, for example, based on the values of one more fields designated for use in generating the segment row data 2505. Sets of records with most favorable similarities measured via the similarity function are grouped together in same segment row data 2505, while sets of records with less favorable similarities measured via the similarity function are grouped separately in different segment row data 2505. As another particular example, a clustering algorithm can identify a plurality of subsets of the sub-records 2532 for inclusion in a plurality of corresponding segment row data 2505 based on identifying records for each given subset of the plurality of subsets that have a favorable similarity score measured via the similarity function with other records in the given subset, for example, that compares favorably to a similarity score threshold. As another particular example, a clustering algorithm can identify the plurality of subsets of the sub-records 2532 for inclusion in a plurality of corresponding segment row data 2505 based on selecting a most similar group of records and/or a subset of records with a highest ranked similarity of some or all possible subsets of records for inclusion in a corresponding one of the segment row data 2505.

Each given segment row data 2505 can be further processed to generate a corresponding segment 2424. The segment row data 2505 and/or resulting segments 2424 can optionally be generated from a set of segment row data for a set of segments in a same segment group, for example, as discussed in conjunction with FIG. 27A.

For example, the segment row data 2505 and/or resulting segments 2424 are generated from a full set of sub-records 2532 in a same or similar fashion as discussed in conjunction with FIGS. 15-23. However, unlike the example of FIGS. 15-23, one or more columns of the original records 2422 are not included in the segment row data 2505, and are thus not included in the resulting segments 2424. For example, the field-based record partitioning module 2530 first extracts and/or removes these columns to generate the rows of FIGS. 15-23 as sub-records 2532 that do not include one or more columns, such as a column corresponding to field 2515.2.

The resulting segments 2424 can store the plurality of sub-records 2532 of its segment row data 2505, for example, in accordance with column-based format and/or in accordance with some or all features of the format discussed in conjunction with FIG. 23. The data values 2510 of the plurality of sub-records 2532 can be included in the data and parity section of FIG. 23. Parity data can be optionally generated for segment row data 2505 and can be further included in the data and parity section of FIG. 23. A manifest section, a plurality of index sections, and/or a statistics section can be further generated and included in resulting segments 2424.

Performance of IO step 2542 by query execution module 2504 to read values of sub-records 2532 can include accessing segment row data 2505 of some or all segments 2424, and reading the values of some or all fields for some or all sub-records 2532 in the segment row data 2505. For example, the record extraction module 2438 of query processing module is utilized to read sub-records 2532 from segments as discussed in conjunction with FIG. 25F. However, values of fields designated for storage in the secondary storage system 2508, such as field 2515.2, cannot be read from segments 2424 in IO step 2542 because the segments 2424 do not store the values for field 2515.2. These values are instead read via access to secondary storage system 2508 as discussed previously, for example, in performing projection step 2546.

The segment generator module 2507 can further implement an index generator module 2509 as discussed in conjunction with FIG. 25E, where each segments 2424 can further include and/or be mapped to index data 2545. For example, as illustrated in FIG. 25F, index data 2545.1-2425.Y can be generated, where each index data 2545 in the set of index data 2545.1-2425.Y corresponds to one of the set of segment row data 2505.1-2505.Y. In such cases, given index data 2545 can include indexes for and/or can be generated based on only sub-records 2532 included in the segment row data 2505 for the corresponding segment row data 2505. Each index data 2545 can be generated in a same or similar fashion as discussed in conjunction with FIG. 25F, where the row data clustering module 2511 is implemented by the segment generator module 2507 in conjunction with the index generator module 2509. The row data clustering module 2511 can optionally be implemented separately from the index generator module 2509, where index data 2545 is generated separately from generating segment row data 2505 and/or segments 2424.

Each index data 2545 can be mapped to and/or stored in conjunction with the corresponding segment 2424, for example in one or more index sections 0-x as discussed in conjunction with FIG. 23. The index data 2545 of a given segment can be accessed and utilized in performing IO step 2542 to read values of sub-records 2532 from the segment row data 2505 of the given segment. Performing IO step 2542 to read values of sub-records 2532 from the segment row data 2505 of segments 2424 can implement some or all of filtering step 2544 based on index data 2545 of the segment as discussed previously.

In particular, as illustrated in FIG. 25F, the index data 2545 for some or all segments can include indexes generated based on field 2515.2 of the second subset of the set of fields designated for storage in the secondary storage system 2508 as discussed in conjunction with FIG. 25F. In such embodiments, performing IO step 2542 to read values of sub-records 2532 from the segment row data 2505 of segments 2424 can implement some or all of filtering step 2544 to filter sub-records 2532 based on values 2510 of field 2515.2 for the corresponding record 2422 as discussed in conjunction with FIG. 25E. In other embodiments, the index data 2545 for some or all segments can alternatively or additionally include indexes generated based on fields of the first subset of the set of fields designated for storage in the primary storage system 2506, such as field 2515.1. In such embodiments, performing IO step 2542 to read values of sub-records 2532 from the segment row data 2505 of segments 2424 can implement some or all of filtering step 2544 to filter sub-records 2532 based on values 2510 of these fields, such as field 2515.1. for the corresponding sub-record 2532.

FIG. 25G illustrates an example of a query execution module 2504 of a database system 10 that is implemented via a plurality of nodes 37. Some or all features and/or functionality of the query execution module 2504 of FIG. 25G can be utilized to implement the query execution module 2504 of FIG. 25B. Some or all features and/or functionality of nodes 37 of the query execution module 2504 of FIG. 25G can be utilized to implement the plurality of nodes 37 of query execution plan 2405 of FIG. 24A and/or can be utilized to implement nodes 37 of FIGS. 24B-24D. Some or all features and/or functionality of nodes 37 of FIGS. 24A-24D can be utilized to implement some or all nodes 37 of FIG. 25G.

A query execution module 2504 can perform the IO step 2542 by utilizing a first plurality of nodes 37 participating at IO level 2416 of a query execution plan 2405. For example, this first plurality of nodes 37 is assigned for participation at IO level 2416 based on the query plan data 2554 generated by the query plan generator module 2550 and/or are assigned as discussed in conjunction with FIG. 24A.

Each of these nodes 37 participating at IO level 2416 can include one or more memory drives 2425 that each store one or more segments 2424. For example, these nodes are implemented to store and access segments 2424 as discussed in conjunction with FIG. 24B.

These segments 2424 can each include a plurality of sub-records 2532, such as the plurality of sub-records 2532 of corresponding segment row data 2505 of FIG. 25F. For example, the record storage module 2502 of FIG. 25F sends each segments 2424 to one node 37 for storage in a memory drive 2425 of the node 37, and/or a given node 37 otherwise receives the segment 2424 generated by the record storage module 2502 and stores the segment 2424 via at least one of its memory drives 2425. Thus, the memory drives 2425 of this first plurality of nodes 37 participating at IO level 2416 can implement some or all of the primary storage system 2506.

Performing the IO step 2542 can include each of this first plurality of nodes 37 participating at IO level 2416 of a query execution plan 2405 utilizing a query processing module 2435 to access some or all segments 2424 in their memory drives 2425 to read values of some or all fields of some or all sub-records 2532. For example, the first plurality of nodes 37 read values of some or all fields of some or all sub-records 2532 from segments 2424 in a same or similar fashion as discussed in conjunction with FIG. 24B. This can optionally include performing an index probing operation and/or utilizing index data 2545 of segments 2424 to access sub-records 2532 as discussed previously.

These nodes can send these values of some or all fields of some or all sub-records 2532 read from their segments 2424 to nodes 37 at an inner level 2414. For example, each node 37 sends these values as data blocks to one assigned parent node 37 as illustrated and discussed in conjunction with FIG. 24A. Each node 37 at one or more inner levels 2414 processes received data blocks from its children as illustrated and discussed in conjunction with FIG. 24 to apply filtering parameters 2556 and/or to otherwise facilitate performance of some or all of filtering step 2544 of the query.

Nodes 37 at a final inner level 2414 can send data blocks indicating the filtered subset of the set of sub-records to a root node 37 at root level 2412, for example, indicating the filtered record subset 2567. This root node can perform the projection step 2546 by accessing secondary storage system 2508 to read values 2510 of field 2515.2 based on the filtered record subset 2567 received in data blocks from its child nodes 37. The root node can emit the query resultant as one or more data blocks that include the values 2510 of field 2515.2 read from secondary storage system 2508. This can be ideal in minimizing a number of nodes 37 of a query execution plan 2405 that access the secondary storage system in query executions, which can be particularly ideal if access to secondary storage system 2508 is slower than access to primary storage system 2506, and/or can improve query execution efficiency by freeing up processing and/or memory utilization of other nodes 37 for use in executing other queries concurrently being processed by the query execution module 2504.

In other embodiments, the projection step 2546 is alternatively performed via a plurality of nodes 37 at one or more inner levels 2414. For example, each of a plurality of nodes 37 at an inner level 2414: receives its own portion of the filtered record subset 2567 from its children; accesses values 2510 of field 2515.2 for corresponding records 2422 by each accessing secondary storage system 2508; and/or emits its read values 2510 of field 2515.2 as a portion of the query resultant 2548. For example these values are emitted by each of these nodes as output data blocks sent to a root level node 2412, where the root level node emits the query resultant as a union of the values 2510 received from its children. This can be ideal in cases where retrieval of values 2510 from secondary storage system 2508 would take a lengthy amount of time if performed by a single node, for example, due to the large size of values 2510, where the execution time of queries is improved via implementing the projection step 2546 via plurality of nodes 37 accessing different values 2510 required for the query resultant in parallel.

In some embodiments, as illustrated in FIG. 25G, the secondary storage system 2508 is separate from node 37 at root level 2412 that implements the projection step 2546 and/or the nodes 37 at an inner level 2414 that that implements the projection step 2546. For example, one or more nodes 37 implement the projection step 2546 by communicating with secondary storage system 2508 via system communication resources 14, via one or more external networks 17, and/or via another wired and/or wireless network connection with secondary storage system 2508, to request the values 2510 from secondary storage system 2508, for example, via corresponding record identifiers 2564 as discussed in conjunction with FIG. 25C and/or to receive the requested values 2510 from secondary storage system 2508 in response. In other embodiments, one or more nodes 37 implement the secondary storage system 2508 via their own memory resources, such as one or more of its own memory drives 2425 that store the values 2510 of field 2515.2, and can implement the projection step 2546 implements the projection step 2546 by retrieving values 2510 via access requests to its own memory drives 2425.

Storing and/or accessing different fields of datasets via different storage mechanisms based on size and/or data type of different fields in this fashion as presented in FIGS. 25A-25G can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the record storage module 2502, the query execution module 2504, the primary storage system 2506, and/or the secondary storage system 2508 can be implemented by a large number, such as hundreds, thousands, and/or millions of computing devices 18, nodes 37, and/or processing core resources 48 that perform independent processes in parallel and/or in overlapping time spans, for example, with minimal or no coordination, to implement some or all of the features and/or functionality discussed in conjunction with FIGS. 25A-25G at a massive scale.

The partitioning of records for storage via different storage mechanisms and/or execution of queries by accessing different fields stored via different storage mechanisms as presented in FIGS. 25A-25G cannot practically be performed by the human mind, particularly when the database system 10 is implemented to store and perform queries against records at a massive scale as discussed previously. In particular, the human mind is not equipped to perform partitioning of records for storage via different storage mechanisms and/or execution of queries by accessing different fields different storage mechanisms for millions, billions, and/or trillions of records stored as many Terabytes, Petabytes, and/or Exabytes of data. Furthermore, the human mind is not equipped to distribute and perform partitioning of records for storage via different storage mechanisms and/or execution of queries by accessing different fields different storage mechanisms as multiple independent processes, such as hundreds, thousands, and/or millions of independent processes, in parallel and/or within overlapping time spans.

In various embodiments, a database system includes at least one processor and a memory that stores operational instructions. The operational instructions, when executed by the at least one processor, cause the database system to receive a plurality of records of a dataset for storage. Each of the plurality of records can include a plurality of values corresponding to a plurality of fields of the dataset. The operational instructions, when executed by the at least one processor, can further cause the database system to store, for each of the plurality of records, ones of the plurality of values corresponding to a first subset of the plurality of fields via a first storage mechanism. The operational instructions, when executed by the at least one processor, can further cause the database system to facilitate storage of, for each of the plurality of records, ones of the plurality of values corresponding to a second subset of the plurality of fields via a second storage mechanism based on a data type corresponding to the second subset of the plurality of fields. The second storage mechanism can be is different from the first storage mechanism. The operational instructions, when executed by the at least one processor, can further cause the database system to determine a query for execution against the dataset; and/or to facilitate execution of the query. The operational instructions, when executed by the at least one processor, can further cause the database system to facilitate execution of the query by: accessing, via the first storage mechanism, values of at least one first field included in the first subset of the plurality of fields; accessing, via the second storage mechanism, values of at least one second field included in the second subset of the plurality of fields; and/or generating a query resultant for the query based on the values of the at least one first field and the values of the at least one second field.

FIGS. 25H and FIG. 25I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25H and/or FIG. 25I. In particular, a node 37 can utilize the query processing module 2435 to execute some or all of the steps of FIG. 25H and/or FIG. 25I, where multiple nodes 37 implement their own query processing modules 2435 to independently execute some or all of the steps of FIG. 25H and/or FIG. 25I, for example, to facilitate execution of a query as participants in a query execution plan 2405. Some or all of the method of FIG. 25H and/or FIG. 25I can be performed by utilizing the record storage module 2502, the query processing system 2501, the primary storage system 2506, and/or the secondary storage system 2508 in accordance with some or all features and/or functionality described in conjunction with FIGS. 25A-25G. Some or all of the method of FIG. 25H and/or FIG. 25I can be performed via a query execution module 2504. Some or all of the steps of FIG. 25H and/or FIG. 25I can optionally be performed by any other processing module of the database system 10. Some or all of the steps of FIG. 25H and/or FIG. 25I can be performed to implement some or all of the functionality of the record storage module 2502, the query processing system 2501, the primary storage system 2506, and/or the secondary storage system 2508 as described in conjunction with FIGS. 25A-25D. Some or all of the steps of FIG. 25H and/or FIG. 25I can be performed to implement some or all of the functionality regarding execution of a query via the plurality of nodes in the query execution plan 2405 as described in conjunction with FIGS. 24A-24D. Some or all steps of FIG. 25H and/or FIG. 25I can be performed by database system 10 in accordance with other embodiments of the database system 10 and/or nodes 37 discussed herein.

Step 2582 includes receiving a plurality of records of a dataset for storage. Each of the plurality of records can include a plurality of values corresponding to a plurality of fields of the dataset. For example, the plurality of records corresponds to a plurality of rows of one or more relational database tables, and/or the plurality of fields correspond to a plurality of columns of one or more relational database tables. The plurality of records of the dataset can be received as a stream of records that are received and stored over time, and/or can be received as a bulk set of records that are received and stored at a given time. The plurality of records of the dataset can be received via a wired and/or wireless connection with a data source supplying plurality of records, such as one or more computing devices communicating with and/or integrated within database system 10.

Step 2584 includes storing, for each of the plurality of records, values corresponding to a first subset of the plurality of fields via a first storage mechanism. This can include storing ones of the plurality of values of each record that correspond to the first subset of the plurality of fields via the first storage mechanism. The first subset of the plurality of fields can be non-null, can include a single field, and/or can include multiple fields. The first storage mechanism can correspond to a first one or more storage locations; a first one or more storage drives, memory resources and/or computing devices; a first storage scheme; and/or a first storage and/or retrieval protocol. In some embodiments, storing the values corresponding to the first subset of the plurality of fields via the first storage mechanism includes storing the values in a set of memory devices integrated within the database system. The first storage mechanism can be implemented utilizing some or all features and/or functionality of the primary storage system 2506 of FIGS. 25A-25G.

Step 2586 includes facilitating storage of, for each of the plurality of records, values corresponding to a second subset of the plurality of fields via a second storage mechanism. This can include storing ones of the plurality of values of each record that correspond to the second subset of the plurality of fields via the second storage mechanism. The second storage mechanism can be implemented utilizing some or all features and/or functionality of the secondary storage system 2508 of FIGS. 25A-25G.

A set difference between the second subset of the plurality of fields and the first subset of the plurality of fields can be non-null. The second subset of the plurality of fields and the first subset of the plurality of fields can be collectively exhaustive with respect to the plurality of fields. The second subset of the plurality of fields and the first subset of the plurality of fields can be mutually exclusive. Alternatively, at least one field in the first subset of the plurality of fields, such as one or more fields of a key field and/or a unique set field set of can also be included in the second subset of the plurality of fields.

The second storage mechanism can be different from the first storage mechanism. In various embodiments, the first storage mechanism includes storage via a first set of memory devices, and the second storage mechanism includes storage via a second set of memory devices that are distinct from the first set of memory devices. For example, the second storage mechanism can correspond to: a second one or more storage locations that are different from some or all of the first one or more storage locations of the first storage mechanism; a second one or more storage drives of the first storage mechanism, memory resources and/or computing devices that are different from some or all of the first one or more storage drives, memory resources and/or computing devices of the first storage mechanism; a second storage scheme that is different from the first storage scheme of the first storage mechanism; and/or a second storage and/or retrieval protocol that is different from the first storage and/or retrieval protocol of the first storage mechanism. In various embodiments, the first set of memory devices correspond to a first access efficiency level, and the second set of memory devices correspond to a second access efficiency level that is less favorable than the first access efficiency level. In various embodiments, the first storage mechanism corresponds to a file storage system and/or utilizes a non-volatile memory access protocol, such as a non-volatile memory express (NVMe) protocol. In various embodiments, the second storage mechanism corresponds to an object storage system. In various embodiments, the second storage mechanism corresponds to a collection of binary data stored as a single entity, for example, via a database management system. In various embodiments, the second storage mechanism corresponds to a Binary Large Object (BLOB), basic large object, and/or binary data type storage system.

In some embodiments, the second storage mechanism can include physical hardware and/or a storage scheme that is integrated within and/or managed by the database system 10. In such embodiments, facilitating storage of the values corresponding to the second subset of the plurality of fields via the second storage mechanism can include the database system storing these values utilizing its own storage resources as one or more storage transactions. For example, storage values via the second storage mechanism includes storing these values as objects in an object storage system implemented by one or more computing devices and/or storage resources of the database system 10.

Alternatively, the second storage mechanism can include physical hardware and/or a storage scheme that is managed by a separate object storage service, a third party storage service, a cloud storage service, and/or another storage entity that is distinct from the storage resources of the database system 10 but is accessible by the database system 10 via a wired and/or wireless network connection. For example, an object storage service, such as Amazon Simple Storage Service (S3), Azure Blob storage, and/or other object storage services can be utilized to implement the second storage mechanism. In such cases, facilitating storage of the values corresponding to the second subset of the plurality of fields via the second storage mechanism includes sending these values to a server system associated with this object storage service, third party storage service, cloud storage service, and/or other storage entity for storage via the storage resources of the object storage service, third party storage service, cloud storage service, and/or other storage entity. Facilitating storage of the values corresponding to the second subset of the plurality of fields via the second storage mechanism can include receiving storage confirmation data indicating successful storage of these values from the object storage service, third party storage service, cloud storage service, and/or other storage entity. In some embodiments, storing the values corresponding to the first subset of the plurality of fields via the first storage mechanism can also include sending these values to the same or different object storage service, third party storage service, cloud storage service, and/or other storage entity for storage, rather than storing these values via storage resources of the database system 10.

The storage of values corresponding to a second subset of the plurality of fields via the second storage mechanism, rather than the first storage mechanism, can be based on a data type corresponding to the second subset of the plurality of fields and/or other characteristics of values of the data included in the second subset of the plurality of fields. For example, the storage of values corresponding to a second subset of the plurality of fields via the second storage mechanism can be based on the second subset of the plurality of fields meeting predefined criteria for storage via the second storage system.

The second subset of the plurality of fields can be non-null, can include a single field, and/or can include multiple fields. The second subset of the plurality of fields can be null for some datasets stored via the database system, for example, based on determining none of the plurality of fields of the datasets have data types meeting the predefined criteria for storage via the second storage system.

The second subset of the plurality of fields can be automatically selected; can be predetermined; can be configured via user input; can be determined based on accessing information identifying the second subset of the plurality of field in memory; can be determined based on receiving information identifying the second subset of the plurality of fields; can be configured via administration sub-system 15 and/or configuration sub-system 16; and/or can otherwise be determined. The second subset of the plurality of fields can be automatically selected based on determining whether field in the plurality of fields meets the predefined criteria for storage via the second storage system, where fields that meet the predefined criteria for storage via the second storage system are included in the second subset of the plurality of fields.

In various embodiments the method includes receiving configuration data generated based on user input, and further includes determining the second subset of the plurality of fields based on the configuration data indicating selection of the second subset of the plurality of fields. The configuration data can be generated via a client device and/or another computing device communicating with the database system 10 and/or integrated within the database system 10, for example, based on user input to the client device in response to one or more prompts presented via an interactive user interface displayed via a display device of the client device. The configuration data can include identifiers indicating exactly which ones of the plurality of fields of a particular dataset be included in the second subset. The predefined criteria for storage via the second storage system can correspond to fields that are configured for storage via the second storage system in the configuration data. The configuration data can alternatively include other information, such as the predefined criteria for storage via the second storage system, indicating how fields of various datasets received by the database system for storage be automatically identified for inclusion in the second subset.

In various embodiments, some or all of the second subset of the plurality of fields correspond to an unstructured data type. The method can include selecting the second subset of the plurality of fields based on identifying at least one of the plurality of fields that corresponds to an unstructured data type. The predefined criteria for storage via the second storage system can indicate fields with unstructured data-types be stored via the second storage system. In such embodiments, some or all of the first subset of the plurality of fields can correspond to a structured data type. For example, the first subset of the plurality of fields are not selected for storage via the second storage mechanism based on having structured data types.

In various embodiments, some or all of the second subset of the plurality of fields correspond to fields that exceed and/or otherwise compare unfavorably to a data size threshold. The data size threshold can be automatically selected; can be predetermined; can be configured via user input; can be determined based on accessing information identifying the data size threshold in memory; can be determined based on receiving information identifying the data size threshold; can be configured via administration sub-system 15 and/or configuration sub-system 16; and/or can otherwise be determined. The method can include selecting the second subset of the plurality of fields based on identifying at least one of the plurality of fields that compares unfavorably to the data size threshold. For example, the at least one of the plurality of fields is determined to compare unfavorably to the data size threshold based on: having values for all records exceeding the data size threshold; having no bounds limiting a size of the value to fall within the data size threshold; based on the field corresponding to an unstructured data type; having values for at least one record exceeding the data size threshold; having values with an average data size exceeding the data size threshold; and/or based on other criteria. The predefined criteria for storage via the second storage system can indicate fields that compare unfavorably to the data size threshold be stored via the second storage system. In such embodiments, some or all of the first subset of the plurality of fields can fall within, and/or otherwise compare favorably to, the data size threshold. For example, the first subset of the plurality of fields are not selected for storage via the second storage mechanism based on comparing favorably to the data size threshold In various embodiments, some or all of the second subset of the plurality of fields correspond to long and/or variable-length binary data, long and/or variable-length string data, audio data, image data, video data, and/or multimedia data. The method can include selecting the second subset of the plurality of fields based on identifying at least one of the plurality of fields that corresponds to long and/or variable-length binary data, long and/or variable-length string data, audio data, image data, video data, and/or multimedia data. The predefined criteria for storage via the second storage system can indicate fields be stored via the second storage system if they correspond to: long and/or variable-length binary data, long and/or variable-length string data, audio data, image data, video data, and/or multimedia data. In such embodiments, some or all of the first subset of the plurality of fields do not correspond to long and/or variable-length binary data, long and/or variable-length string data, audio data, image data, video data, and/or multimedia data. For example, the first subset of the plurality of fields are not selected for storage via the second storage mechanism based on not corresponding to long and/or variable-length binary data, long and/or variable-length string data, audio data, image data, video data, and/or multimedia data.

In various embodiments, some or all of the second subset of the plurality of fields correspond to sensitive data fields and/or data fields with values requiring encryption. The method can include selecting the second subset of the plurality of fields based on identifying at least one of the plurality of fields that corresponds to sensitive data fields and/or data fields with values requiring encryption. Determining whether a field is sensitive and/or requires encryption can be based on: an automatic selection; predetermined information; configuration of these fields via user input; accessing information identifying which fields require encryption in memory; receiving information identifying which fields require encryption; configuration via administration sub-system 15 and/or configuration sub-system 16; and/or another determination. The method can further include generating encrypted data corresponding to the at least one of the plurality of fields for each of the plurality of records. The predefined criteria for storage via the second storage system can indicate fields be stored via the second storage system if they correspond to sensitive data fields and/or correspond to data fields with values requiring encryption. Facilitating storage of the ones of the plurality of values corresponding to the second subset of the plurality of fields via the second storage mechanism for each of the plurality of records can include storing the encrypted data corresponding to the at least one of the plurality of fields via the second storage mechanism. In such embodiments, some or all of the first subset of the plurality of fields do not correspond to sensitive data fields and/or do not have values requiring encryption. For example, the first subset of the plurality of fields are not selected for storage via the second storage mechanism based on not corresponding to sensitive data fields and/or do not having values requiring encryption.

Step 2588 includes facilitating execution of a query against the dataset. The query for execution against the dataset can be received and/or otherwise determined. The method can include receiving and/or determining the query. The query can correspond to a query expression entered and/or selected via user input, such as a SQL query expression and/or a query expression written in any query language. The query can be generated via a client device and/or another computing device communicating with the database system 10 and/or integrated within the database system 10, for example, based on user input to the client device in response to one or more prompts presented via an interactive user interface displayed via a display device of the client device.

Performing step 2588 of FIG. 25H can include performing some or all of steps 2590, 2592, and/or 2594 of FIG. 25I. Step 2590 includes accessing, via the first storage mechanism, values of at least one first field included in the first subset of the plurality of fields. Step 2592 includes accessing, via the second storage mechanism, values of at least one second field included in the second subset of the plurality of fields. Step 2594 includes generating a query resultant for the query based on the values of the at least one first field and the values of the at least one second field. The at least one first field can include a single field or multiple fields. The at least one second field can include a single field or multiple fields.

The method can further include displaying the query resultant via a display device and/or sending the query to another computing device for display and/or further processing. For example, the query resultant is sent to the client device that sent the query expression or otherwise requested the query. The query resultant can be displayed via the interactive user interface of the client device and/or via a display device of the client device.

In various embodiments, the method further includes identifying a subset of the plurality of records with values of the at least one first field that compares favorably to filtering parameters of the query. The query resultant can be generated to include a set of values of the at least one second field corresponding to only ones of the plurality of records included in the subset of the plurality of records.

In various embodiments, the plurality of fields of the dataset includes a unique identifier field set, where the unique identifier field set is included in the first subset of the plurality of fields, and/or where the unique identifier field set is included in the second subset of the plurality of fields. The unique identifier field set can include one or more fields that are guaranteed to have values unique to the corresponding record in the plurality of records. In some embodiments, the unique identifier field set includes a proper subset of fields of the first subset of the plurality of fields. In some embodiments, the unique identifier field set includes all fields of the first subset of the plurality of fields.

In various embodiments, facilitating execution of the query further includes identifying a set of unique identifier values by retrieving, via the first storage mechanism, values of the unique identifier field set for only records in the subset of the plurality of records. Facilitating execution of the query can further include identifying the set of values by retrieving, via the second storage mechanism, values of the second subset of the plurality of fields for only records of the plurality of records having one of the set of unique identifier values.

In various embodiments, facilitating execution of the query further includes identifying a first relational table that includes values of a union of the at least one first field and the unique identifier field set for records in the subset of the plurality of records. Facilitating execution of the query can further include identifying a second relational table that includes values of a union of the at least one second field and the unique identifier field set for records in the plurality of records. Facilitating execution of the query can further include performing a join operation upon the first relational table and the second relational table to identify the set of values, wherein a join predicate of the join operation indicates equality of values for the unique identifier field set of the first table and for the unique identifier field set of the second table. The set of values can correspond to only ones of the at least one second field that are outputted via execution of the join operation.

In various embodiments, the second storage mechanism corresponds to an object storage system. Facilitating storage of ones of the plurality of values corresponding to the second subset of the plurality of fields via the second storage mechanism can include, for each record of the plurality of records, facilitating storage of the value for the at least one second field of the each record as a corresponding object in the object storage system. Facilitating storage of ones of the plurality of values corresponding to the second subset of the plurality of fields via the second storage mechanism can include, for each record of the plurality of records, facilitating storage of the value of the unique identifier field set of the each record as object metadata of the corresponding object in the object storage system. The set of values can be identified based on identifying a corresponding set of objects in the object storage system with object metadata indicating a value of unique identifier field set that matches a corresponding one of the set of unique identifier values.

In various embodiments, the method can further include determining the filtering parameters and the at least one first field based on a query expression of the query indicating the filtering parameters be applied to the at least one first field. For example, the filtering parameters are indicated as one or more query predicates, and/or are included as predicates and/or parameters following a WHEREIN clause of a SELECT statement. The filtering parameters can correspond to a selection portion of the query expression and/or can indicate criteria defining which records be included in and/or utilized to generate the query resultant.

In various embodiments, the method can further include determining the at least one second field based on the query expression of the query indicating projection and/or output of the at least one second field. For example, the query expression indicates values of the at least one second field be included in the query resultant and/or be utilized to generate the query resultant for any records that meet the filtering parameters. The at least one second field can be indicated for projection in a SELECT statement of the query expression.

In various embodiments, selecting the second subset of the plurality of fields is based on identifying at least one of the plurality of fields that corresponds to a projection-only column type for the dataset. The projection-only column type can be configured, predefined as the criteria for a field being included in the second subset of the plurality of fields, and/or can be otherwise determined. The second subset of the plurality of fields can include the at least one second field based on determining the at least one second field corresponds to the projection-only column type. The filtering parameters of the query are not applied to the at least one second field based on the at least one second field corresponding to the projection-only column type.

In various embodiments, the method can further include generating query expression restriction data indicating the at least one of the plurality of fields that corresponds to the projection-only column type for the dataset. The query expression restriction data to a client device, for example, for display, storage and/or for use in conjunction with execution of application data corresponding to the database system via the client device. The method can include receiving the query expression from the client device, where the client device generated the query expression based on user input and further based on the query expression restriction data. As a particular example, the client device can disallow sending of and/or execution requests for query expressions that include filtering parameters that utilize columns identified as projection-only columns for the dataset based on their indication in the query expression restriction data. The user can be prompted to edit and/or re-enter queries based on the user having entered and/or requested a query expression that includes filtering parameters utilizing columns identified as projection-only columns via the interactive user interface. The client device can send query expressions for execution via the database system only if they do not include filtering parameters utilizing columns identified as projection-only columns and/or if they otherwise adhere to the query expression restriction data. Alternatively or in addition, the database system only executes received query expressions if they do not include filtering parameters utilizing columns identified as projection-only columns and/or if they otherwise adhere to the query expression restriction data.

In various embodiments, the method includes generating a first plurality of indexes corresponding to the at least one first field. The method can further include generating a second plurality of indexes corresponding to the at least one second field. In some cases, some or all individual fields of the first subset of the plurality of fields and/or the second subset of the plurality of fields are indexed, separately or in conjunction, via a corresponding plurality of indexes. Storage of the ones of the plurality of values of the first subset of the plurality of fields via the first storage mechanism can include storing values of first subset of the plurality of fields in conjunction with the first plurality of indexes and the second plurality of indexes via the first storage mechanism. For example, an indexing scheme is utilized to store the values of first subset of the plurality of fields based on the first plurality of indexes and/or the second plurality of indexes.

The second plurality of indexes can be generated based on values and/or other information in the at least one second field. For example, the values of first subset of the plurality of fields for each given record are clustered, organized, and/or are otherwise stored and/or indexed in accordance with indexes generated based on the original values of at least one second field of the given record. The second plurality of indexes can be substantially smaller than and/or can be stored more efficiently than the original values of the corresponding at least one second field.

In such embodiments, the query expression of the query can further indicate the filtering parameters be applied to the at least one second field. In some cases, the query expression of the query can indicate the filtering parameters be applied to only the at least one second field and not to any fields in the first subset of the plurality of fields. The subset of the plurality of records can be identified based on utilizing the second plurality of indexes, where the subset of the plurality of records is filtered by applying filtering parameters to regarding the at least one second field. In some embodiments, the actual values of the at least one second field are not accessed via the second storage mechanism, despite the filtering parameters involving these fields, yet the query is executed correctly due to the generation and use of the second plurality of indexes via access of records via the first storage mechanism to determine the subset of the plurality of records.

In various embodiments, storing the ones of the plurality of values corresponding to the first subset of the plurality of fields via the first storage mechanism for each of the plurality of records includes generating a plurality of segments corresponding to a plurality of mutually exclusive proper subsets of the plurality of records. Each of the plurality of segments stores, in accordance with a column-based format, the values corresponding to the first subset of the plurality of fields for records included in a corresponding one of the plurality of mutually exclusive proper subsets of the plurality of records. Each segment can be included in a segment group that includes a set of multiple segments. In such cases, each segment can further include parity data utilized to recover other segments in the same segment group.

In various embodiments, storing the ones of the plurality of values corresponding to the first subset of the plurality of fields via the first storage mechanism for each of the plurality of records includes storing the plurality of segments via a plurality of computing devices of the first storage mechanism. Facilitating execution of the query can include identifying, via each of the plurality of computing devices, a computing device subset of the plurality of records with values of the at least one first field that compares favorably to filtering parameters of the query based on accessing ones of the plurality of segments stored by the each of the plurality of computing devices, wherein the subset of the plurality of records is identified as a union of a plurality of computing device subsets identified via the plurality of computing devices.

For example, the subset of the plurality of records is identified by a particular node based on data blocks received from each of a set of child nodes in a query execution plan as discussed in conjunction with FIGS. 24A-24D. The data blocks received from a given child node indicate only ones of the set of records stored by and/pr accessible by the node that meet filtering parameters of the corresponding query. In such cases, the parent node can facilitate projection of the set of values included in the resultant via accessing these values via the second storage mechanism. For example, accessing values of the at least one second field via the second storage mechanism is performed as an intermediate and/or final step of the query execution via one or more inner level nodes and/or a root level node after the filtered subset of records is first identified based on a union of subsets generated by a plurality of IO level nodes.

Alternatively, each IO level node and/or multiple inner level nodes can optionally retrieve their own subset of projected values, via accessing values of the at least one second field via the second storage mechanism, based on first identifying their own subset of their own stored records by applying the filtering parameters, where these projected values are included in data blocks emitted by these nodes, and where a parent node, such as a root level node, identifies the query resultant as a union of projected values received from a set of child nodes.

In various embodiments, a non-transitory computer readable storage medium includes at least one memory section that stores operational instructions that, when executed by a processing module that includes a processor and a memory, causes the processing module to: receive a plurality of records of a dataset for storage, where each of the plurality of records include a plurality of values corresponding to a plurality of fields of the dataset; store, for each of the plurality of records, ones of the plurality of values corresponding to a first subset of the plurality of fields via a first storage mechanism; facilitate storage of, for each of the plurality of records, ones of the plurality of values corresponding to a second subset of the plurality of fields via a second storage mechanism that is different from the first storage mechanism based on a data type corresponding to the second subset of the plurality of fields; determining a query for execution against the dataset; and/or facilitate execution of the query. The operational instructions, when executed by the processing module that includes a processor and a memory, can cause the processing module to facilitate execution of the query by: accessing, via the first storage mechanism, values of at least one first field included in the first subset of the plurality of fields; accessing, via the second storage mechanism, values of at least one second field included in the second subset of the plurality of fields; and/or generating a query resultant for the query based on the values of the at least one first field and the values of the at least one second field.

Figure 26A:
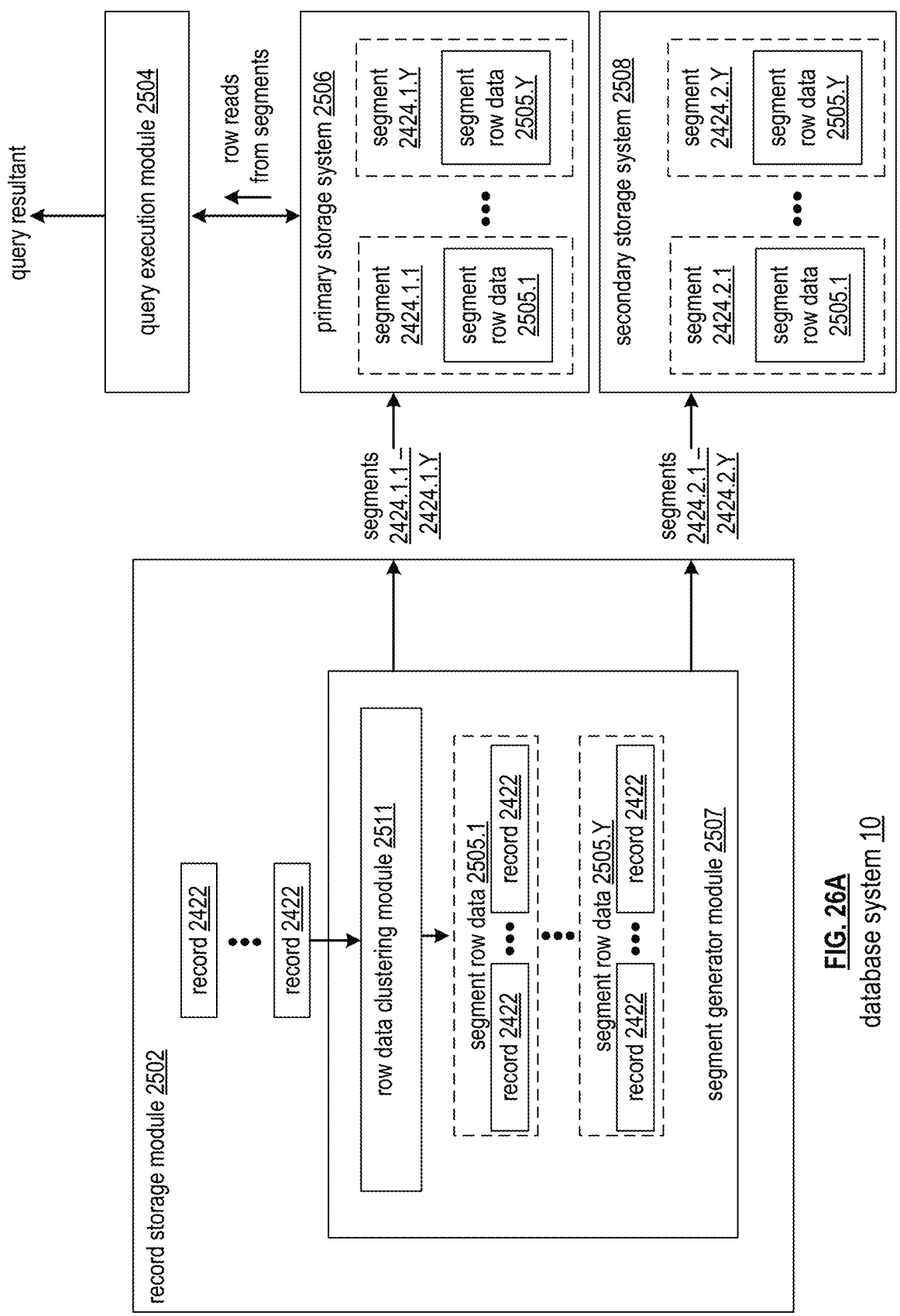
FIG. 26A is a schematic block diagram illustrating a record storage module that in accordance with various embodiments of the present invention.
Figure 26B:
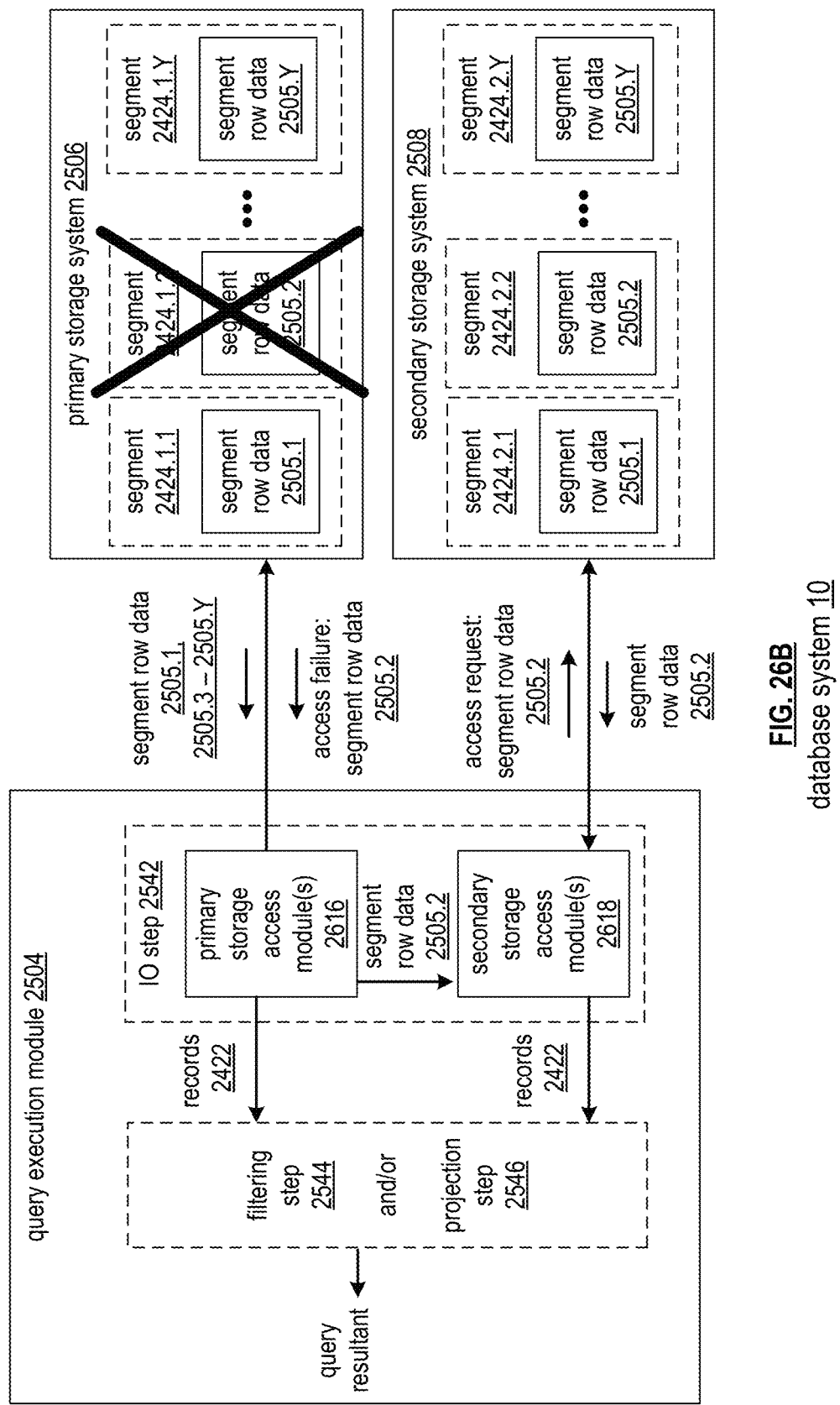
FIG. 26B is a schematic block diagram illustrating a query execution module in accordance with various embodiments of the present invention.
Figure 26C:
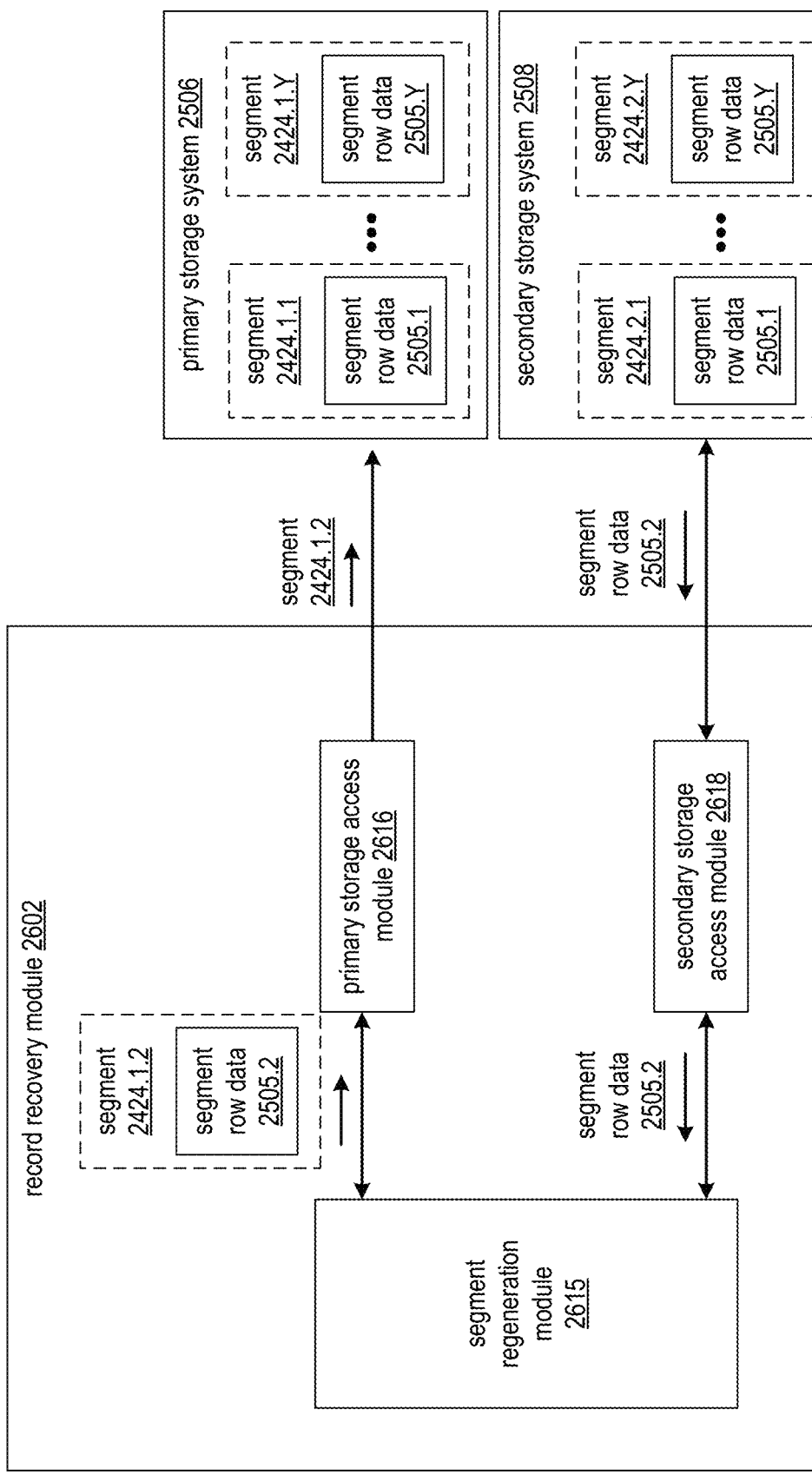
FIG. 26C is a schematic block diagram illustrating a record recovery module in accordance with various embodiments of the present invention.

FIGS. 26A-26C illustrate another embodiment of a database system that stores and access records via multiple storage mechanisms. Alternatively or additionally to storing different fields of records via a primary storage system 2506 and a secondary storage system 2508 as discussed in conjunction with FIGS. 25A-25I, the database system 10 can be implemented to store segment row data that includes values for some or all fields of records 2422 of one or more datasets via a primary storage system 2506 and a secondary storage system 2508. Some or all features and/or functionality of the database system 10 of FIGS. 26A-26C can be utilized to implement the database system 10 of FIG. 1 and/or FIG. 1A, and/or any other embodiments of the database system 10 described herein.

In some embodiments, alternatively or in addition to generating segments in same segment groups of multiple segments for recovery with parity data, a segment can be generated such that every segment is written once to a primary storage system 2506 and once to a secondary storage system 2508. For example, the primary storage system 2506 can be implemented as a long term storage system and/or a plurality of NVMe drives that are accessed to implement query execution in all, most, and/or normal conditions, while the secondary storage system 2508 can be implemented as an object storage system and/or a plurality of spinning disks that are accessed to implement query execution in abnormal condition, rarely, and/or never. For example, the primary purpose of the primary storage system 2506 can be to facilitate query executions, while the primary purpose of the secondary storage system 2508 can be to redundantly store the records for access and/or recovery if a failure of storage resources and/or access to records via the primary storage system 2506 occurs. The primary storage system 2506 can be implemented via any features and/or functionality of the primary storage system 2506 discussed in conjunction with FIGS. 25A-25G and/or the secondary storage system 2508 can be implemented via any features and/or functionality of the secondary storage system 2508 discussed in conjunction with FIGS. 25A-25G.

Data stored via the secondary storage system 2508 can be stored in accordance with a higher durability than data stored via the primary storage system 2506. For example, the secondary storage system 2508 is implemented utilizing multi-site durability and/or otherwise enables restoring the data via a different site if necessary. In some embodiments, the primary storage system 2506 is not implemented utilizing multi-site durability and/or otherwise does not enable restoring the data via a different site. For example, recovery of data stored via the primary storage system 2506 requires corresponding data to be accessed via the secondary storage system 2508.

In such embodiments, nodes 37 that implement the primary storage system 2506 and/or the query execution module 2504 optionally do not implement the functionality of FIG. 24D and/or otherwise do not participate in the recovery of segments 2424. The functionality of FIG. 24D and/or other recovery of segments 2424 can optionally be performed instead by different nodes 37 that implement the secondary storage system 2508 and/or other processing and/or memory resources of the secondary storage system 2508.

Storing records via a primary storage system 2506 and secondary storage system 2508 in this fashion improves the technology of database system by increasing the efficiency of storage and/or processing resources utilized to facilitate query executions. For example, memory drives 2425 of nodes 37 of IO level 2416 utilized to implement the primary storage system and/or a plurality of NVMe drives utilized to implement the primary storage system are treated as more transient storage and/or are not utilized to rebuild data. This can enable these storage and/or processing resources to direct all resources upon executing queries rather than durably storing data and/or recovering data, improving the efficiency of query executions.

Meanwhile, as this data is durably stored and recoverable via the secondary storage system 2508, query correctness can still be guaranteed and/or data is guaranteed to be recoverable based on a fault-tolerance level dictated by the durability and/or storage scheme of the secondary storage system 2508. Processing and/or memory resources of the secondary storage system 2508, such as a distinct set of computing devices 18 that are separate from computing devices 18 with nodes 37 that implement the query execution module 2405, can perform rebuilds and/or recover data as failures occur, ensuring all data remains accessible while not affecting normal performance in query execution and/or without affecting performance of nodes 37 implementing the query execution module 2405.

Storing records via a primary storage system 2506 and secondary storage system 2508 in this fashion can further improve the technology of database system by implementing redundancy via memory resources of the secondary storage system 2508, such as an object storage system and/or a plurality of spinning disks, that are less expensive than memory resources of the primary storage system 2506, such as a plurality of NVMe drives. Storing records via a primary storage system 2506 and secondary storage system 2508 in this fashion can further improve the technology of database system by implementing redundancy via memory resources of the secondary storage system 2508, such as an object storage system and/or a plurality of spinning disks, that enable less efficient access than memory resources of the primary storage system 2506, such as a plurality of NVMe drives In particular, the higher access efficiency resources are accessed to perform query executions, which occur more frequently and/or which require faster access to ensure queries are performed efficiently and/or in a timely fashion, while lower cost resources are utilized to perform data rebuilds for failures that occur less frequently and/or that do not need to be completed in a timely fashion.

Storing records via a primary storage system 2506 and secondary storage system 2508 in this fashion can further improve the technology of database system by enabling smaller segment groups to be generated. In particular, rather than generating segments via segment groups that includes a larger number of segments to improve fault-tolerance in cases where segments become unavailable as discussed previously, same or similar levels of fault-tolerance can be achieved via redundant storage via the secondary storage system 2508. Thus the segments generated for storage via the via the primary storage system 2506 and/or the secondary storage system 2508 can be in accordance with a segment group that includes a single segment and/or a smaller number of segments. Enabling segment generation via segment groups that includes a smaller number of segments can improve the clustering attained by each segment group and/or each individual segment, and/or can reduce the number of records required for processing into segments at a given time. This reduction in records required to generate segments of a segment group at a given time can increase the rate at which incoming data is redundantly stored via the database system 10 and/or can increase the rate at which incoming data becomes available for access in query executions. This reduction in records required to generate segments of a segment group at a given time can reduce the amount of memory resources required to generate segments at a given time, for example, where a smaller number of nodes are allocated to generate segments, allowing other nodes to be utilized to perform other tasks of the database system 10, thus improving efficiency of performance of these other tasks.

This functionality can also be particularly useful in massive scale databases implemented via large numbers of nodes, as the efficiency of IO level nodes is improved, and/or the resource allocation of individual nodes is improved to further increase efficiency of query executions facilitated across a large number of nodes, for example, participating in a query execution plan 2405 as discussed in conjunction with FIG. 24A. This can further improves the technology of database systems by enabling processing efficiency and/or memory resource allocation to be improved for many independent elements, such as a large number of nodes 37, that operate in parallel to ensure data is stored and/or that queries are executed within a reasonable amount of time, despite the massive scale of the database system, while ensuring that data is still recoverable in the case of failure.

FIG. 26A illustrates an embodiment of a database system 10 that generates and stores segments via a primary storage system 2506 and a secondary storage system 2508. Some or all features and/or functionality of the database system 10 of FIG. 26A can be utilized to implement the database system of FIG. 1, of FIG. 1A, and/or of any other embodiment of database system 10 described herein.

The database system can implement a record storage module 2502. The record storage module 2502 of FIG. 26A can be implemented utilizing some or all features and/or functionality of the record storage module 2502 discussed in conjunction with FIGS. 25A-25G and/or FIG. 27A. The record storage module 2502 of FIG. 26A can optionally operate in a different fashion from the record storage module 2502 discussed in conjunction with FIGS. 25A-25G and/or FIG. 27A.

The record storage module 2502 can receive a plurality of records 2422, for example, of one or more datasets 2500. Each record 2422 can include data values for some or all of a plurality of fields of a corresponding dataset 2500 as discussed previously.

A segment generator module 2507 can generate segments 2424 for storage via primary storage system and secondary storage system from the plurality of records. The segment generator module 2507 can be implemented in a same or similar fashion as the segment generator module 2507 of FIG. 25F.

A row data clustering module 2511 can generate a plurality of segment row data 2505.1-2505.Y from the plurality of records 2422, for example, in a same or similar fashion as the row data clustering module 2511 of FIG. 25F. Unlike the embodiment of FIG. 25F, each segment row data 2505 can optionally full records 2422, where values of all fields of each record are included. This can include performing a similarity function, clustering algorithm, and/or grouping records based on values of one or more fields, such as primary key fields and/or cluster key fields. This can include performing some or all functionality discussed in conjunction with FIGS. 15-23.

In some embodiments, a plurality of sets of segment row data 2505 can each correspond to one of a plurality of segment groups, where each segment group includes a same number of segment row data 2505, and/or where each segment row data 2505 is included in exactly one segment group. In such embodiments, segments 2424 can further include parity data, such as parity data 2426, which can be utilized to rebuild segments 2424, for example, as discussed in conjunction with FIG. 25D. For example, segments 2424 are generated to include parity data 2426 based on a set of segment row data 2505 included in a same segment group by performing a redundancy storage encoding function in accordance with a redundancy storage encoding scheme. As a particular example, segment groups and/or parity data are generated in a same or similar fashion as discussed in conjunction with FIG. 27A by performing a corresponding redundancy storage encoding function, where parity data is included in corresponding segments rather than being stored separately.

In some embodiments, a single set of segments 2424.1-2424.Y that include a plurality of records are generated, and this single set of segments 2424.1-2424.Y is stored once in primary storage system 2506 and once in secondary storage system 2508. In such embodiments, every segment 2424 is stored in exactly two locations: one location via primary storage system 2506, and one location via secondary storage system 2508. Thus, every record 2422 is stored in exactly two locations: one location via primary storage system 2506 in a corresponding segment 2424, and one location via secondary storage system 2508 in a corresponding segment 2424.

Alternatively, in other embodiments, two different sets of segments can be generated from the plurality of records. As illustrated in FIG. 26B, a first set of segments 2424.1.1-2424.1.Y are generated for storage via primary storage system 2506, and a second set of segments 2424.2.1-2424.2.Y are generated for storage via primary storage system 2506. In some embodiments, for example, as illustrated in FIG. 26A, each given segment row data 2505 is stored exactly twice, via one segment in the primary storage system 2506, and via a second segment in the secondary storage system 2508.

For example, segment row data 2505.1 is stored in primary storage system 2506 as part of segment 2424.1.1, and is also stored in secondary storage system 2508 as part of segment 2424.2.1. However, despite including the same segment row data 2505.1, segment 2424.1.1 and segment 2424.2.1 can be different, for example, based on: being in accordance with different structures and/or formats; based on having different parity data, different index data, and/or different metadata; being generated in accordance with different redundancy storage encoding schemes; and/or based on otherwise being generated in a different fashion, while still including segment row data 2505.1.

As a particular example, segment 2424.1.1 includes no parity data based on being generated for storage via the primary storage system 2506, while segment 2424.2.1 includes parity data based on being generated for storage via the secondary storage system 2508. As another particular example, segment 2424.1.1 includes first parity data generated via a first redundancy storage encoding scheme, and segment 2424.2.1 includes second parity data generated via a second redundancy storage encoding scheme that is more durable and/or has a higher fault-tolerance than the first redundancy storage encoding scheme.

As another particular example, segment 2424.1.1 includes first parity data generated from a corresponding first segment group segment that includes a first number of segments, and 2424.2.1 includes second parity data generated via a second segment group segment that includes a second number of segments that is larger than the first number of segments. In such cases, the segment 2424.1.1 is not recoverable from other segments stored in the primary storage system 2506, while the segment 2424.2.1 is recoverable from other segments stored in the secondary storage system 2508 to render the secondary storage system 2508 having a higher durability than the primary storage system 2506

As another particular example, the second number of segments can be in accordance with a corresponding second redundancy storage encoding scheme that is more durable and/or has a higher fault-tolerance than a first redundancy storage encoding scheme corresponding to the first number of segments. For example, the second number of segments in the second segment group being larger than the first number of segments in the first segment group can enable a greater number of failures while guaranteeing recovery of segments in the second segment group than in the first segment group. In such cases, the number of segments in the first segment group can be equal to 1, or can be strictly greater than 1. In cases where the number of segments in the first segment group is strictly greater than 1, both the first set of segments stored via the primary storage system 2506 and the second set of segments stored via the secondary storage system include parity data, where the segments in the primary storage system 2506 can be optionally recovered via other segments from the same segment group stored via the primary storage system 2506.

Alternatively or in addition to having different structures, types of parity data, redundancy storage encoding schemes, and/or segment group sizes, segment 2424.1.1 and segment 2424.2.1 can be different based on storing different segment row data 2505.1, for example, where the segment row data 2505 of both segment 2424.1.1 and segment 2424.2.1 include a first particular record 2422, where the segment row data 2505 of segment 2424.1.1 includes a second particular record 2422, and where the segment row data 2505 of segment 2424.2.1 does not include the second particular record 2422 based on the second particular record 2422 being included in different segment row data 2505 of another segment stored via the secondary storage system 2508. In such embodiments, the first set of segments 2424.1.1-2424.1.Y can have a number of segments $Y_1$ that is different from the number of segments $Y_2$ of the second set of segments 2424.1.1-2424.1.Y based on the segment row data 2505 of the first set of segments being generated to cluster records differently and/or to include different numbers of records than the segment row data 2505 of the second set of segments.

For example, the segment row data 2505 of each of the first number of segments includes a first number of records and/or is selected in accordance with a first clustering scheme, and the segment row data 2505 of each of the second number of segments includes a different, second number of records and/or is selected in accordance with a different, second clustering scheme. The differences in clustering of records to render different segment row data 2505 can be based on differences in storage schemes of primary storage system 2506 and secondary storage system 2508, such as differences in their respective redundancy storage encoding schemes and/or differences in the number of segments in segment groups utilized to generate segments for storage in the primary storage system 2506 and secondary storage system 2508, respectively.

As illustrated in FIG. 26A, the query execution module 2504 can execute queries via access to the primary storage system via row reads from segments 2424 stored in the primary storage system. For example, access to segments via primary storage system 2506 implements an IO step 2542 performed by query execution module 2504 in executing a corresponding query. Alternatively or in addition, access to segments via primary storage system 2506 is performed by nodes 37 at IO level 2416 participating in a query execution plan 2405 implemented by query execution module to execute a corresponding query. In particular, primary storage system 2506 can be implemented via storage resources, such as memory drives 2425, of nodes 37 that participate at IO level 2416 for some or all queries. In such embodiments, the nodes 37 can perform the row reads in a same or similar fashion discussed in conjunction with FIG. 24C. The query execution module 2504 can optionally perform a filtering step 2544 and/or projection step 2546 in accordance with a corresponding query expression, for example, as discussed in conjunction with FIG. 25B, where values read in the projection step 2546 are read from the primary storage system 2506, for example, as an additional part of the IO step 2542 and/or as part of reading the respective records 2422 from segments 2424 stored via the primary storage system 2506.

In some embodiments, all record reads utilized to facilitate IO in query executions are performed by accessing corresponding segments 2424 that store these records 2422 in primary storage system 2506, where secondary storage system 2508 is never accessed to facilitate query executions. For example, secondary storage system 2508 is only accessed to recover segments that become unavailable and/or encounter storage failures in primary storage system 2506. In such cases, secondary storage system 2508 purely serves the purposes of redundant segment storage and segment recovery.

In other embodiments, in some cases and/or in rare cases, some record reads utilized to facilitate IO in query executions are performed by accessing corresponding segments 2424 that store these records 2422 in secondary storage system 2508, where secondary storage system 2508 is sometimes accessed to facilitate query executions. For example, secondary storage system 2508 is accessed in query execution to read records and/or corresponding segments that are unavailable and/or encounter storage failures in primary storage system 2506.

As these records may be required to ensure a query resultant is correct, rather than awaiting the recovery of these segments upon primary storage system 2506, the query execution module 2504 can read corresponding segments and/or records from secondary storage system 2508 as part of the IO step 2542. This can further improve the technology of database systems by reducing the wait time for query execution, while enabling most processing resources to perform optimally via access to only primary storage system 2506. In particular, in some or all given queries, only a small proportion of records and/or segments are read from the secondary storage system 2508 based on a failure rate of primary storage system 2506 being correspondingly small and/or based on a recovery rate of re-storing unavailable records being correspondingly fast.

FIG. 26B illustrates an embodiment of database system 10 where the query execution module accesses the secondary storage system 2508 to read records via one or more segments 2424 stored via secondary storage system 2508 whose corresponding segments 2424 in primary storage system 2506 are unavailable. Some or all features and/or functionality of the database system 10 of FIG. 26B can be utilized to implement the database system 10 of FIG. 26A and/or any other embodiment of database system 10 described herein.

In the example illustrated in FIG. 26B, segment 2424.1.2 is unavailable for access via the primary storage system 2506. For example segment 2424.1.2 is unavailable for access via the primary storage system 2506 due to a corresponding failure condition, such as the memory drive 2425 of primary storage system 2506 that stores segment 2424.1.2 failing and/or a node 37 of primary storage system 2506 that stores and/or accesses segment 2424.1.2 failing and/or being offline.

The query execution module 2405 can implement one or more primary storage access modules 2616. For example, the one or more primary storage access modules 2616 are implemented via a plurality of nodes 37 participating at IO level 2416 of a corresponding query that access segments 2424 stored via primary storage system 2506 by accessing segments 2424 stored in their own memory drives 2425, where memory drives 2425 of node 37 participating at IO level 2416 implement some or all memory resources of the primary storage system 2506 as discussed previously. All available segments required for execution of a corresponding query, and/or a set of segments assigned to nodes 37 for access via IO level 2416 based on assignment data and/or recent storage health and/or availability data, can have their corresponding records 2422 read from primary storage system 2506 via the primary storage access modules 2616 in accordance with the query execution.

However, at least one segment, such as segment 2424.1.2 in this example, can be unavailable for access due to a storage failure. Corresponding segment row data 2505 can be read from corresponding segments stored in secondary storage system 2508 via a secondary storage access module. For example, as illustrated in the example of FIG. 26B, at least one primary storage access module 2616 sends a notification to one or more secondary storage access modules 2618 indicating segment row data 2505.2 must be read from secondary storage system 2508. For example, the primary storage access module 2616 sends this notification based on encountering an access failure and/or detecting the failure condition when attempting to read segment row data 2505. As another example, the segment row data 2505.2 was already determined to be unavailable, for example, based on previous detection of the corresponding failure condition, and/or secondary storage access modules 2618 determines to read segment row data 2505.2 from secondary storage system 2508 based on a prior request and/or determination.

As illustrated via FIG. 26B, the segment row data 2505 can be read based on an access request to read segment row data 2505.2 and/or based on a request to read segment row data from a corresponding segment 2424.2.2 that is the same as or different from segment 2424.1.2. Some or all of the segment row data 2505 can be read in response. In embodiments where segment row data 2505 of segment stored in secondary storage system is different for segments stored in primary storage system, the one or more secondary storage access modules can otherwise determine and/or request particular records and/or particular segments storing the particular records that are unavailable for access via primary storage system 2506.

Thus, raw and/or processed records 2422 outputted via primary storage access modules 2616 and secondary storage access modules 2618 can render a full set of required record reads and/or IO data blocks for the corresponding query. The secondary storage access modules 2618 can output substantially less records than primary storage access modules 2616 based on a small proportion of segments being unavailable at any given time. This can be ideal in ensuring that records are predominantly accessed via the more efficient access to primary storage system 2506 in query executions. Further processing, such as filtering step 2544 and/or projection step 2546 and/or one or more query operators performed upon data values of records in accordance with the query, can be performed to ultimately render the query resultant.

The one or more secondary storage access modules 2618 can be implemented via distinct processing and/or memory resources from the one or more primary storage access modules 2616. For example, the one or more primary storage access modules 2616 are implemented via a first set of nodes 37 and/or computing devices 18, and the one or more secondary storage access modules 2618 are implemented via a second set of nodes 37 and/or computing devices 18 that are distinct from the first set of nodes 37 and/or computing devices 18. Alternatively, some or all of the one or more secondary storage access modules 2618 can be implemented via shared processing and/or memory resources with the one or more primary storage access modules 2616.

For example, one or more nodes 37 participating at the IO level of the query execution plan 2405 and/or having memory drives 2425 that implement the primary storage system 2506 can be further operable to communicate with the secondary storage system 2508. For example, a given node 37 implementing one or more primary storage access modules 2616 reads a first set of records from segments 2424 stored via primary storage system, for example via access to its own memory drives 2425, and/or reads a second set of records from other segments 2424 stored via secondary storage system 2508.

As a particular example, this given node 37 can read the second set of records from other segments 2424 stored via secondary storage system 2508 based on being assigned to read these records from corresponding segments stored via one of its own memory drives 2425, and further based on determining these records are not available for access via the one of its own memory drives 2425, for example, due to a failure of the one of its own memory drives 2425.

The given node 37 can be separate from the secondary storage system 2508, where the node 37 does not have memory drives or other storage resources implementing the secondary storage system 2508. In such embodiments, the given node 37 can send access requests to the secondary storage system 2508 that is implemented via a separate set of memory devices, where the given node 37 communicates with the secondary storage system 2508 via system communication resources 14, one or more external networks 17, and/or via another wired and/or wireless connection with the secondary storage system 2508 to request and receive the corresponding segment row data accordingly.

In other embodiments, secondary storage system 2508 is optionally implemented via additional memory drives 2425 and/or other types of memory devices of nodes 37 participating at IO level 2416, such as slower and/or less efficient memory devices of nodes 37. A given node 37 can access a first set of its memory resources, such as its own memory drives 2425, to read the first set of records, and also accesses a second set of its memory resources, such as other memory devices, to read the second set of records.

In other embodiments, some nodes 37 only implement storage resources of the secondary storage system. For example these nodes 37 only participate at IO level of query execution plans when they store segments via secondary storage system 2508 whose records are required for the query and are not available for access via the primary storage system 2506.

FIG. 26C illustrates an embodiment of database system 10 that implements a record recovery module 2602 to recover segment row data 2505 of one or more segments. The record recovery module 2602 can be implemented via one or more computing devices 18 and/or via other processing and/or memory resources of the database system 10. Some or all features and/or functionality of the database system 10 of FIG. 26C can be utilized to implement the database system 10 of FIG. 26A and/or any other embodiment of database system 10 described herein.

The record recovery module 2602 can determine to recover particular segment row data 2505 based on detecting a storage failure of the particular segment row data 2505. This can include determining a node 37 and/or memory drive 2425 storing the segment row data 2505 has failed, gone offline, is performing unfavorably, and/or otherwise encounters a failure condition. This can include determining a segment is unavailable for access, for example, when attempting to read the segment in query execution as discussed in conjunction with FIG. 26B. In this example, segment 2424.1.2 is determined to be unavailable, for example, based on the access failure illustrated in FIG. 26B.

The record recovery module 2602 can retrieve segment row data 2505.2 from segment 2424.2.2 stored in secondary storage system via a secondary storage access module 2618, which can be the same as or different from the one or more secondary storage access modules 2618 of FIG. 26B. This access to segment row data 2505.2 can be the same access performed by secondary access storage module 2618 utilized by query execution module 2504 as part of the IO step of the query execution in FIG. 26B. This access to segment row data 2505.2 can alternatively be separate from an IO step of a query execution and/or can be for the purposes of re-storing the segment row data 2505.2 in primary storage system 2506 only.

In cases where segment row data 2505 for segments in secondary storage system is different from segment row data 2505 for segments in primary storage system, multiple segments and/or portions of multiple different segment row data 2505 that includes all records of a single segment row data 2505 of the primary storage system can be accessed in the secondary storage system to recover all appropriate records 2422 for inclusion in the recovered segment accordingly.

The retrieved segment row data 2505.2 can be processed via a segment regeneration module 2615 to regenerate a corresponding segment 2424.1.2 in primary storage system 2506. This can include regenerating corresponding parity and/or index data, performing a corresponding redundancy storage encoding function, generating a segment in accordance with a corresponding structure of segments stored via primary storage system from 2505.1, and/or extracting only a subset of relevant portions of accessed segment 2424.2.2 to render the segment 2424.1.2.

This recovered segment 2424.1.2 can then be re-stored in primary storage system 2506 via a primary storage access module 2616, which can be the same or different from the one or more primary storage access modules 2616 of FIG. 26B. This recovered segment 2424.1.2 can be re-stored in different storage resources, such as a different node 37 and/or memory drive 2425, due to the prior node 37 and/or memory drive 2425 encountering a failure. Alternatively, the recovered segment 2424.1.2 can be re-stored in the original storage resources, such as a same node 37 and/or memory drive 2425, for example, if these resources became again available and/or if the failure condition was due to other circumstances not relating to failure of these resources.

In embodiments where the segments 2424 stored in primary storage system 2506 are identical to the segments 2424 stored in secondary storage system 2508, the segment regeneration module 2615 need not be implemented. Instead, the corresponding segment, such as segment 2424.2.2 can be simply retrieved from secondary storage system 2508 and can then be stored in primary storage system 2506, for example, as segment 2424.1.2.

In various embodiments, database system includes at least one processor and a memory that stores operational instructions. The operational instructions, when executed by the at least one processor, can cause the database system to: receive a plurality of records of a dataset for storage; generate a plurality of segment row data from the plurality of records; store the plurality of segment row data via a first storage mechanism corresponding to a first durability level; facilitate storage of the plurality of segment row data via a second storage mechanism corresponding to a second durability level that is more durable than the first durability level; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of segment row data via the second storage mechanism.

Figure 26D:
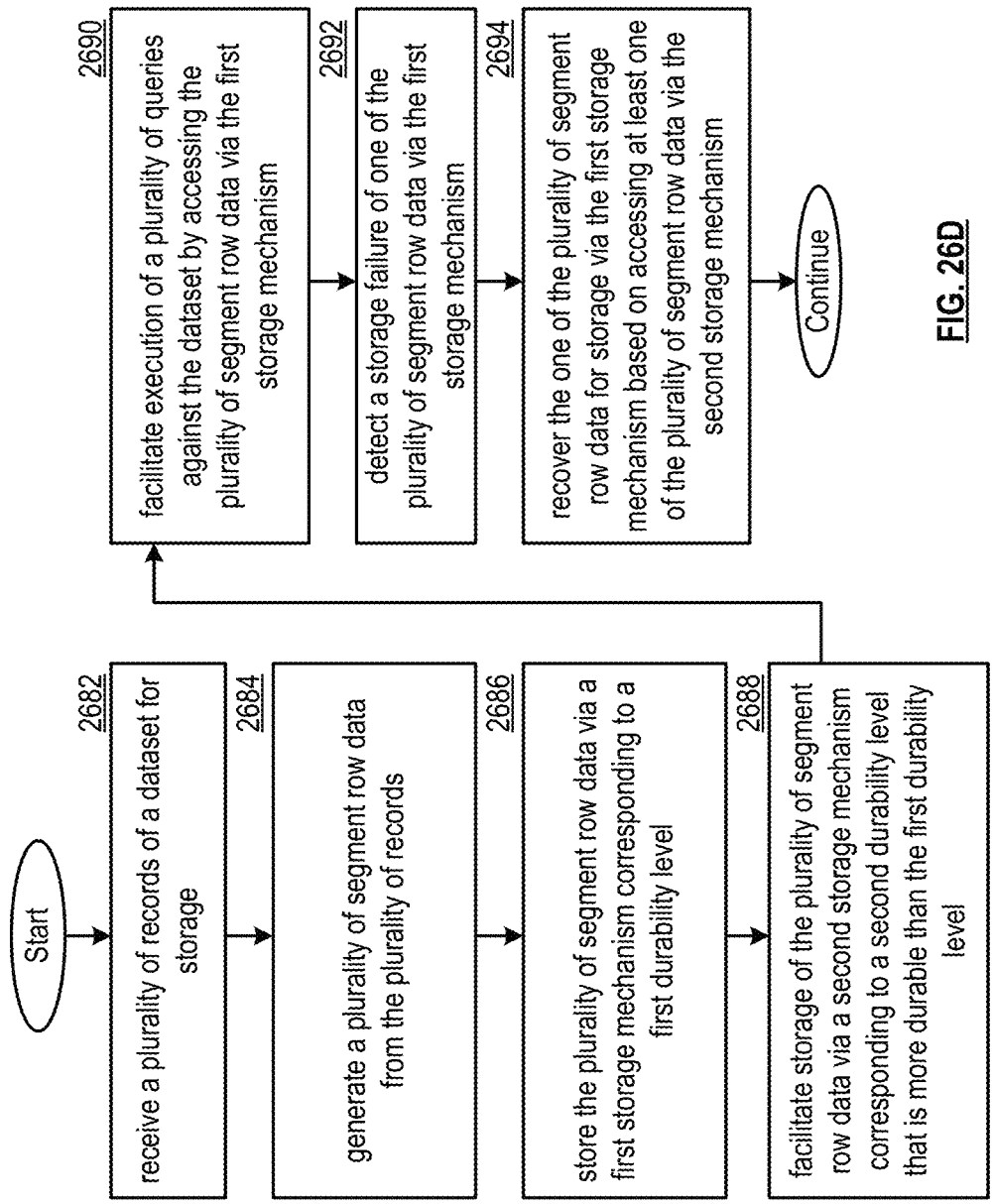
FIG. 26D is a logic diagram illustrating a method of storing records via multiple storage mechanisms in accordance with various embodiments of the present invention.

FIG. 26D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26D. In particular, a node 37 can utilize the query processing module 2435 to execute some or all of the steps of FIG. 26D, where multiple nodes 37 implement their own query processing modules 2435 to independently execute some or all of the steps of FIG. 26D, for example, to facilitate execution of a query as participants in a query execution plan 2405. Some or all of the method of FIG. 26D can be performed by utilizing the record storage module 2502, the query processing system 2501, the record recovery module 2602, the primary storage system 2506, and/or the secondary storage system 2508 in accordance with some or all features and/or functionality described in conjunction with FIGS. 26A-26C. Some or all of the method of FIG. 26D can be performed via a query execution module 2504. Some or all of the steps of FIG. 26D can optionally be performed by any other processing module of the database system 10. Some or all of the steps of FIG. 26D can be performed to implement some or all of the functionality of the record storage module 2502, the query processing system 2501, the record recovery module 2602, the primary storage system 2506, and/or the secondary storage system 2508 as described in conjunction with FIGS. 26A-26C. Some or all of the steps of FIG. 26D can be performed to implement some or all of the functionality regarding execution of a query via the plurality of nodes in the query execution plan 2405 as described in conjunction with FIGS. 24A-24D. Some or all steps of FIG. 26D can be performed by database system 10 in accordance with other embodiments of the database system 10 and/or nodes 37 discussed herein.

Step 2682 includes receiving a plurality of records of one or more datasets for storage. For example, some or all of the plurality of records each include a plurality of values corresponding to a plurality of fields of a corresponding one of the one or more datasets.

Step 2684 includes generating a plurality of segment row data from the plurality of records. Each segment row data can include a proper subset of the plurality of records. A plurality of proper subset of the plurality of records corresponding to the plurality of segment row data can be mutually exclusive and/or collectively exhaustive with respect to the plurality of records. The plurality of records can be grouped to form the plurality of segment row data based on at least one key field, at least one cluster key field, and/or values of any one or more fields of the plurality of records designated for use in generating the plurality of segment row data. For example, ones of the plurality of records with same and/or similar values for these one or more fields are grouped into the same segment row data, while ones of the plurality of records with different values for these one or more fields are grouped into the different segment row data. This can include applying a similarity function and/or clustering algorithm to generate the plurality of segment row data.

Step 2686 includes storing the plurality of segment row data via a first storage mechanism corresponding to a first durability level. The first storage mechanism can be implemented by utilizing some or all features and/or functionality of the primary storage system 2506. The first storage mechanism can be implemented via a plurality of memory drives 2425 of a plurality of nodes 37. The first storage mechanism can alternatively or additionally be implemented via a plurality of NVMe drives of the database system 10. The first storage mechanism can alternatively or additionally be implemented by utilizing a first redundancy storage encoding scheme to store and/or recover the plurality of segment row data.

For example, the plurality of segment row data is stored via the first storage mechanism as a first plurality of segments, where each segment of the first plurality of segments includes a corresponding one of the plurality of segment row data. Generating a segment of the first plurality of segments from corresponding segment row data can include generating column-formatted data from the segment row data for inclusion in the segment. Generating a segment of the first plurality of segments from corresponding segment row data can include performing some or all functionality discussed in conjunction with FIGS. 15-23.

Generating the first plurality of segments can include generating segments in a plurality of first segment groups, where generating segments in a given first segment group includes generating parity data for the given segment based on a set of segment row data included in the same first segment group. This can include applying a first redundancy storage encoding scheme to generate the first plurality of segments to include parity data. Alternatively, the first plurality of segments includes no parity data. For example, the size of a given first segment group implemented as discussed in conjunction with FIGS. 15-23 includes only a single segment.

Step 2688 includes storing the plurality of segment row data via a second storage mechanism corresponding to a second durability level. The second durability level can be more durable than the first durability level. The second storage mechanism can be implemented by utilizing some or all features and/or functionality of the secondary storage system 2508. The second storage mechanism can be implemented via a plurality of spinning disks and/or an object storage system. The second storage mechanism can be implemented via a plurality of memory devices that have less efficient access than another plurality of memory devices that implement the first storage mechanism. Alternatively or in addition, the second storage mechanism can be implemented via a plurality of memory devices that have less efficient access than another plurality of memory devices that implement the first storage mechanism.

The second storage mechanism can alternatively or additionally be implemented by utilizing a second plurality of memory devices that are more reliable than, have a higher fault-level than, have a lower failure rate than, and/or are otherwise more durable than a first plurality of memory devices utilized to implement the first storage mechanism. The second durability level of the second storage mechanism can be more durable than the first durability level of the first storage mechanism based on the second storage mechanism being implemented by utilizing the second plurality of memory device, based on the first storage mechanism being implemented by utilizing the first plurality of memory devices, and based on the second plurality of memory device being more durable than the first plurality of memory devices.

The second storage mechanism can alternatively or additionally be implemented by utilizing a second redundancy storage encoding scheme to store and/or recover the plurality of segment row data, for example, where the second redundancy storage encoding scheme corresponds to a higher redundancy level than the first redundancy storage encoding scheme. The second durability level of the second storage mechanism can be more durable than the first durability level of the first storage mechanism based on the second storage mechanism being implemented by utilizing the second redundancy storage encoding scheme, based on the first storage mechanism being implemented by utilizing the first redundancy storage encoding scheme, and based on the second redundancy storage encoding scheme or having a more favorable fault-tolerance level and/or otherwise being more durable than the first redundancy storage encoding scheme.

For example, the plurality of segment row data is stored via the second storage mechanism as a second plurality of segments, where each segment of the second plurality of segments includes a corresponding one of the plurality of segment row data. Generating a segment of the second plurality of segments from corresponding segment row data can include generating column-formatted data from the segment row data for inclusion in the segment. Generating a segment of the second plurality of segments from corresponding segment row data can include performing some or all functionality discussed in conjunction with FIGS. 15-23.

Generating the second plurality of segments can include generating segments in a plurality of second segment groups, where generating segments in a given second segment group includes generating parity data for the given segment based on a set of segment row data included in the same second segment group. This can include applying a second redundancy storage encoding scheme to generate the first plurality of segments to include parity data. For example, the second redundancy storage encoding scheme is more durable than the first redundancy storage encoding scheme based on each of the plurality of second segment groups including more segments than each of the plurality of first segment groups. As a particular example, the second redundancy storage encoding scheme is more durable than the first redundancy storage encoding scheme based on each of the plurality of second segment groups including more than one segment to enable recovery of each segment via access to other segments in the same segment group stored via the second storage system, and based on each of the plurality of first segment groups including exactly one segment. Alternatively, the second plurality of segments include no parity data. For example, the size of a given second segment group implemented as discussed in conjunction with FIGS. 15-23 includes only a single segment.

The first plurality of segments generated for storage in via the second storage mechanism can be different from the second plurality of segments generated for storage in via the first storage mechanism. For example, the first plurality of segments is different from the second plurality of segments based on being generated with different parity data, having different fault-tolerance levels, and/or being generated via different redundancy storage encoding schemes. Alternatively, the first plurality of segments generated for storage in via the first storage mechanism are utilized as the second plurality of segments that are stored via the second storage mechanism, where the first plurality of segments and the second plurality of segments are identical.

Step 2690 includes facilitating execution of a plurality of queries against the dataset by accessing the plurality of segment row data via the first storage mechanism. For example, the second storage mechanism is not utilized to access the plurality of segment row data during query execution. The query can be executed via a plurality of nodes 37 participating in a query execution plan 2405, for example, where nodes 37 at an IO level 2416 access the plurality of segment row data via their own memory drives 2425 that implement the first storage mechanism.

Step 2692 includes detecting a storage failure of one of the plurality of segment row data via the first storage mechanism. For example, detecting a storage failure include determining a failure of a memory drives 2425 of a node 37 that stores the one of the plurality of segment row data. As another example, detecting the storage failure include determining a failure of node 37 that stores the one of the plurality of segment row data via one of its memory drives 2425. As another example, detecting the storage failure includes determining a memory device and/or location storing the one of the plurality of segment row data has failed, is offline, has a current performance that compares unfavorably to a performance threshold, is corrupted, and/or is otherwise encountering a storage failure condition. As another example, detecting the storage failure includes attempting access to the one of the plurality of segment row data via the first storage mechanism, for example, in conjunction with a query execution, where the storage failure is detected based on the attempted access failing. As another example, detecting the storage failure includes receiving a notification of a failure, receiving and/or determining a command and/or instruction to recover the one of the plurality of segment row data, and/or otherwise determining the storage failure and/or that the one of the plurality of segment row data need be recovered in the first storage mechanism.

Step 2694 includes recovering the one of the plurality of segment row data, for example, based on detecting the storage failure of the one of the plurality of segment row data. This can include accessing at least one of the plurality of segment row data via the second storage mechanism. For example, the same, duplicate segment row data stored in the second storage system is retrieved and re-stored via the first storage mechanism. As another example, if the same, duplicate segment row data stored in the second storage system is not available, other ones of the plurality of segment row data, such as segment row data of some or all of a set of segments in a same segment group, are accessed to rebuild the segment row data in accordance with a decoding process corresponding to the redundancy storage encoding scheme and/or by utilizing parity data of the some or all of the set of segments in the same segment group.

Step 2694 can include re-storing the one of the plurality of segment row data, once recovered via the second storage mechanism, in different memory resources of the first storage mechanism that are different from failed memory resources of the first storage mechanism. For example, if a first memory drive and/or a first node of the first storage mechanism that previously stored the one of the plurality of segment row data failed, this one of the plurality of segment row data, once recovered, is stored in a different memory drive and/or a different node, for example, that is operating correctly and/or not undergoing a failure condition. Re-storing the one of the plurality of segment row data can include regenerating a corresponding segment for storage via the first storage mechanism and/or can include regenerating parity data for the corresponding segment based on other segments in a same segment group.

In cases where detecting the storage failure of the one of the plurality of segment row data via the first storage mechanism is based on detecting a failed memory drive 2425, failed node 37, and/or another failed one or more memory devices, step 2694 can include recovering multiple ones of the plurality of segment row data, such as all segment row data that was stored via the failed memory drive 2425, failed node 37, and/or another failed one or more memory devices. Step 2694 can include accessing corresponding ones of the plurality of segment row data stored via the second storage mechanism, and/or re-storing the multiple ones of the plurality of segment row data via the first storage mechanism.

In some embodiments, the method further includes facilitating execution of at least one other query by accessing segment row data via the second storage mechanism. For example, consider a query that is executed after the storage failure of the one of the plurality of segment row data and prior to the recovery of the one of the plurality of segment row data. As a particular example, detecting the storage failure includes attempting access to the one of the plurality of segment row data via the first storage mechanism in conjunction with execution of the at least one other query, where the storage failure is detected based on the attempted access failing. Based one of the plurality of segment row data being unavailable for use in the query execution via the first storage mechanism due to the storage failure, rather than delaying query execution until this one of the plurality of segment row data is recovered in the first storage mechanism, the query execution can proceed based on accessing this one of the plurality of segment row data via the second storage mechanism. This access of the one of the plurality of segment row data via the second storage mechanism can be slower than access of ones of the plurality of segment row data stored via the first storage mechanism, for example, based on the first storage mechanism having more efficient access than the second storage mechanism.

In some embodiments, this access of the one of the plurality of segment row data via the second storage mechanism to facilitate execution of the query can be utilized to implement the access of step 2694 utilized to recover the one of the plurality of segment row data via the first storage mechanism. For example, the one of the plurality of segment row data, once accessed to facilitate query execution, is then re-stored via the first storage mechanism, rather than a separate second access to the one of the plurality of segment row data being performed to recover the one of the plurality of segment row data in step 2694.

The method can further include detecting a storage failure of another one of the plurality of segment row data via the second storage mechanism and/or recovering this other one of the plurality of segment row data for storage via the second storage mechanism. This can include accessing multiple other ones of the plurality of segment row data that are different from this other one of the plurality of segment row data, such as segment row data of some or all of a set of segments in a same segment group, to rebuild the another one of the plurality of segment row data in accordance with a decoding process corresponding to the redundancy storage encoding scheme and/or by utilizing parity data of the some or all of the set of segments in the same segment group. For example, the another one of the plurality of segment row data is rebuilt in this fashion, even if corresponding segment row data is available via the first storage mechanism, so that the first storage mechanism is not disrupted with additional access requests to preserve access to the first storage mechanism for query execution only. Alternatively, recovering this other one of the plurality of segment row data for storage via the second storage mechanism includes accessing the corresponding segment row data is available via the first storage mechanism.

In various embodiments, a non-transitory computer readable storage medium includes at least one memory section that stores operational instructions. The operational instructions, when executed by a processing module that includes a processor and a memory, can cause the processing module to: receive a plurality of records of a dataset for storage; generate a plurality of segment row data from the plurality of records; store the plurality of segment row data via a first storage mechanism corresponding to a first durability level; facilitate storage of the plurality of segment row data via a second storage mechanism corresponding to a second durability level that is more durable than the first durability level; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of segment row data via the second storage mechanism.

FIGS. 27A-27E illustrate another embodiment of a database system that stores and access records via multiple storage mechanisms. Alternatively or additionally to storing different fields of records via a primary storage system 2506 and a secondary storage system 2508 as discussed in conjunction with FIGS. 25A-25I, and/or alternatively or additionally to storing segments via both a primary storage system 2506 and a secondary storage system 2508 as discussed in conjunction with FIGS. 26A-2D, the database system 10 can be implemented to store segment row data that includes values for some or all fields of records 2422 of one or more datasets via a primary storage system 2506, and to store parity data corresponding to recovery of this segment row data via a secondary storage system 2508. Some or all features and/or functionality of the database system 10 of FIGS. 27A-27E can be utilized to implement the database system 10 of FIG. 1 and/or FIG. 1A, and/or any other embodiments of the database system 10 described herein.

In some embodiments, alternatively or in addition to generating segments in same segment groups of multiple segments for recovery with parity data, a segment can be generated such that its segment row data 2505 and/or some or all other metadata of the segment is written to a primary storage system 2506, and its parity data is written to a secondary storage system 2508. For example, the primary storage system 2506 can be implemented as a long term storage system and/or a plurality of NVMe drives that are accessed to implement query execution in all, most, and/or normal conditions, while the secondary storage system 2508 can be implemented as an object storage system and/or a plurality of spinning disks that are accessed to implement query execution in abnormal condition, rarely, and/or never. For example, the primary purpose of the primary storage system 2506 can be to facilitate query executions, while the primary purpose of the secondary storage system 2508 can be to store corresponding parity data for access and/or recovery if a failure of storage resources and/or access to records via the primary storage system 2506 occurs.

The primary storage system 2506 can be implemented via any features and/or functionality of the primary storage system 2506 discussed in conjunction with FIGS. 25A-25G and/or the secondary storage system 2508 can be implemented via any features and/or functionality of the secondary storage system 2508 discussed in conjunction with FIGS. 25A-25G. In some embodiments, the primary storage system 2506 and secondary storage system 2508 utilize the same types of memory devices and/or memory resources, but utilize distinct of memory devices and/or memory resources and/or correspond to memory in different physical and/or virtual locations.

Data stored via the secondary storage system 2508 can be stored in accordance with a higher durability than data stored via the primary storage system 2506. For example, the secondary storage system 2508 is implemented utilizing multi-site durability and/or otherwise enables restoring the data via a different site if necessary. In some embodiments, the primary storage system 2506 is not implemented utilizing multi-site durability and/or otherwise does not enable restoring the data via a different site. For example, recovery of data stored via the primary storage system 2506 requires corresponding parity data to be accessed via the secondary storage system 2508.

In such embodiments, nodes 37 that implement the primary storage system 2506 and/or the query execution module 2504 optionally do not implement the functionality of FIG. 24D and/or otherwise do not participate in the recovery of segments 2424. The functionality of FIG. 24D and/or other recovery of segments 2424 can optionally be performed instead by different nodes 37 that implement the secondary storage system 2508 and/or other processing and/or memory resources of the secondary storage system 2508.

Storing records via a primary storage system 2506 and secondary storage system 2508 in this fashion improves the technology of database system by increasing the efficiency of storage and/or processing resources utilized to facilitate query executions. For example, memory drives 2425 of nodes 37 of IO level 2416 utilized to implement the primary storage system and/or a plurality of NVMe drives utilized to implement the primary storage system are treated as more transient storage and/or are not utilized to rebuild data. This can enable these storage and/or processing resources to direct all resources upon executing queries rather than durably storing data and/or recovering data, improving the efficiency of query executions.

Meanwhile, as this data is recoverable via the parity data stores via secondary storage system 2508, query correctness can still be guaranteed and/or data is guaranteed to be recoverable based on a fault-tolerance level dictated by the durability and/or storage scheme of the secondary storage system 2508, and/or a fault-tolerance level dictated by a redundancy storage encoding scheme utilized to generate the parity data. Processing and/or memory resources of the secondary storage system 2508, such as a distinct set of computing devices 18 that are separate from computing devices 18 with nodes 37 that implement the query execution module 2405, can perform rebuilds and/or recover data as failures occur, ensuring all data remains accessible while not affecting normal performance in query execution and/or without affecting performance of nodes 37 implementing the query execution module 2405.

Storing records via a primary storage system 2506 and secondary storage system 2508 in this fashion can further improve the technology of database system by implementing redundancy via memory resources of the secondary storage system 2508, such as an object storage system and/or a plurality of spinning disks, that are less expensive than memory resources of the primary storage system 2506, such as a plurality of NVMe drives. Storing records via a primary storage system 2506 and secondary storage system 2508 in this fashion can further improve the technology of database system by implementing redundancy via memory resources of the secondary storage system 2508, such as an object storage system and/or a plurality of spinning disks, that enable less efficient access than memory resources of the primary storage system 2506, such as a plurality of NVMe drives In particular, the higher access efficiency resources are accessed to perform query executions, which occur more frequently and/or which require faster access to ensure queries are performed efficiently and/or in a timely fashion, while lower cost resources are utilized to perform data rebuilds for failures that occur less frequently and/or that do not need to be completed in a timely fashion. For example, even though the same amount of total data needs to be stored to ensure recovery at an appropriate level of fault-tolerance, the parity data can be stored more cheaply. Less efficient access to the parity data via storage in the secondary storage system 2508 may be acceptable if segment rebuilds are not required frequently.

This functionality can also be particularly useful in massive scale databases implemented via large numbers of nodes, as the efficiency of IO level nodes is improved, and/or the resource allocation of individual nodes is improved to further increase efficiency of query executions facilitated across a large number of nodes, for example, participating in a query execution plan 2405 as discussed in conjunction with FIG. 24A. This can further improves the technology of database systems by enabling processing efficiency and/or memory resource allocation to be improved for many independent elements, such as a large number of nodes 37, that operate in parallel to ensure data is stored and/or that queries are executed within a reasonable amount of time, despite the massive scale of the database system, while ensuring that data is still recoverable in the case of failure.

Figure 27A:
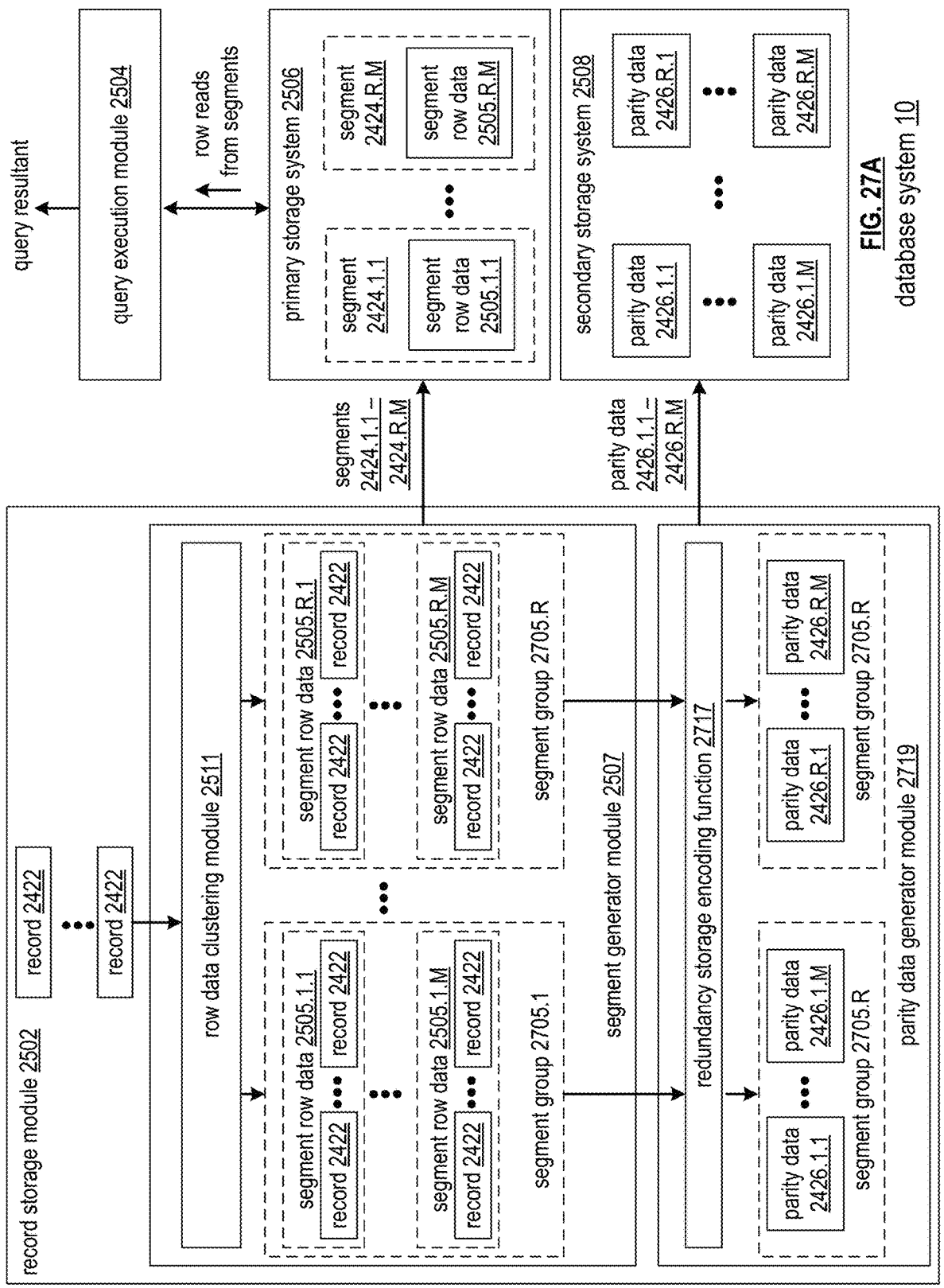
FIG. 27A is a schematic block diagram illustrating a record storage module that in accordance with various embodiments of the present invention.

FIG. 27A illustrates an embodiment of a database system 10 that generates and stores segments via a primary storage system 2506, and generates and stores parity data for these segments via a secondary storage system 2508. Some or all features and/or functionality of the database system 10 of FIG. 27A can be utilized to implement the database system of FIG. 1, of FIG. 1A, and/or of any other embodiment of database system 10 described herein.

The database system can implement a record storage module 2502. The record storage module 2502 of FIG. 27A can be implemented utilizing some or all features and/or functionality of the record storage module 2502 discussed in conjunction with FIGS. 25A-25G and/or the record storage module of FIG. 26A. The record storage module 2502 of FIG. 27A can optionally operate in a different fashion from the record storage module 2502 discussed in conjunction with FIGS. 25A-25G and/or the record storage module of FIG. 26A.

The record storage module 2502 can receive a plurality of records 2422, for example, of one or more datasets 2500. Each record 2422 can include data values for some or all of a plurality of fields of a corresponding dataset 2500 as discussed previously.

A segment generator module 2507 can generate segments 2424 for storage via primary storage system and secondary storage system from the plurality of records. The segment generator module 2507 can be implemented in a same or similar fashion as the segment generator module 2507 of FIG. 25F and/or FIG. 26A.

A row data clustering module 2511 can generate a plurality of segment row data 2505.1-2505.Y from the plurality of records 2422, for example, in a same or similar fashion as the row data clustering module 2511 of FIG. 26A. This can include performing a similarity function, clustering algorithm, and/or grouping records based on values of one or more fields, such as primary key fields and/or cluster key fields. This can include performing some or all functionality discussed in conjunction with FIGS. 15-23.

Furthermore, the plurality of segment row data 2505 can be generated as a plurality of sets of segment row data 2505, where each set of segment row data 2505 corresponds to one of a plurality of R segment groups 2705. Each segment group 2705 includes a same number M of segment row data 2505. Each segment row data 2505 is included in exactly one segment group 2705. For example, a total plurality of Y segments is generated, where Y is equal to M*R. The segment groups can be determined in a same or similar fashion as discussed in conjunction with FIGS. 15-23.

The record storage module 2502 can further implement a parity data generator module 2719 that generates parity data 2426 for each segment row data based on the segment row data of some or all other segments in the same segment group 2705. The parity data generator module 2719 can generate a set of M parity data 2426 for a given segment group 2705 by performing a redundancy storage encoding function 2717 upon segment row data 2505 of the given segment group 2705. The redundancy storage encoding function 2717 can be in accordance with a corresponding redundancy storage encoding scheme, such as a RAID scheme, an error correction coding scheme, and/or any other scheme that enables recovery of data via parity data.

The record storage module 2502 can store the plurality of segment row data 2505 via primary storage system 2506, for example, as a plurality of segments 2424 that do not include parity data 2426. The record storage module 2502 can instead store the plurality of parity data 2426 via the secondary storage system 2508. The storage resources of the record storage module 2502 can be distinct from the storage resources of the secondary storage system 2508.

The parity data 2426 of a given segment 2424 can correspond to the same type of parity data 2426 discussed in conjunction with FIGS. 15-23, FIG. 24B, and/or FIG. 24D. For example, the parity data 2426.1.1 corresponds to the parity data for segment 2424.1.1. However, rather than being stored within segment 2424.1.1 as discussed in conjunction with FIGS. 15-23, FIG. 24B, and/or FIG. 24D, this parity data 2426.1.1 is stored separately, via secondary storage system 2508. Alternatively, in other embodiments, in addition to the parity data 2426 for each given segment 2424 being stored separately, via secondary storage system 2508, the parity data 2426 can also be included within each given segments 2424, for example, to enable segments to be recovered via access to primary storage system in some and/or in rare cases, and/or to increase the fault-tolerance of the system.

The parity data 2426 for a given segment 2424 can be is mapped to the corresponding segment to enable the corresponding parity data to be identified. For example, the parity data 2426.1.1 can be determined from segment 2424.1.1 via an identifier of parity data 2426.1.1, pointer to parity data 2426.1.1, memory location information for parity data 2426.1.1 in secondary storage system, and/or other access information indicating how to identify and/or access the parity data 2426.1.1. This access information for a given parity data 2426 can be stored within the corresponding segment 2424 and/or can be mapped to the corresponding segment 2424 via other memory resources.

As illustrated in FIG. 27A, the query execution module 2504 can execute queries via access to the primary storage system via row reads from segments 2424 stored in the primary storage system. For example, access to segments via primary storage system 2506 implements an IO step 2542 performed by query execution module 2504 in executing a corresponding query. Alternatively or in addition, access to segments via primary storage system 2506 is performed by nodes 37 at IO level 2416 participating in a query execution plan 2405 implemented by query execution module to execute a corresponding query. In particular, primary storage system 2506 can be implemented via storage resources, such as memory drives 2425, of nodes 37 that participate at IO level 2416 for some or all queries. In such embodiments, the nodes 37 can perform the row reads in a same or similar fashion discussed in conjunction with FIG. 24C. The query execution module 2504 can optionally perform a filtering step 2544 and/or projection step 2546 in accordance with a corresponding query expression, for example, as discussed in conjunction with FIG. 25B, where values read in the projection step 2546 are read from the primary storage system 2506, for example, as an additional part of the IO step 2542 and/or as part of reading the respective records 2422 from segments 2424 stored via the primary storage system 2506.

Figure 27B:
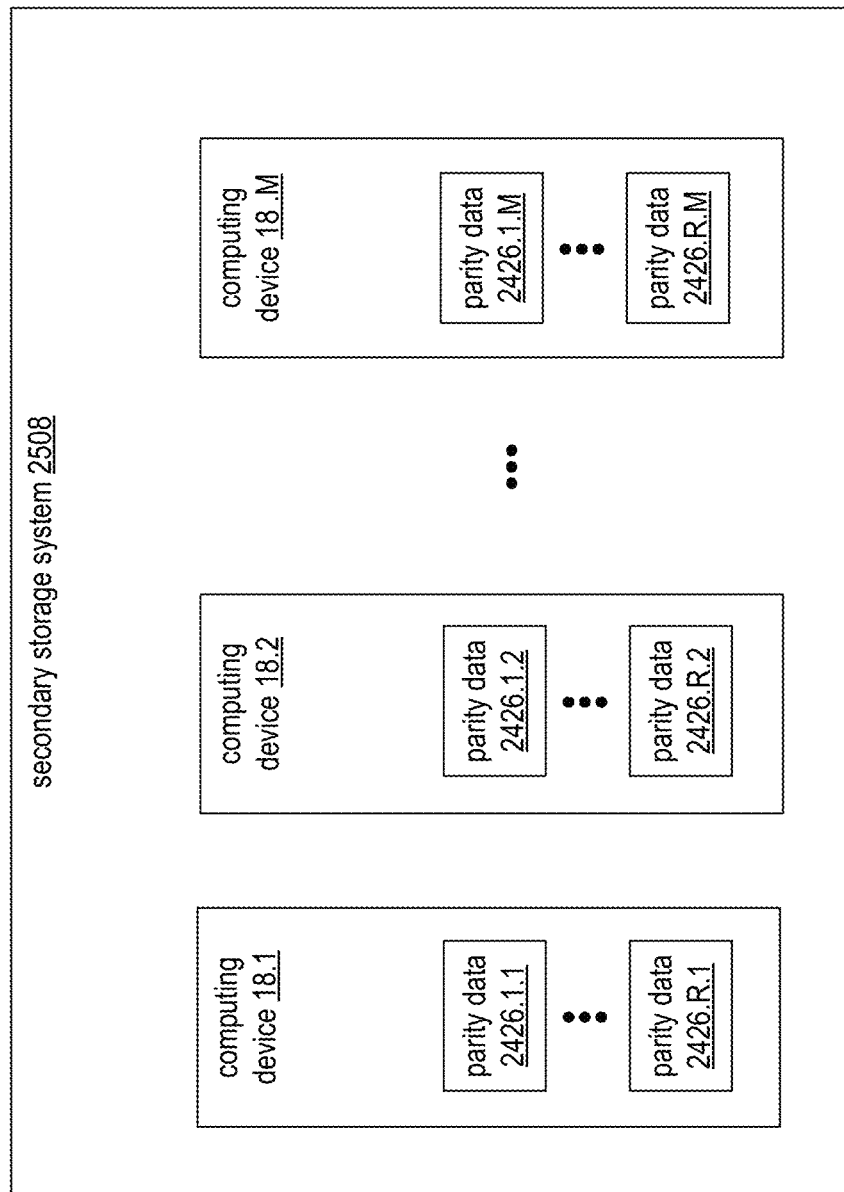
FIG. 27B is a schematic block diagram illustrating a secondary storage system in accordance with various embodiments of the present invention.

FIG. 27B illustrates an embodiment of a secondary storage system 2508 that includes a plurality of computing devices 18 that store parity data 2426. The embodiment of secondary storage system 2508 of FIG. 27B can be utilized to implement the secondary storage system 2508 of FIG. 27A and/or any other embodiment of secondary storage system 2508 described herein.

The secondary storage system 2508 can include plurality of at least M computing devices 18 to enable separate storage of the set of parity data 2426 in same segment groups 2705. In particular, for some or all segment groups 2705, the corresponding set of M parity data 2426 is stored via M different computing devices 18. For example, the set of M parity data 2426 is stored via M different computing devices 18 in a same or similar fashion as discussed in conjunction with FIG. 23. In particular, the plurality of at least M computing devices 18 of the secondary storage system 2508 can be implemented via physically separate computing devices in different physical locations and/or upon different servers. This can help ensure that multiple parity data of a same segment group will not become unavailable at a given time due to being stored via common resources and becoming unavailable due to a same failure, increasing the fault-tolerance of the system.

In such embodiments, the M segment row data 2505 of segments 2424 in a same segment group 2705 need not be stored via physically separate resources in primary storage system 2506. In particular, as other segments in a same segment group are not utilized to recover unavailable segments due to the parity data of secondary storage system 2508 being utilized for this purpose, the restrictions upon storage of segments 2424 discussed in conjunction with FIG. 23 are not necessary, as these restrictions need only be applied to the parity data for recovery of segments. In such cases, segments 2424 in the same segment group can be stored via any set of memory devices in same and/or different physical locations.

In other embodiments, some or all of the set of M parity data 2426 of a same segment group is stored via a same memory device and/or computing device, for example, to simplify retrieval of parity data for the purposes of segment recovery via access to a single device. This embodiment can be utilized in cases where the second storage system is implemented via more robust and/or reliable memory devices and/or computing devices, where fault-tolerance is still achieved via the reliability of the memory devices and/or computing devices themselves.

Figure 27C:
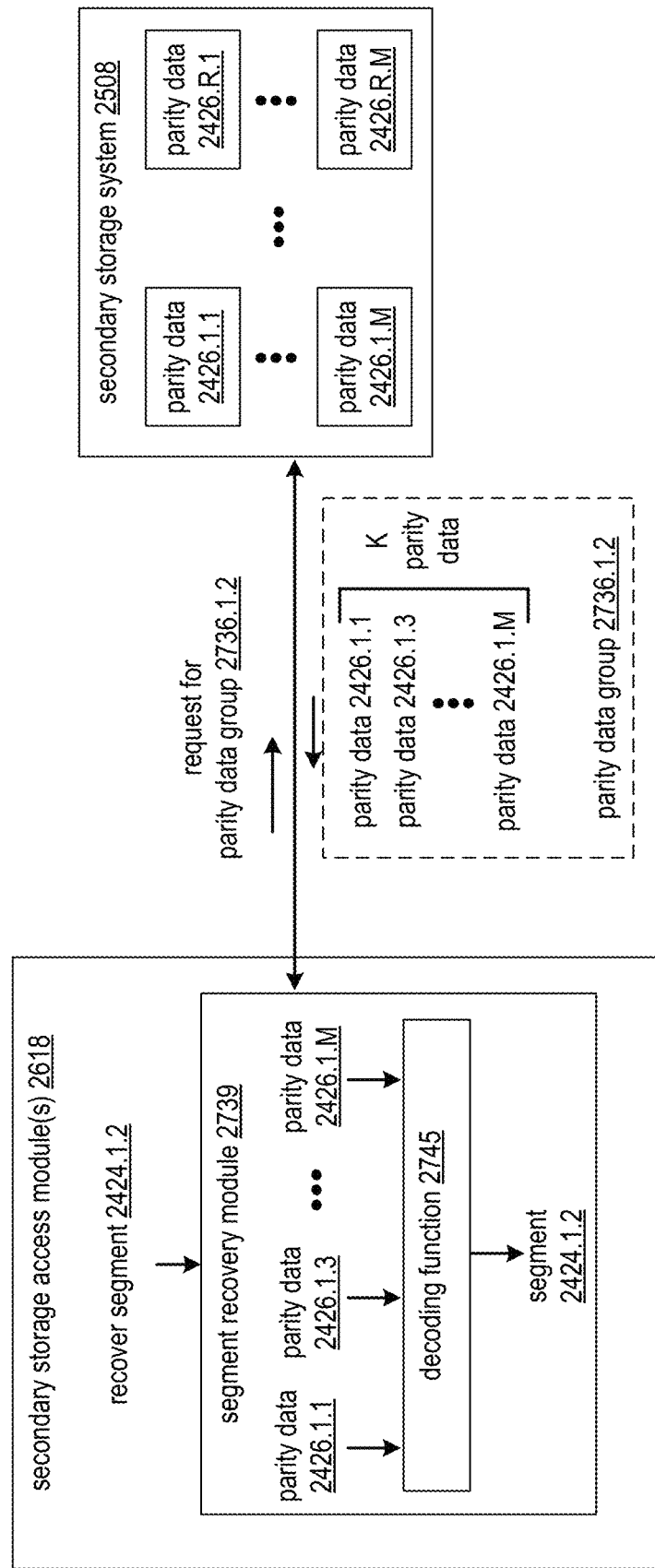
FIG. 27C is a schematic block diagram illustrating a segment recovery module in accordance with various embodiments of the present invention.

FIG. 27C illustrates an embodiment of a database system 10 that implements a segment recovery module 2739 that communicates with a secondary storage access module 2618 to retrieve and utilize parity data stored in secondary storage system 2508 to recover segments. The segment recovery module 2739 can be implemented in a same or similar fashion as the segment recovery module 2439 of FIG. 24D. The embodiment of database system 10 of FIG. 27C can be utilized to implement the database system 10 of FIG. 27A and/or any other embodiment of database system 10 described herein.

As discussed previously, a given segment 2424 can be recovered by utilizing a set of parity data of other segments in the same segment group 2705. For a given segment, a parity data group 2736 can correspond to a set of parity data that is required to and/or can be utilized for recovery of some or all of the corresponding segment 2424, such as the segment row data 2505 of the corresponding segment, and optionally any other additional metadata such as index sections, manifest sections, and/or statistics sections of the corresponding segment.

In particular, a parity data group 2736 can include a set of K segments, where K is less than M. For example, K can be equal to M minus 1 and/or M minus another positive integer that is greater than one, where the magnitude of this positive integer is optionally an increasing function of fault-tolerance of a corresponding error encoding scheme. The values of M, K and/or the difference M minus K can be dictated by the corresponding redundancy storage encoding scheme and/or can denote the fault-tolerance imposed by use of the corresponding redundancy storage encoding scheme.

The segment recovery module 2739 can determine to recover a given segment, for example, based on detecting the segment is unavailable and/or receiving a request to recover the given segment. In this example, the segment recovery module 2739 determines to recover segment 2424.1.2.

The segment recovery module 2739 requests the set of K parity data 2426 of parity data group 2736.1.2 that can be utilized to recover segment 2424.1.2. In this case, the set of K parity data 2426 of parity data group 2736.1.2 in this case includes at least: parity data 2426.1.1 corresponding to segment 2424.1.1; parity data 2426.1.3 corresponding to segment 2424.1.3; and parity data 2426.1.M corresponding to segment 2424.1.M. Note that the parity data 2426.1.2 is not included in the parity data group 2736.1.2, for example, based on the parity data corresponding to the segment 2424 that failed, and/or based on utilizing a corresponding redundancy storage encoding scheme generating parity data under an assumption that parity data is stored in conjunction with the corresponding segment row data 2505.

Alternatively, the parity data 2426.1.2 is included in the parity data group 2736.1.2, for example, based on the parity data corresponding to the segment 2424 that failed, and/or based on utilizing a modified corresponding redundancy storage encoding scheme that generates the parity data. This modified corresponding redundancy storage encoding scheme can be modified from other redundancy storage encoding schemes discussed herein in accordance with the knowledge that parity data of a given segment is not stored in conjunction with the corresponding segment row data 2505, and thus can be utilized to recover the corresponding segment row data 2505 of the given segment alternatively or in addition to the parity data of other segments.

The segment recovery module 2739 can be implemented utilizing common resources with the one or more secondary storage access modules 2618 to request the parity data group 2736.1.2 from the secondary storage system 2508 and to receive the corresponding set of K parity data in response. Alternatively, the segment recovery module 2739 can be separate from and communicates with the one or more secondary storage access modules 2618, and this request is sent to secondary storage system 2508, where the secondary storage system 2508 accesses the corresponding set of K parity data and sends the set of K parity data to the segment recovery module 2739.

The request can indicate identifiers and/or other access information for the K parity data 2426, for example, based on corresponding information retrieved from other corresponding segments in the same segment group. The identifiers and/or other access information for the K parity data 2426 can otherwise be mapped to in memory resources accessible by the segment recovery module 2739 and/or can be otherwise determined based on an identifier for segment 2424.1.2.

The one or more secondary storage access modules 2618 can receive the K parity data of parity data group 2736.1.2 based on the request. For example, a same secondary storage access module 2618 retrieves the each of the K parity data via K different computing devices 18 storing the parity data. As another example, K different secondary storage access modules 2618 each retrieve a corresponding one of the set of K parity data via access to a single corresponding computing devices 18 storing the corresponding one of the set of K parity data.

The segment recovery module 2739 can perform a decoding function 2745 upon the K parity data of parity data group 2736.1.2 to regenerate and/or rebuild segment 2424.1.2. The decoding function 2745 can correspond to an inverse of the redundancy storage encoding function 2717 and/or can otherwise correspond to a same redundancy storage encoding scheme as redundancy storage encoding function 2717.

Figure 27D:
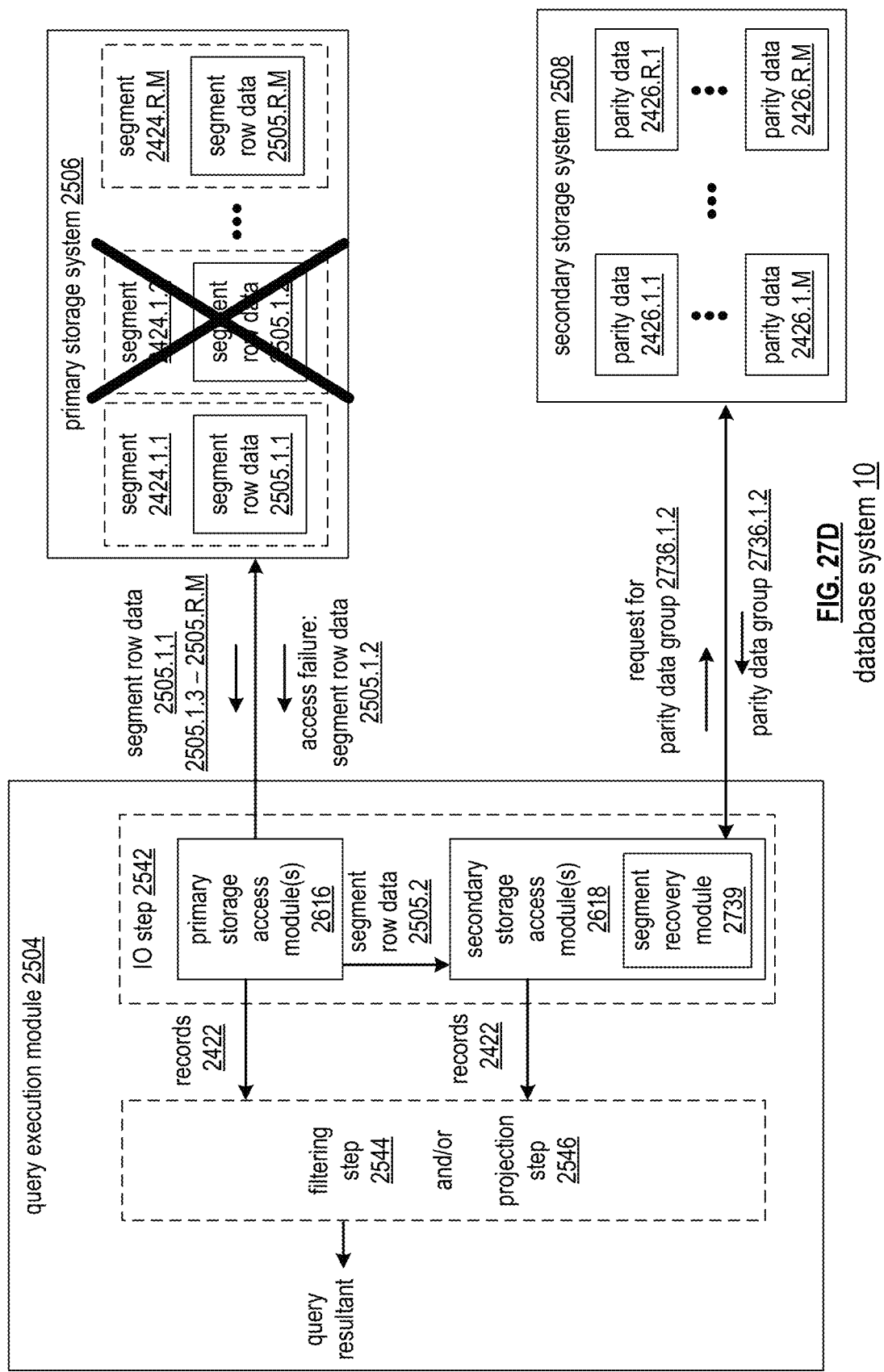
FIG. 27D is a schematic block diagram illustrating a query execution module in accordance with various embodiments of the present invention.
Figure 27E:
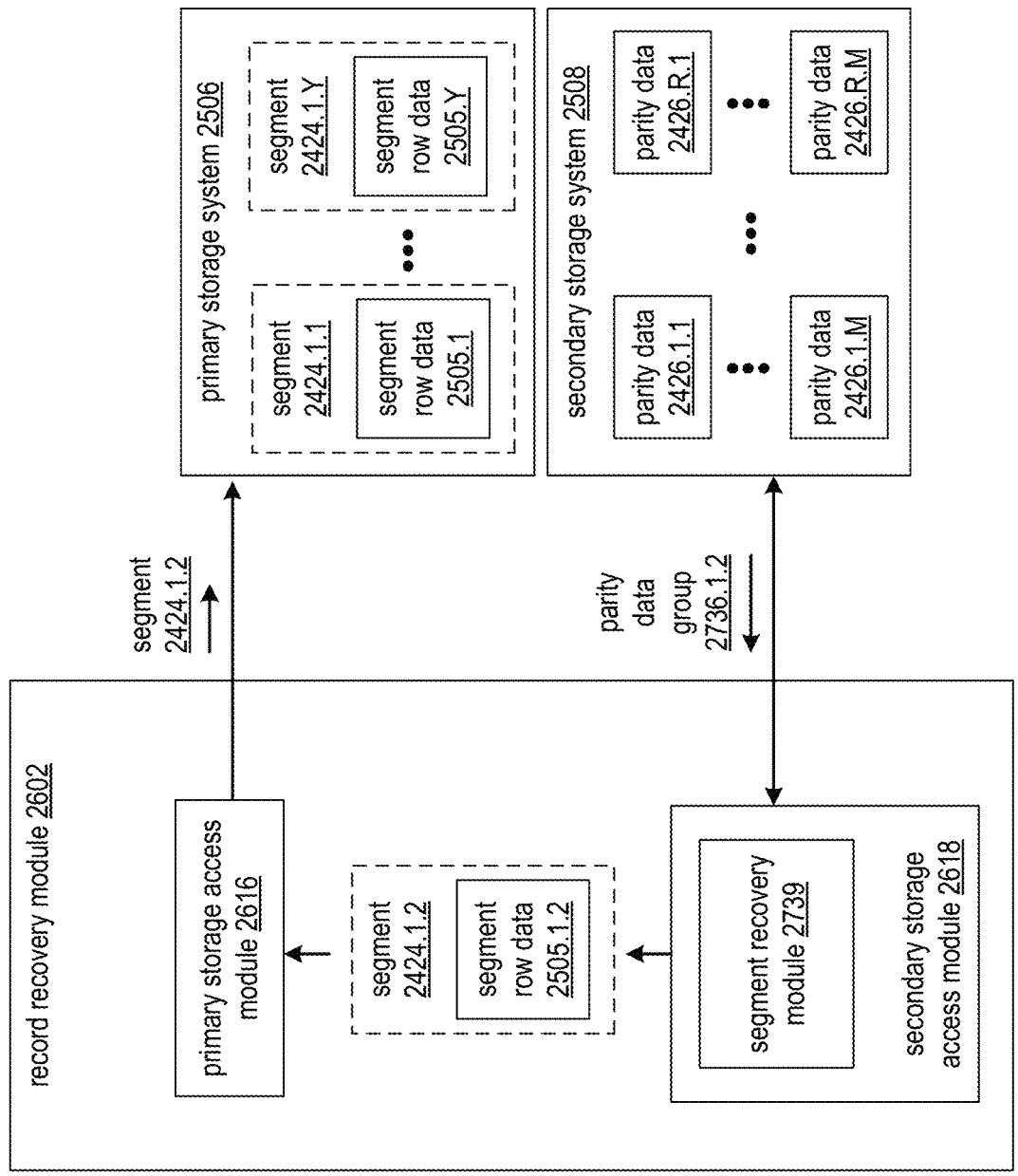
FIG. 27E is a schematic block diagram illustrating a record recovery module in accordance with various embodiments of the present invention.

This recovery mechanism performed via segment recovery module 2739 via access to parity data in secondary storage system 2508 to recover segments 2424 can be utilized to service queries when required segments 2424 are unavailable, and/or to re-store unavailable segments in primary storage system 2508, for example, as discussed in conjunction with FIGS. 27D and 27E, respectively.

FIG. 27D illustrates an embodiment of a database system 10 that recovers segments 2424 can be utilized to service queries when required segments 2424 are unavailable via access to parity data in secondary storage system 2508 by utilizing the segment recovery module 2739 of FIG. 27C. The embodiment of database system 10 of FIG. 27D can be utilized to implement the database system 10 of FIG. 27A and/or any other embodiment of database 10 described herein.

In some embodiments, all record reads utilized to facilitate IO in query executions are performed by accessing corresponding segments 2424 that store these records 2422 in primary storage system 2506, where secondary storage system 2508 is never accessed to facilitate query executions. For example, secondary storage system 2508 is only accessed to recover segments that become unavailable and/or encounter storage failures in primary storage system 2506. In such cases, secondary storage system 2508 purely serves the purposes of redundant segment storage and segment recovery.

In other embodiments, in some cases and/or in rare cases, some record reads utilized to facilitate IO in query executions are performed by accessing and utilizing parity data in secondary storage system 2508 to recover the corresponding segments that include these records, where secondary storage system 2508 is sometimes accessed to facilitate query executions. For example, secondary storage system 2508 is accessed in query execution to read and utilize parity data to recover the records and/or corresponding segments that are unavailable and/or encounter storage failures in primary storage system 2506.

As these records may be required to ensure a query resultant is correct, rather than awaiting the recovery of these segments upon primary storage system 2506, the query execution module 2504 can, as part of the IO step 2542, read corresponding parity data from secondary storage system 2508, and then utilize this corresponding parity data to recover the corresponding segment row data, enabling the corresponding records to be read. This can further improve the technology of database systems by reducing the wait time for query execution, while enabling most processing resources to perform optimally via access to only primary storage system 2506. In particular, in some or all given queries, only a small proportion of records are read via recovery of corresponding segments via access to parity data stored in the secondary storage system 2508, based on a failure rate of primary storage system 2506 being correspondingly small and/or based on a recovery rate of restoring unavailable records being correspondingly fast.

In the example illustrated in FIG. 27D, segment 2424.1.2 is unavailable for access via the primary storage system 2506. For example segment 2424.1.2 is unavailable for access via the primary storage system 2506 due to a corresponding failure condition, such as the memory drive 2425 of primary storage system 2506 that stores segment 2424.1.2 failing and/or a node 37 of primary storage system 2506 that stores and/or accesses segment 2424.1.2 failing and/or being offline.

The query execution module 2405 can implement one or more primary storage access modules 2616. For example, the one or more primary storage access modules 2616 are implemented via a plurality of nodes 37 participating at IO level 2416 of a corresponding query that access segments 2424 stored via primary storage system 2506 by accessing segments 2424 stored in their own memory drives 2425, where memory drives 2425 of node 37 participating at IO level 2416 implement some or all memory resources of the primary storage system 2506 as discussed previously. All available segments required for execution of a corresponding query, and/or a set of segments assigned to nodes 37 for access via TO level 2416 based on assignment data and/or recent storage health and/or availability data, can have their corresponding records 2422 read from primary storage system 2506 via the primary storage access modules 2616 in accordance with the query execution.

However, at least one segment, such as segment 2424.1.2 in this example, can be unavailable for access due to a storage failure. Corresponding segment row data 2505 can be read by recovering corresponding segments via parity data stored in secondary storage system 2508 via a secondary storage access module. For example, as illustrated in the example of FIG. 27D, at least one primary storage access module 2616 sends a notification to one or more secondary storage access modules 2618 indicating segment row data 2505.2 must be read from secondary storage system 2508. For example, the primary storage access module 2616 sends this notification based on encountering an access failure and/or detecting the failure condition when attempting to read segment row data 2505. As another example, the segment row data 2505.2 was already determined to be unavailable, for example, based on previous detection of the corresponding failure condition, and/or secondary storage access modules 2618 determines to read segment row data 2505.2 from secondary storage system 2508 based on a prior request and/or determination.

As illustrated via FIG. 27D, the secondary storage access modules 2618 can recover by implementing and/or communicating with the segment recovery module 2739 of FIG. 27C. This can include retrieving the set of K parity data in the parity data group for segment 2424.1.2 from K corresponding computing devices 18 of secondary storage system 2508, and/or can include performing a decoding function 2745 upon the retrieved set of K parity data to regenerate the corresponding segment 2424.1.2, as discussed in conjunction of FIG. 27C. Some or all of the segment row data 2505 can be read from the regenerated segment 2424.1.2 to extract corresponding records 2422. These records 2422 can be outputted via the secondary storage access modules 2618 in accordance with the query execution.

Thus, raw and/or processed records 2422 outputted via primary storage access modules 2616 and secondary storage access modules 2618 can render a full set of required record reads and/or TO data blocks for the corresponding query. The secondary storage access modules 2618 can output substantially less records than primary storage access modules 2616 based on a small proportion of segments being unavailable at any given time. This can be ideal in ensuring that records are predominantly accessed via the more efficient access to primary storage system 2506 in query executions. Further processing, such as filtering step 2544 and/or projection step 2546 and/or one or more query operators performed upon data values of records in accordance with the query, can be performed to ultimately render the query resultant.

The one or more secondary storage access modules 2618 can be implemented via distinct processing and/or memory resources from the one or more primary storage access modules 2616. For example, the one or more primary storage access modules 2616 are implemented via a first set of nodes 37 and/or computing devices 18, and the one or more secondary storage access modules 2618 are implemented via a second set of nodes 37 and/or computing devices 18 that are distinct from the first set of nodes 37 and/or computing devices 18. Alternatively, some or all of the one or more secondary storage access modules 2618 can be implemented via shared processing and/or memory resources with the one or more primary storage access modules 2616.

For example, one or more nodes 37 participating at the IO level of the query execution plan 2405 and/or having memory drives 2425 that implement the primary storage system 2506 can be further operable to communicate with the secondary storage system 2508. For example, a given node 37 implementing one or more primary storage access modules 2616 reads a first set of records from segments 2424 stored via primary storage system, for example via access to its own memory drives 2425, and/or reads a second set of records via recovery of other segments 2424 by retrieving parity data of corresponding parity data groups 2736 stored via secondary storage system 2508.

As a particular example, this given node 37 can read the second set of records by recovering other segments 2424 stored via accessing the parity data in secondary storage system 2508 based on being assigned to read these records from corresponding segments stored via one of its own memory drives 2425, and further based on determining these records are not available for access via the one of its own memory drives 2425, for example, due to a failure of the one of its own memory drives 2425.

The given node 37 can be separate from the secondary storage system 2508, where the node 37 does not have memory drives or other storage resources implementing the secondary storage system 2508. In such embodiments, the given node 37 can send access requests to the secondary storage system 2508 that is implemented via a separate set of memory devices, where the given node 37 communicates with the secondary storage system 2508 via system communication resources 14, one or more external networks 17, and/or via another wired and/or wireless connection with the secondary storage system 2508 to request and receive the corresponding segment row data accordingly. For example, the given node 37 implements its own segment recovery module 2739 in a same or similar fashion as implementing segment recovery module 2439 of FIG. 24D, where the other nodes 37 of FIG. 24D implement the secondary storage system and store only parity data 2426.

In other embodiments, some nodes 37 only implement storage resources of the secondary storage system. For example these nodes 37 only participate at IO level of query execution plans when they store parity data via secondary storage system 2508 utilized to recover segments 2424 whose records are required for the query and are not available for access via the primary storage system 2506.

FIG. 27E illustrates an embodiment of a database system 10 that recovers segments 2424 for storage via primary storage system in response to a detected failure by utilizing the segment recovery module 2739 of FIG. 27C. The record recovery module 2602 can be implemented via one or more computing devices 18 and/or via other processing and/or memory resources of the database system 10. Some or all features and/or functionality of the database system 10 of FIG. 27E can be utilized to implement the database system 10 of FIG. 26A and/or any other embodiment of database system 10 described herein.

The record recovery module 2602 can determine to recover particular segment row data 2505 based on detecting a storage failure of the particular segment row data 2505. This can include determining a node 37 and/or memory drive 2425 storing the segment row data 2505 has failed, gone offline, is performing unfavorably, and/or otherwise encounters a failure condition. This can include determining a segment is unavailable for access, for example, when attempting to read the segment in query execution as discussed in conjunction with FIG. 27D. In this example, segment 2424.1.2 is determined to be unavailable, for example, based on the access failure illustrated in FIG. 26B.

The record recovery module 2602 can retrieve the set of K parity data of the corresponding parity data group 2736.1.2 stored in secondary storage system via a secondary storage access module 2618, which can be the same or different from the one or more secondary storage access modules 2618 of FIG. 27D. This access to the parity data of parity data group 2736.1.2 can be the same access performed by secondary access storage module 2618 utilized by query execution module 2504 as part of the IO step of the query execution in FIG. 27D. This access to the parity data of parity data group 2736.1.2 can alternatively be separate from an IO step of a query execution and/or can be for the purposes of re-storing the segment 2424.1.2 in primary storage system 2506 only.

The record recovery module 2602 can regenerate the segment 2424.1.2 from this set of K parity data of the corresponding parity data group 2736.1.2 as discussed previously, for example, by performing the decoding function 2745 and/or by otherwise utilizing the segment recovery module 2739.

This recovered segment 2424.1.2 can then be re-stored in primary storage system 2506 via a primary storage access module 2616, which can be the same or different from the one or more primary storage access modules 2616 of FIG. 27D. This recovered segment 2424.1.2 can be re-stored in different storage resources, such as a different node 37 and/or memory drive 2425, due to the prior node 37 and/or memory drive 2425 encountering a failure. Alternatively, the recovered segment 2424.1.2 can be re-stored in the original storage resources, such as a same node 37 and/or memory drive 2425, for example, if these resources became again available and/or if the failure condition was due to other circumstances not relating to failure of these resources.

In various embodiments, database system includes at least one processor and a memory that stores operational instructions. The operational instructions, when executed by the at least one processor, can cause the database system to: receive a plurality of records of a dataset for storage; generate a plurality of segment row data from the plurality of records, wherein each segment row data includes a proper subset of the plurality of records; generate a plurality of parity data corresponding to the plurality of segment row data; store the plurality of segment row data via a first storage mechanism; facilitate storage of the plurality parity data via a second storage mechanism; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of parity data via the second storage mechanism.

Figure 27F:
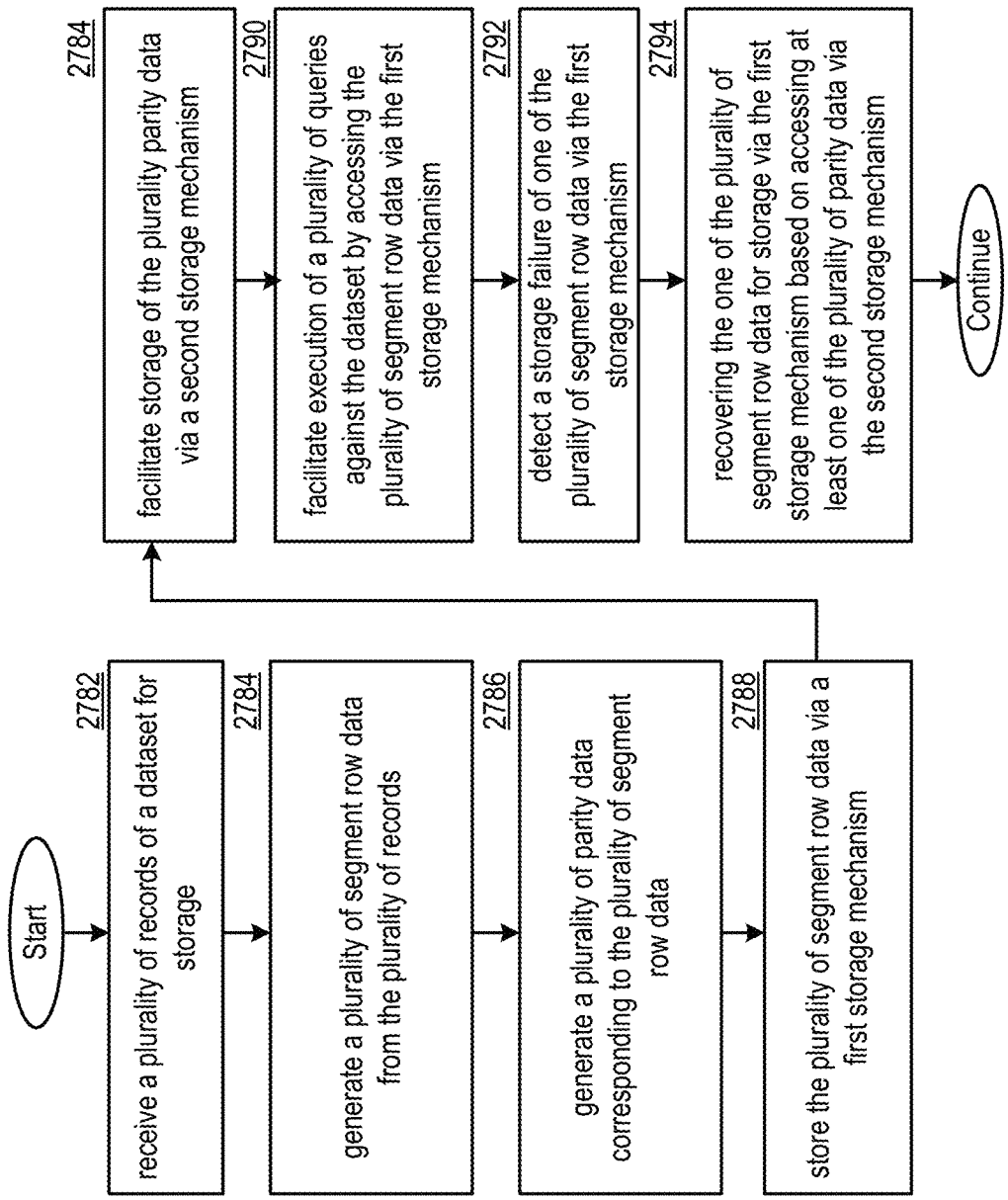
FIG. 27F is a logic diagram illustrating a method of storing records via multiple storage mechanisms in accordance with various embodiments of the present invention.

FIG. 27F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27F. In particular, a node 37 can utilize the query processing module 2435 to execute some or all of the steps of FIG. 27F, where multiple nodes 37 implement their own query processing modules 2435 to independently execute some or all of the steps of FIG. 27F, for example, to facilitate execution of a query as participants in a query execution plan 2405. Some or all of the method of FIG. 27F can be performed by utilizing the record storage module 2502, the query processing system 2501, the segment recovery module 2739, the record recovery module 2602, the primary storage system 2506, and/or the secondary storage system 2508 in accordance with some or all features and/or functionality described in conjunction with FIGS. 27A-27C. Some or all of the method of FIG. 27F can be performed via a query execution module 2504. Some or all of the steps of FIG. 27F can optionally be performed by any other processing module of the database system 10. Some or all of the steps of FIG. 27F can be performed to implement some or all of the functionality of the record storage module 2502, the query processing system 2501, the segment recovery module 2739, the record recovery module 2602, the primary storage system 2506, and/or the secondary storage system 2508 as described in conjunction with FIGS.

27A-27C. Some or all of the steps of FIG. 27F can be performed to implement some or all of the functionality regarding execution of a query via the plurality of nodes in the query execution plan 2405 as described in conjunction with FIGS. 24A-24D. Some or all steps of FIG. 27F can be performed by database system 10 in accordance with other embodiments of the database system 10 and/or nodes 37 discussed herein.

Step 2782 includes receiving a plurality of records of a dataset for storage. For example, some or all of the plurality of records each include a plurality of values corresponding to a plurality of fields of a corresponding one of the one or more datasets.

Step 2784 includes generating a plurality of segment row data from the plurality of records. Each segment row data can include a proper subset of the plurality of records. A plurality of proper subset of the plurality of records corresponding to the plurality of segment row data can be mutually exclusive and/or collectively exhaustive with respect to the plurality of records. The plurality of records can be grouped to form the plurality of segment row data based on at least one key field, at least one cluster key field, and/or values of any one or more fields of the plurality of records designated for use in generating the plurality of segment row data. For example, ones of the plurality of records with same and/or similar values for these one or more fields are grouped into the same segment row data, while ones of the plurality of records with different values for these one or more fields are grouped into the different segment row data. This can include applying a similarity function and/or clustering algorithm to generate the plurality of segment row data.

Step 2786 includes generating a plurality of parity data corresponding to the plurality of segment row data. The parity data can be generated in accordance with a redundancy storage encoding scheme, such as a RAID scheme, an error correction coding scheme, and/or another scheme that involves generating parity data for use in recovery of data.

The method can optionally include generating a plurality of segments from the plurality of segment row data. Generating a segment from corresponding segment row data can include generating column-formatted data from the segment row data for inclusion in the segment. Generating a segment of the plurality of segments from corresponding segment row data can include performing some or all functionality discussed in conjunction with FIGS. 15-23. Segments of the plurality of segments can include index data, manifest data, and/or statistics data as illustrated in FIG. 23.

Generating a segment of the first plurality of segments can include generating corresponding parity data of the plurality of parity data in conjunction with step 2786, for example, as discussed in conjunction with FIGS. 15-23. However, rather than storing the parity data as part of the segment in conjunction with corresponding segment row data, the parity data is stored elsewhere via the secondary storage mechanism, for example, mapped to an identifier of the corresponding segment row data. In some embodiments, each segment of the first plurality of segments is generated to include, indicate, and/or be mapped to an identifier, pointer, access memory location information, and/or other information for accessing the corresponding parity data in memory of the second storage mechanism.

Generating the plurality of parity data can include segregating segment row data into a plurality of segment groups and/or generating segments via a plurality of segment groups. Each segment group can include a same number of multiple segment row data from the plurality of segment row data. Every segment row data can be included in exactly one segment group.

Parity data for each of a set of multiple segment row data of a given segment group can be based on some or all other ones of the set of multiple segment row data included in this same segment group. This can include applying a redundancy storage encoding scheme to a set of segment row data included in this same segment group generate parity data corresponding to each segment row data in the segment group. A size of the segment groups can correspond to a fault-tolerance level of the redundancy storage encoding scheme.

Parity data of the plurality of parity data can be implemented as parity data 2426 of FIG. 24C. However, unlike the embodiment of parity data 2426 illustrated in FIG. 24C, the parity data 2426 of each given segment 2424 is not stored in conjunction with the records 2422 of the segment 2424, and is instead stored via a different, second storage mechanism.

Step 2788 includes storing the plurality of segment row data via a first storage mechanism. The first storage mechanism can be implemented by utilizing some or all features and/or functionality of the primary storage system 2506. The first storage mechanism can be implemented via a plurality of memory drives 2425 of a plurality of nodes 37. The first storage mechanism can alternatively or additionally be implemented via a plurality of NVMe drives of the database system 10. Storing the plurality of segment row data via a first storage mechanism can include storing the plurality of segment row data as a plurality of segments generated from the segment row data.

Step 2790 includes facilitating execution of a plurality of queries against the dataset by accessing the plurality of segment row data via the first storage mechanism. For example, the second storage mechanism is not utilized to access the plurality of segment row data during query execution. The query can be executed via a plurality of nodes 37 participating in a query execution plan 2405, for example, where nodes 37 at an IO level 2416 access the plurality of segment row data via their own memory drives 2425 that implement the first storage mechanism.

Step 2792 includes detecting a storage failure of one of the plurality of segment row data via the first storage mechanism. For example, detecting a storage failure include determining a failure of a memory drives 2425 of a node 37 that stores the one of the plurality of segment row data. As another example, detecting the storage failure include determining a failure of node 37 that stores the one of the plurality of segment row data via one of its memory drives 2425. As another example, detecting the storage failure includes determining a memory device and/or location storing the one of the plurality of segment row data has failed, is offline, has a current performance that compares unfavorably to a performance threshold, is corrupted, and/or is otherwise encountering a storage failure condition. As another example, detecting the storage failure includes attempting access to the one of the plurality of segment row data via the first storage mechanism, for example, in conjunction with a query execution, where the storage failure is detected based on the attempted access failing. As another example, detecting the storage failure includes receiving a notification of a failure, receiving and/or determining a command and/or instruction to recover the one of the plurality of segment row data, and/or otherwise determining the storage failure and/or that the one of the plurality of segment row data need be recovered in the first storage mechanism.

Step 2794 includes recovering the one of the plurality of segment row data, for example, based on detecting the storage failure of the one of the plurality of segment row data. This can include accessing at least one of the plurality of parity data via the second storage mechanism. For example, a set of parity data corresponding to other ones of the plurality of segment row data, such as parity data for segment row data of some or all of a set of segments in a same segment group, are accessed to rebuild the segment row data, for example, in accordance with a decoding process corresponding to the redundancy storage encoding scheme that utilizes the set of parity data as input. This can include a similar process as discussed in conjunction with FIG. 24D, where parity data is accessed via the second storage mechanism rather than from segments stored in other nodes 37 at the IO level of a query execution plan.

Step 2794 can include re-storing the one of the plurality of segment row data, once recovered via parity data read from the second storage mechanism, in different memory resources of the first storage mechanism that are different from failed memory resources of the first storage mechanism. For example, if a first memory drive and/or a first node of the first storage mechanism that previously stored the one of the plurality of segment row data failed, this one of the plurality of segment row data, once recovered, is stored in a different memory drive and/or a different node, for example, that is operating correctly and/or not undergoing a failure condition. Re-storing the one of the plurality of segment row data can include regenerating a corresponding segment for storage via the first storage mechanism.

In cases where detecting the storage failure of the one of the plurality of segment row data via the first storage mechanism is based on detecting a failed memory drive 2425, failed node 37, and/or another failed one or more memory devices, step 2794 can include recovering multiple ones of the plurality of segment row data, such as all segment row data that was stored via the failed memory drive 2425, failed node 37, and/or another failed one or more memory devices. Step 2794 can include accessing sets of the plurality of parity stored via the second storage mechanism, regenerating each segment row data via a corresponding set of the plurality of parity data, and/or re-storing the multiple ones of the plurality of segment row data via the first storage mechanism.

In some embodiments, the method further includes facilitating execution of at least one other query by accessing parity data via the second storage mechanism. For example, consider a query that is executed after the storage failure of the one of the plurality of segment row data and prior to the recovery of the one of the plurality of segment row data. As a particular example, detecting the storage failure includes attempting access to the one of the plurality of segment row data via the first storage mechanism in conjunction with execution of the at least one other query, where the storage failure is detected based on the attempted access failing. Based one of the plurality of segment row data being unavailable for use in the query execution via the first storage mechanism due to the storage failure, rather than delaying query execution until this one of the plurality of segment row data is recovered in the first storage mechanism, the query execution can proceed based on recovering this one of the plurality of segment row data via access of a corresponding set of parity data via the second storage mechanism. This recovery of the one of the plurality of segment row data via access of a corresponding set of parity data via the second storage mechanism can be slower than access of ones of the plurality of segment row data stored via the first storage mechanism, for example, based on the first storage mechanism having more efficient access than the second storage mechanism and/or based on a length of time and/or resources required to recover segment row data.

In some embodiments, this recovery of the one of the plurality of segment row data via access to a corresponding set of parity data via the second storage mechanism to facilitate execution of the query can be utilized to implement the access of step 2694 utilized to recover the one of the plurality of segment row data via the first storage mechanism. For example, the one of the plurality of segment row data, once recovered via the corresponding set of parity data to facilitate query execution, is then re-stored via the first storage mechanism, rather than a separate second access to the one of the plurality of segment row data being performed to recover the one of the plurality of segment row data in step 2694.

The method can further include detecting a storage failure of parity data of the plurality of parity via the second storage mechanism and/or recovering this parity data of the plurality of parity data for storage via the second storage mechanism. This can include accessing multiple other ones of the plurality of parity data that are different from this failed parity data, such as parity data of some or all of a set of segments in a same segment group, to rebuild the another given parity data in accordance with a decoding process corresponding to the redundancy storage encoding scheme. For example, the parity data stored in the second storage mechanism is generated in accordance with a redundancy storage encoding scheme that enable the corresponding decoding process to recover all data of a full segment, including both the parity data and the segment row data of the segments, despite being stored in separate locations.

In various embodiments, a non-transitory computer readable storage medium includes at least one memory section that stores operational instructions. The operational instructions, when executed by a processing module that includes a processor and a memory, can cause the processing module to: receive a plurality of records of a dataset for storage; generate a plurality of segment row data from the plurality of records, wherein each segment row data includes a proper subset of the plurality of records; generate a plurality of parity data corresponding to the plurality of segment row data; store the plurality of segment row data via a first storage mechanism; facilitate storage of the plurality parity data via a second storage mechanism; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of parity data via the second storage mechanism.

In some cases, the embodiments of FIGS. 27A-27E that store segments and parity data separately may be a preferred mechanism over the duplicated storage of segment row data presented in conjunction with FIGS. 26A-26C. In particular, the embodiments of FIGS. 27A-27E only require that segment row data, and thus each record, be stored once, while the embodiments of FIGS. 26A-26C require that segment row data, and thus each record, be stored twice, which can be unideal if memory resources of the secondary storage system and/or total memory resources are limited. However, in other cases, the embodiments of FIGS. 26A-26C over the embodiments of FIGS. 27A-27E in cases where storage resources are more ample, particularly in cases where failures occur more frequently and/or where recovering segments via retrieving multiple corresponding parity data from multiple locations, and by performing a decoding function of a corresponding redundancy storage error encoding scheme is timely and/or expensive. In such cases, it can be more ideal to store duplicated segment row data, where simple retrieval of duplicate segment row data can be utilized to recover segments rather than this more timely recovery of segments is not required.

A trade-off between total memory utilization requirements and record recovery efficiency of each embodiment can be utilized to dictate whether the embodiments of FIGS. 26A-26C over the embodiments of FIGS. 27A-27E are preferred for different implementations of database system 10 and/or for different datasets. This trade-off can further be based on a failure rate of nodes, memory drives, and/or computing devices of the database system, where higher failure rates can indicate the embodiments of FIGS. 26A-26C are more preferred, and where lower failure rates can indicate the embodiments of FIGS. 27A-27E are preferred. This trade-off can further be based on an access rate and/or query rate, as infrequent access to data can enable data to take longer to be recovered, where higher access rates can indicate the embodiments of FIGS. 26A-26C are more preferred, and where lower access rates can indicate the embodiments of FIGS. 27A-27E are preferred. This trade-off can further be based on a size of parity data relative to the size of segment row data, where greater sizes of parity data relative of the size of segment row data can indicate the embodiments of FIGS. 26A-26C are more preferred, and where smaller sizes of parity data relative of the size of segment row data can indicate the embodiments of FIGS. 27A-27E are preferred.

In some cases, different implementations and/or portions of database system 10 can utilize different embodiments, and/or different datasets can be stored via different embodiments, where some datasets are stored via the embodiments of FIGS. 26A-26C, and where other datasets are stored via the embodiments of FIGS. 27A-27E. This can be configured via user input and/or can be determined automatically based on the type of data in the datasets, the access rate and/or querying rate to the dataset, the fault-tolerance, memory capacity, and/or processing speed of the computing devices being utilized to store the datasets, and/or based on another determination.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by at least one processor of a database system, comprising:
   receiving a plurality of records of a dataset for storage, wherein each of the plurality of records include a plurality of values corresponding to a plurality of fields of the dataset;
   storing, for each of the plurality of records, ones of the plurality of values corresponding to a first subset of the plurality of fields via a first storage mechanism, wherein the first storage mechanism corresponds to a file storage system utilizing a non-volatile memory access protocol;
   facilitating storage of, for each of the plurality of records, ones of the plurality of values corresponding to a second subset of the plurality of fields via a second storage mechanism that is different from the first storage mechanism based on a data type corresponding to the second subset of the plurality of fields, wherein the second storage mechanism corresponds to an object storage system;
   determining a query for execution against the dataset; and
   facilitating execution of the query by:
      accessing, via the first storage mechanism, values of at least one first field included in the first subset of the plurality of fields;
      accessing, via the second storage mechanism, values of at least one second field included in the second subset of the plurality of fields; and
      generating a query resultant for the query based on the values of the at least one first field and the values of the at least one second field.

2. The method of claim 1, wherein the first storage mechanism includes storage via a first set of memory devices, and wherein the second storage mechanism includes storage via a second set of memory devices that are distinct from the first set of memory devices.

3. The method of claim 2, wherein the first set of memory devices correspond to a first access efficiency level, and wherein the second set of memory devices correspond to a second access efficiency level that is less favorable than the first access efficiency level.

4. The method of claim 1, further comprising:
   selecting the second subset of the plurality of fields based on identifying at least one of the plurality of fields that corresponds to an unstructured data type.

5. The method of claim 1, further comprising:
   selecting the second subset of the plurality of fields based on identifying at least one of the plurality of fields that compares unfavorably to a data size threshold.

6. The method of claim 1, further comprising:
   selecting the second subset of the plurality of fields based on identifying at least one of the plurality of fields that corresponds to at least one of: variable length string data, audio data, image data, video data, or multimedia data.

7. The method of claim 1, further comprising:
   selecting the second subset of the plurality of fields based on identifying at least one of the plurality of fields that corresponds to sensitive data fields; and
   generating encrypted data corresponding to the at least one of the plurality of fields for each of the plurality of records;
   wherein facilitating storage of the ones of the plurality of values corresponding to the second subset of the plurality of fields via the second storage mechanism for each of the plurality of records includes storing the encrypted data corresponding to the at least one of the plurality of fields via the second storage mechanism.

8. The method of claim 1, further comprising:
   receiving configuration data generated based on user input; and
   determining the second subset of the plurality of fields based on the configuration data indicating selection of the second subset of the plurality of fields.

9. The method of claim 1,
   identifying a subset of the plurality of records with values of the at least one first field that compares favorably to filtering parameters of the query; and
   generating the query resultant to include a set of values of the at least one second field corresponding to only ones of the plurality of records included in the subset of the plurality of records.

10. The method of claim 9, wherein the plurality of fields of the dataset includes a unique identifier field set, wherein the unique identifier field set is included in the first subset of the plurality of fields, wherein the unique identifier field set is included in the second subset of the plurality of fields, and wherein facilitating execution of the query further includes:
   identifying a set of unique identifier values by retrieving, via the first storage mechanism, values of the unique identifier field set for only records in the subset of the plurality of records; and
   identifying the set of values by retrieving, via the second storage mechanism, values of the second subset of the plurality of fields for only records of the plurality of records having one of the set of unique identifier values.

11. The method of claim 10, wherein facilitating execution of the query further includes:
   identifying a first relational table that includes values of a union of the at least one first field and the unique identifier field set for records in the subset of the plurality of records;
   identifying a second relational table that includes values of a union of the at least one second field and the unique identifier field set for records in the plurality of records; and
   performing a join operation upon the first relational table and the second relational table to identify the set of values, wherein a join predicate of the join operation indicates equality of values for the unique identifier field set of the first relational table and for the unique identifier field set of the second relational table.

12. The method of claim 10,
   wherein the second storage mechanism corresponds to an object storage system,
   wherein facilitating storage of ones of the plurality of values corresponding to the second subset of the plurality of fields via the second storage mechanism includes, for each record of the plurality of records:
　facilitating storage of the value for the at least one second field of the each record as a corresponding object in the object storage system; and
　facilitating storage of the value of the unique identifier field set of the each record as object metadata of the corresponding object in the object storage system; and
wherein the set of values are identified based on identifying a corresponding set of objects in the object storage system with object metadata indicating a value of unique identifier field set that matches a corresponding one of the set of unique identifier values.

13. The method of claim 9, further comprising:
determining the filtering parameters and the at least one first field based on a query expression of the query indicating the filtering parameters be applied to the at least one first field; and
determining the at least one second field based on the query expression of the query indicating projection of the at least one second field.

14. The method of claim 13, further comprising:
selecting the second subset of the plurality of fields based on identifying at least one of the plurality of fields that corresponds to a projection-only column type for the dataset, wherein the second subset of the plurality of fields includes the at least one second field based on determining the at least one second field corresponds to the projection-only column type;
wherein the filtering parameters of the query are not applied to the at least one second field based on the at least one second field corresponding to the projection-only column type.

15. The method of claim 14, further comprising:
generating query expression restriction data indicating the at least one of the plurality of fields that corresponds to the projection-only column type for the dataset;
sending the query expression restriction data to a client device; and
receiving the query expression from the client device, wherein the client device generated the query expression based on user input and further based on the query expression restriction data.

16. The method of claim 13, further comprising:
generating a first plurality of indexes corresponding to the at least one first field; and
generating a second plurality of indexes corresponding to the at least one second field;
wherein storing the ones of the plurality of values of the first subset of the plurality of fields via the first storage mechanism includes storing values of first subset of the plurality of fields in conjunction with the first plurality of indexes and the second plurality of indexes via the first storage mechanism;
wherein the query expression of the query further indicates the filtering parameters be applied to the at least one second field, and wherein the subset of the plurality of records is identified based on utilizing the second plurality of indexes.

17. The method of claim 1, wherein storing the ones of the plurality of values corresponding to the first subset of the plurality of fields via the first storage mechanism for each of the plurality of records includes:
generating a plurality of segments corresponding to a plurality of mutually exclusive proper subsets of the plurality of records, wherein each of the plurality of segments stores, in accordance with a column-based format, the values corresponding to the first subset of the plurality of fields for records included in a corresponding one of the plurality of mutually exclusive proper subsets of the plurality of records; and
storing the plurality of segments via a plurality of computing devices of the first storage mechanism; and
wherein facilitating execution of the query includes:
identifying, via each of the plurality of computing devices, a computing device subset of the plurality of records with values of the at least one first field that compares favorably to filtering parameters of the query based on accessing ones of the plurality of segments stored by the each of the plurality of computing devices, wherein a subset of the plurality of records is identified as a union of a plurality of computing device subsets identified via the plurality of computing devices.

18. A database system includes:
at least one processor; and
a memory that stores operational instructions that, when executed by the at least one processor, cause the database system to:
　receive a plurality of records of a dataset for storage, wherein each of the plurality of records include a plurality of values corresponding to a plurality of fields of the dataset;
　store, for each of the plurality of records, ones of the plurality of values corresponding to a first subset of the plurality of fields via a first storage mechanism based on:
　　generating a plurality of segments corresponding to a plurality of mutually exclusive proper subsets of the plurality of records, wherein each of the plurality of segments stores, in accordance with a column-based format, the values corresponding to the first subset of the plurality of fields for records included in a corresponding one of the plurality of mutually exclusive proper subsets of the plurality of records; and
　　storing the plurality of segments via a plurality of computing devices of the first storage mechanism;
　facilitate storage of, for each of the plurality of records, ones of the plurality of values corresponding to a second subset of the plurality of fields via a second storage mechanism that is different from the first storage mechanism based on a data type corresponding to the second subset of the plurality of fields;
　determine a query for execution against the dataset; and
　facilitate execution of the query by:
　　accessing, via the first storage mechanism, values of at least one first field included in the first subset of the plurality of fields;
　　accessing, via the second storage mechanism, values of at least one second field included in the second subset of the plurality of fields; and
　　generating a query resultant for the query based on the values of the at least one first field and the values of the at least one second field;
　wherein facilitating execution of the query includes identifying, via each of the plurality of computing devices, a computing device subset of the plurality of records with values of the at least one first field that compares favorably to filtering parameters of the query based on accessing ones of the plurality of segments stored by the each of the plurality of computing devices, wherein a subset of the plurality of records is identified as a union of a plurality of computing device subsets identified via the plurality of computing devices.

19. A non-transitory computer readable storage medium comprises:
  at least one memory section that stores operational instructions that, when executed by a processing module that includes a processor and a memory, causes the processing module to:
    receive a plurality of records of a dataset for storage, wherein each of the plurality of records include a plurality of values corresponding to a plurality of fields of the dataset;
    store, for each of the plurality of records, ones of the plurality of values corresponding to a first subset of the plurality of fields via a first storage mechanism, wherein the first storage mechanism corresponds to a file storage system utilizing a non-volatile memory access protocol;
    facilitate storage of, for each of the plurality of records, ones of the plurality of values corresponding to a second subset of the plurality of fields via a second storage mechanism that is different from the first storage mechanism based on a data type corresponding to the second subset of the plurality of fields, wherein the second storage mechanism corresponds to an object storage system;
    determine a query for execution against the dataset; and
    facilitate execution of the query by:
      accessing, via the first storage mechanism, values of at least one first field included in the first subset of the plurality of fields;
      accessing, via the second storage mechanism, values of at least one second field included in the second subset of the plurality of fields; and
      generating a query resultant for the query based on the values of the at least one first field and the values of the at least one second field.

* * * * *